(12) United States Patent
Paya Diaz

(10) Patent No.: US 8,733,103 B2
(45) Date of Patent: May 27, 2014

(54) THERMAL ENERGY CONVERSION PLANT

(71) Applicant: Gaspar Pablo Paya Diaz, Woodside, NY (US)

(72) Inventor: Gaspar Pablo Paya Diaz, Woodside, NY (US)

(*) Notice: Subject to any disclaimer, the term of this patent is extended or adjusted under 35 U.S.C. 154(b) by 0 days.

(21) Appl. No.: 13/706,433

(22) Filed: Dec. 6, 2012

(65) Prior Publication Data

US 2013/0160446 A1    Jun. 27, 2013

Related U.S. Application Data

(60) Provisional application No. 61/711,200, filed on Oct. 8, 2012, provisional application No. 61/681,151, filed on Aug. 9, 2012, provisional application No. 61/568,175, filed on Dec. 8, 2011.

(51) Int. Cl.
| | | |
|---|---|---|
| *F01K 25/00* | (2006.01) | |
| *F03G 7/04* | (2006.01) | |
| *F03G 7/06* | (2006.01) | |

(52) U.S. Cl.
USPC .............................. 60/641.6; 60/641.7; 60/671

(58) Field of Classification Search
USPC ............................... 60/645–681, 641.6–641.7
See application file for complete search history.

(56) References Cited

U.S. PATENT DOCUMENTS

| | | | |
|---|---|---|---|
| 196,759 A | 11/1877 | Miller | |
| 1,544,029 A | 12/1922 | Nelson | |
| 1,952,520 A | 3/1934 | Urquhart | |
| 2,006,985 A * | 7/1935 | Claude et al. | ............ 122/40 |
| 2,636,129 A | 5/1948 | Agnew | |
| 2,595,164 A | 4/1952 | Nisolle | |
| 3,140,986 A | 7/1964 | Hubbard | |
| 3,312,054 A | 4/1967 | Anderson, et. al. | |
| 3,338,797 A | 8/1967 | Hermansen, et al. | |
| 3,375,664 A | 4/1968 | Wells, Jr. | |
| 3,414,481 A | 12/1968 | Kelly, Jr. | |
| 3,805,515 A | 4/1974 | Zener | |
| 3,896,622 A | 7/1975 | Daniello | |
| 3,953,971 A | 5/1976 | Parker | |
| 3,967,449 A * | 7/1976 | Beck | ....................... 60/641.7 |
| 4,014,279 A * | 3/1977 | Pearson | ................... 114/382 |
| 4,064,409 A | 12/1977 | Redman | |

(Continued)

FOREIGN PATENT DOCUMENTS

| | | |
|---|---|---|
| DE | 361473 | 10/1922 |
| DE | 2362138 | 6/1975 |
| NO | WO 81/03360 | 11/1981 |

OTHER PUBLICATIONS

Russo, Anthony J, An Investigation of Atmospheric Temperature Differential Power Generation, Sandia National Laboratory Research Report SAND 74-0259, Oct. 1974.

(Continued)

*Primary Examiner* — Thomas Denion
*Assistant Examiner* — Brian Inacay
(74) *Attorney, Agent, or Firm* — Fish & Richardson P.C.

(57) ABSTRACT

A thermal energy conversion plant, wherein a pressurized liquefied working fluid gasifies in an evaporator unit located at the lower level of a closed-loop thermodynamic circuit, ascends through a widening ascending conduit to a condenser unit located at the upper level of said thermodynamic circuit, condenses and falls because gravity powering a power extraction apparatus, before entering back into the evaporator, and restarting the cycle. A much lighter pressuring gas could be optionally included in the widening ascending conduit.

29 Claims, 42 Drawing Sheets

(56) References Cited

U.S. PATENT DOCUMENTS

| | | | |
|---|---|---|---|
| 4,083,189 A * | 4/1978 | Fetkovich | 60/641.7 |
| 4,087,975 A | 5/1978 | Owens | |
| 4,095,429 A | 6/1978 | Morey | |
| 4,187,686 A | 2/1980 | Pommier | |
| 4,192,145 A | 3/1980 | Tanaka | |
| 4,244,189 A | 1/1981 | Bliamptis | |
| 4,255,933 A | 3/1981 | Bailey | |
| 4,280,328 A | 7/1981 | Falconer | |
| 4,302,297 A * | 11/1981 | Humiston | 202/185.1 |
| 4,306,416 A | 12/1981 | Iozzi | |
| 4,318,275 A | 3/1982 | Brown | |
| 4,382,365 A | 5/1983 | Kira et al. | |
| 4,391,100 A | 7/1983 | Smith | |
| 4,441,321 A * | 4/1984 | Ridgway | 60/641.7 |
| 4,598,552 A * | 7/1986 | Weber | 60/673 |
| 4,760,706 A | 8/1988 | Nasser | |
| 5,488,828 A | 2/1996 | Brossard | |
| 6,202,417 B1 * | 3/2001 | Beck | 60/641.7 |
| 6,434,942 B1 * | 8/2002 | Charlton | 60/641.11 |
| 6,651,434 B2 | 11/2003 | Sanchez Gomez | |
| 6,779,345 B2 * | 8/2004 | Girouard | 60/646 |
| 8,042,338 B2 | 10/2011 | Russo | |
| 8,117,843 B2 | 2/2012 | Howard et al. | |
| 2003/0000213 A1 | 1/2003 | Christensen et al. | |
| 2006/0110262 A1 | 5/2006 | Hsu | |
| 2006/0137349 A1 | 6/2006 | Pflanz | |
| 2007/0068184 A1 | 3/2007 | Mueller et al. | |
| 2008/0073058 A1 | 3/2008 | Ueyama | |
| 2008/0230212 A1 * | 9/2008 | Crayssac et al. | 165/166 |
| 2009/0077969 A1 * | 3/2009 | Prueitt | 60/641.7 |
| 2009/0217664 A1 * | 9/2009 | Rapp et al. | 60/641.6 |
| 2009/0260358 A1 * | 10/2009 | Rapp et al. | 60/641.7 |
| 2010/0139272 A1 * | 6/2010 | Howard et al. | 60/641.7 |
| 2010/0154419 A1 | 6/2010 | Kontomaris | |
| 2011/0247351 A1 | 10/2011 | Alston | |

OTHER PUBLICATIONS

Lloyd C. Trimble, Engineering Aspects of OTEC Systems, Society of Naval Architects and Marine Engineers in the Proceedings of the Spring Meeting in San Francisco, Calif., May 25-27, 1977.
International Search Report and Written Opinion dated Mar. 25, 2013 issued in corresponding PCT Application No. PCT/US2012/68103.
Search History dated Mar. 25, 2013 issued in corresponding PCT Application No. PCT/US2012/68103.
Informal Comments by Applicant on International Search Report dated May 9, 2013 filed in corresponding PCT Application No. PCT/US2012/68103.

* cited by examiner

TABLE I

| HEIGHT (METERS) | ESTIMATION OF PRESSURE (BAR) AT 20°C | | | ESTIMATION OF PRESSURE (BAR) AT 45°C | | |
|---|---|---|---|---|---|---|
| | SF6 | He | N2 | SF6 | He | N2 |
| 0 | 21.08 | 21.08 | 21.08 | 37.13 | 37.13 | 37.13 |
| 250 | 18.20 | 20.99 | 20.49 | 32.43 | 36.99 | 36.18 |
| 500 | 15.71 | 20.91 | 19.92 | 28.32 | 36.86 | 35.25 |
| 750 | 13.56 | 20.83 | 19.37 | 24.73 | 36.72 | 34.35 |
| 1,000 | 11.71 | 20.74 | 18.83 | 21.60 | 36.58 | 33.46 |
| 1,250 | 10.11 | 20.66 | 18.30 | 18.87 | 36.45 | 32.60 |
| 1,500 | 8.73 | 20.58 | 17.80 | 16.42 | 36.31 | 31.77 |
| 1,750 | 7.54 | 20.49 | 17.30 | 14.34 | 36.18 | 30.96 |
| 2,000 | 6.51 | 20.41 | 16.82 | 12.52 | 36.04 | 30.16 |
| 2,250 | 5.62 | 20.33 | 16.36 | 10.98 | 35.91 | 29.39 |
| 2,500 | 4.85 | 20.25 | 15.90 | 9.55 | 35.78 | 28.64 |
| 2,750 | 4.19 | 20.17 | 15.46 | 8.34 | 35.65 | 27.90 |
| 3,000 | 3.61 | 20.09 | 15.03 | 7.29 | 35.51 | 27.19 |
| 4,000 | 2.00 | 19.76 | 13.43 | 4.24 | 34.99 | 24.50 |
| 5,000 | 1.12 | 19.45 | 11.99 | 2.47 | 34.48 | 22.08 |

FIG. 1A

TABLE II

| TEMPERATURE (CELSIUS) | VAPOR PRESSURE (BAR) |
| --- | --- |
| +45 | 37.13 |
| +40 | 33.27 |
| +35 | 29.79 |
| +30 | 26.62 |
| +25 | 23.72 |
| +20 | 21.08 |
| +15 | 18.67 |
| +10 | 16.47 |
| +5 | 14.47 |
| 0 | 12.65 |
| -5 | 11.01 |
| -10 | 9.52 |
| -15 | 8.19 |

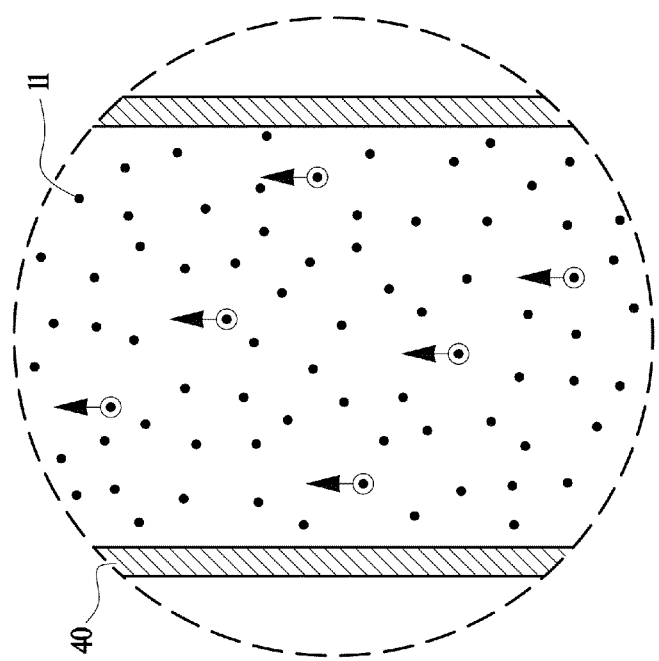
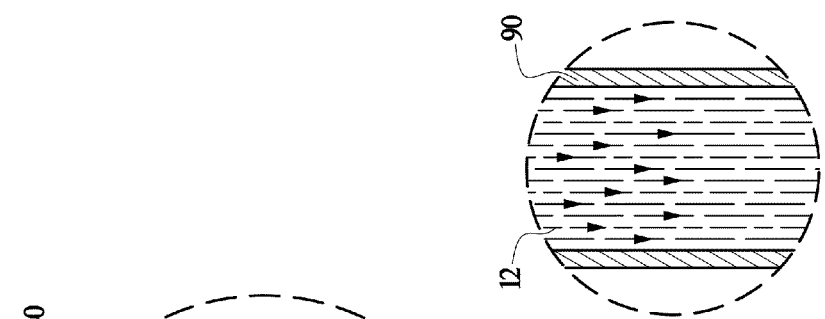
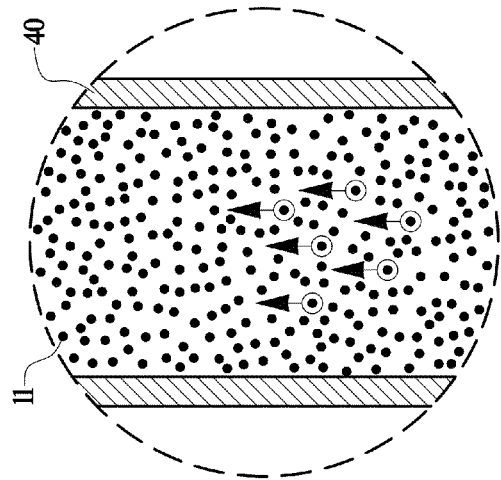
V1 – DETAIL FROM FIG. 2A
FIG. 2B
V2 – DETAIL FROM FIG. 2A
FIG. 2C
V3 – DETAIL FROM FIG. 2A
FIG. 2D

V2 - DETAIL FROM FIG. 2A

V1 - DETAIL FROM FIG. 2A

V4 - DETAIL FROM FIGURE 3B, 3D AND 3E

V6 - DETAIL FROM FIGURE 3C AND 3D

V5 - DETAIL FROM FIGURE 3C AND 3D

V7 - DETAIL FROM FIGURE 3E

V8 - DETAIL FROM FIG. 5A

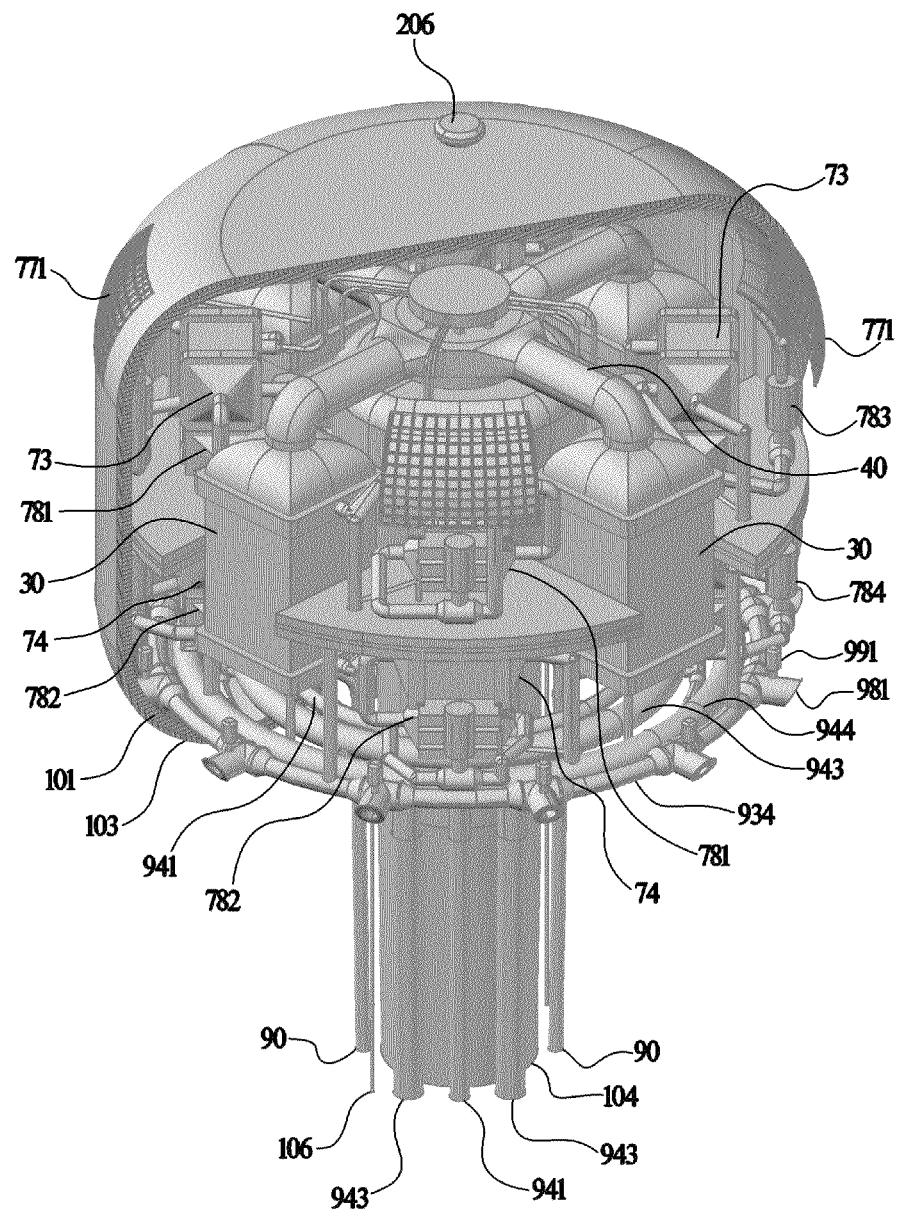
FIG. 5E     I-I', V-V', SECTIONS

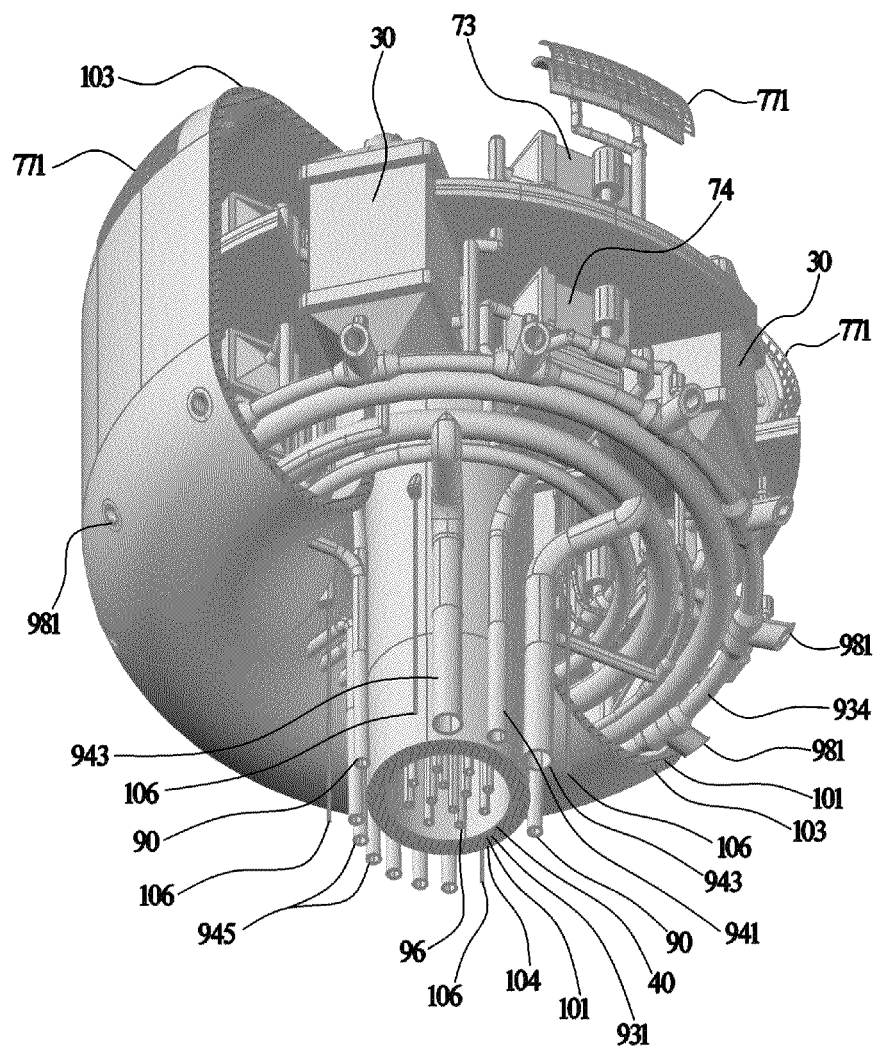
FIG. 5F    I-I', V-V', SECTIONS

I-I', V-V, SECTIONS

II-II', III-III', V-V' SECTIONS

IV-IV', V-V'
SECTIONS

V9 - DETAIL FROM FIG. 6A

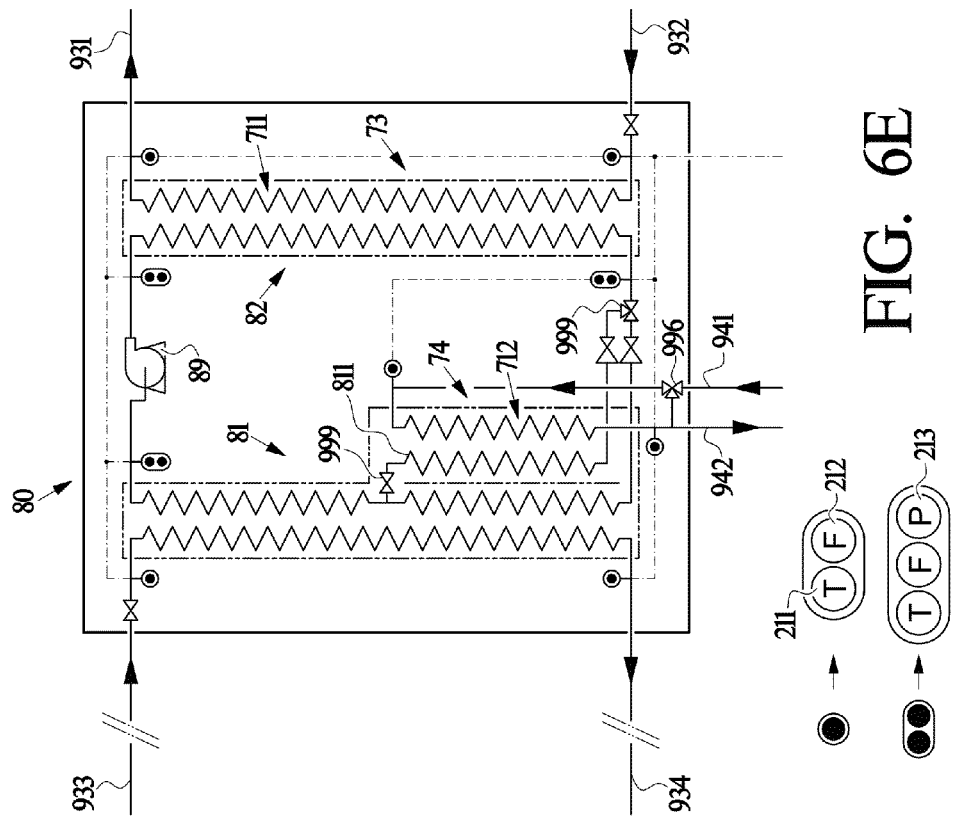
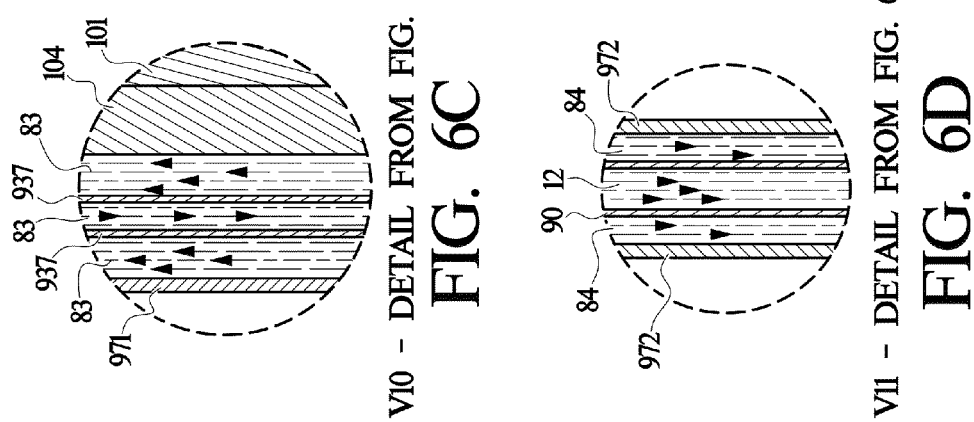

VI-VI', VII-VII'
SECTIONS

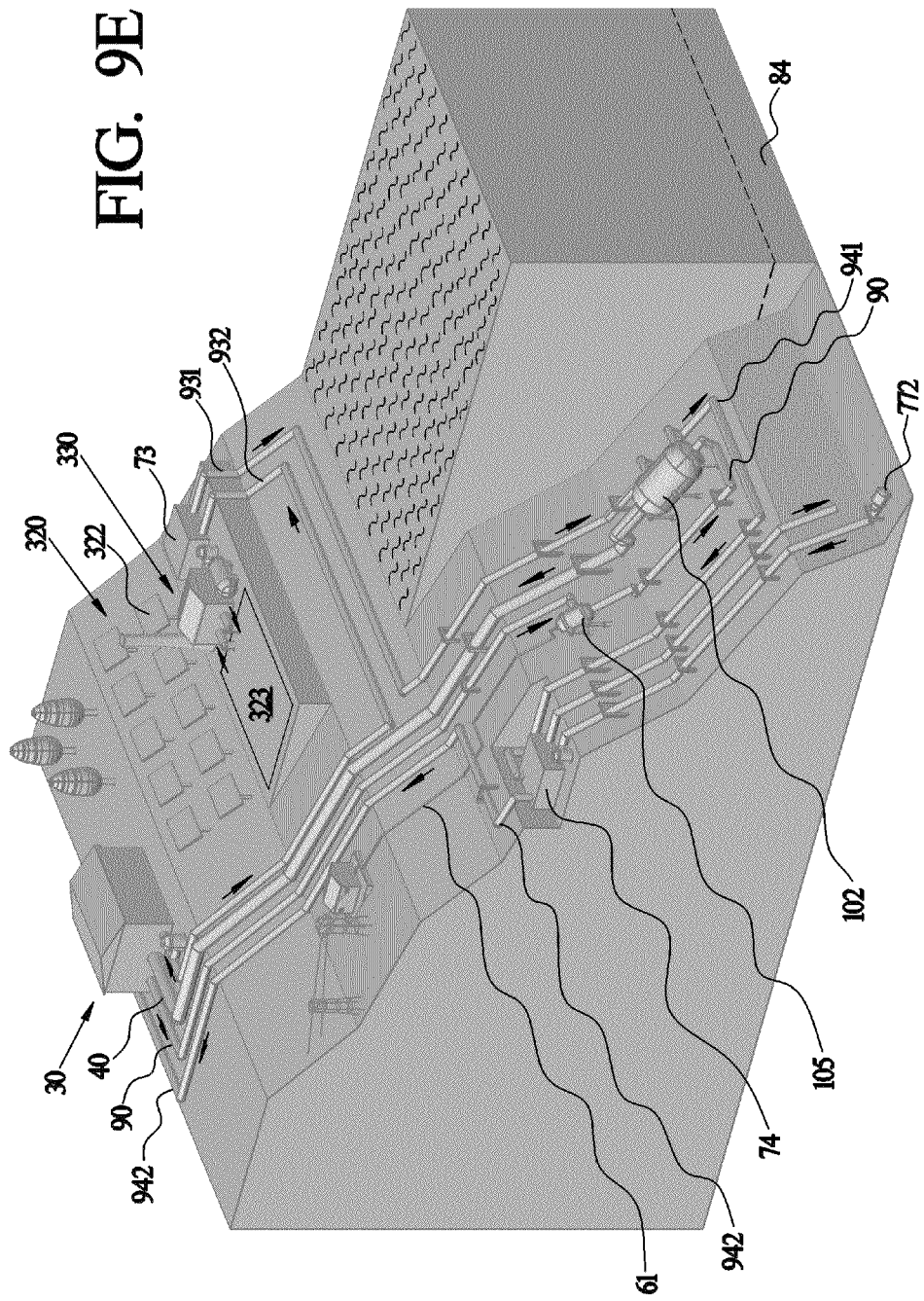

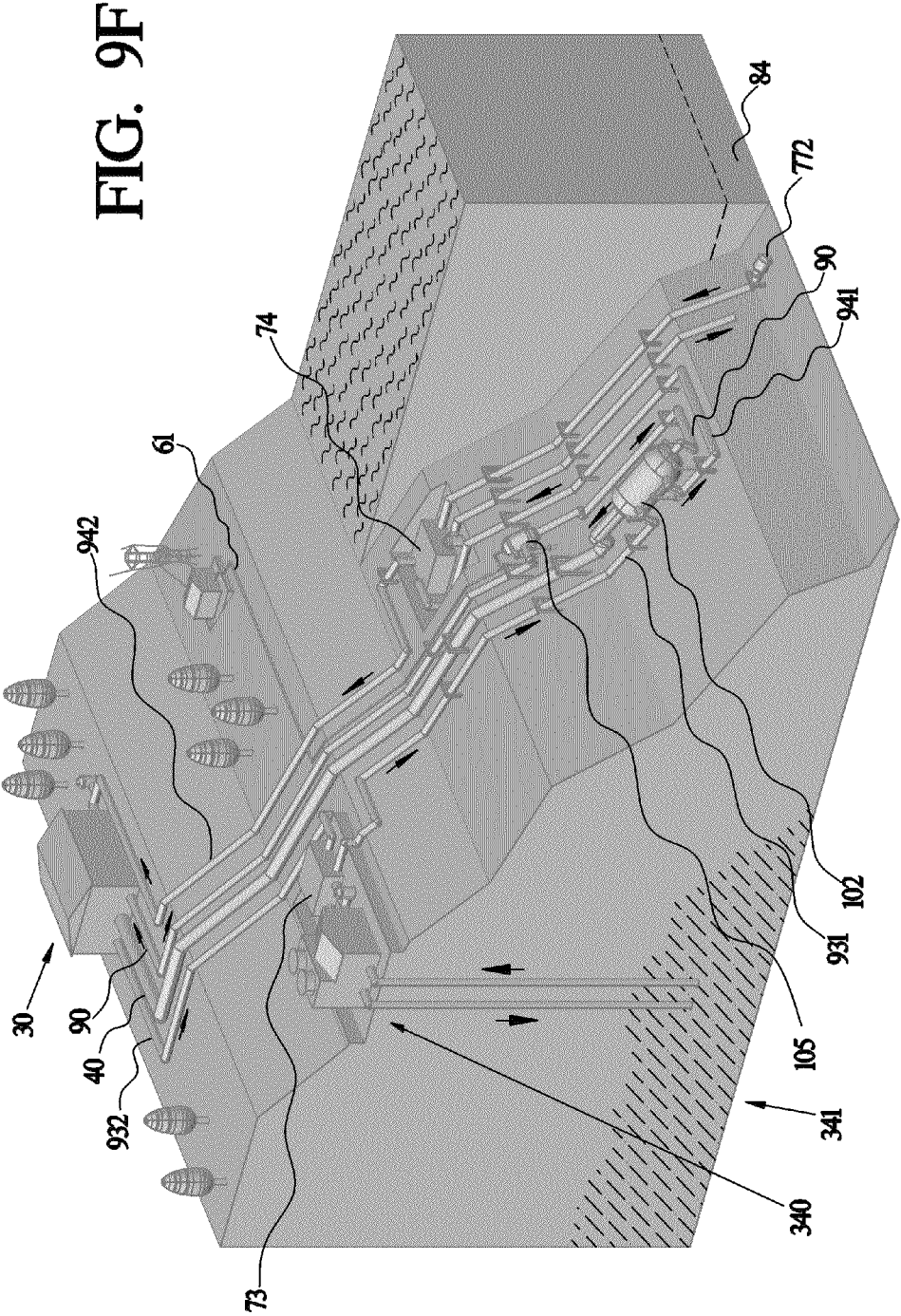

THERMAL ENERGY CONVERSION PLANT

CROSS-REFERENCE TO RELATE APPLICANTIONS

This application claims the benefit of U.S. Provisional Application No. 61/568,175, filed on Dec. 8, 2011; U.S. Provisional Application No. 61/681,151, filed on Aug. 9, 2012; and U.S. Provisional Application No. 61/711,200, filed on Oct. 8, 2012. The entire disclosures of the above applications are hereby incorporated herein by reference.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND a) Conventional Thermal Power Plants:

There are many types of conventional thermal power plants, most of which convert thermal energy to fluid energy to mechanical energy to electrical energy. The principal sources of electrical power convert thermal energy generated by burning coal or gas or by atomic fission to superheated steam—working fluid—which is then converted to rotary mechanical power through a turbine which, in turn, drives an electro-mechanical generator.

b) Alternative Renewable Power Generation Systems:

There are well known also alternative natural renewable energy sources in contrast to energy generated from fossil fuels, from which is possible also to generate electricity, as for example are: the sun radiation by photovoltaic panels; the wind by wind turbines; the heat stored in the interior of the Earth by geothermal plants; or the rainwater when descending through rivers or when is harnessed in dams by hydropower plants; the seas as thermal masses by sea thermal energy conversion plants—OTEC, tidal and current in oceans by water reaction turbines, and wave power by buoys per example.

It has also been proposed to use a closed loop ferrofluid system to drive a turbine for generation of power. In such a system, ferrofluids, which undergo large changes in their magnetic properties with temperature, are subjected to heating and cooling at separate points of the closed loop so that, by use of an electromagnet, a self-pumping action can be created which may be used to drive the turbine. There are several prior-art devices dealing with this matter. Namely, a ferrofluid electrical generator is disclosed at U.S. Pat. No. 4,064,409, entitled "Ferrofluidic Electrical Generator" by Charles M. Redman, and U.S. 2006/0110262 A1, entitled "Device Of Micro Loop Thermosyphon For Ferrofluid Power Generator", by Li-Chieh.

In order to a better understanding of some aspects of this disclosure Ocean Thermal Energy Conversion plants—OTEC, will be described with greater detail below:

The Earth receives 174 petawatts (PW) of incoming solar radiation (insolation) at the upper atmosphere. Approximately 30% is reflected back to space while the rest is absorbed by clouds, seas and land masses. Earth's land surface, seas and atmosphere absorb solar radiation, and this raises their temperature. Sunlight absorbed by the seas and land masses keeps the surface at an average temperature of 14° C. The total solar energy absorbed by Earth's atmosphere, seas and land masses is approximately 3,850,000 exajoules (EJ) per year. The amount of solar energy reaching the surface of the planet is so vast that in one year it is about twice as much as will ever be obtained from all of the Earth's non-renewable resources of coal, oil, natural gas, and mined uranium combined. Tropical oceans encircle Earth in an equatorial band between the Tropic of Cancer (23.5° North latitude) and the Tropic of Capricorn (23.5° South latitude). Much of that critical solar radiation initially falls on the tropics, where the Sun lies almost directly overhead for the entire year. The water temperature of tropical oceans thus typically exceeds 20° C. (68° F.) and stays relatively constant throughout the year.

Sea Thermal Energy Conversion plants—OTEC, was first described by French scientist A. d'Arsonval in 1881, aims to produce electricity by utilizing an essentially inexhaustible energy supply (the sun), a vast heat store (the surface region of the seas), and a large capacity heat sink (a deep region of the sea). A typical OTEC electrical power plant as described in the modern literature comprises a closed-loop thermodynamic system through which a working fluid (e.g., ammonia), which vaporizes at the temperature of the sea surface, is circulated from an evaporator to a turbine, from the turbine to a condenser, and from the condenser back to the evaporator for the recirculation through the system. The working fluid enters the evaporator in liquid phase, and is vaporized in the evaporator, which is immersed in relatively warm water drawn from the surface region of the sea. The vaporized working fluid then passes to the turbine and gives up energy to the turbine, which drives an electrical generator. The working fluid exhausted by the turbine then passes to the condenser, which is maintained at the temperature of cold water drawn from a deep region of the sea. Condensation of the working fluid to liquid phase occurs in the condenser. The condensed working fluid is thereupon pumped back to the evaporator to repeat the cycle.

Different samples of Sea Thermal Energy Conversion plants are disclosed in: U.S. Pat. No. 1,952,520 to Mr. Kenneth M. Urquhart; U.S. Pat. No. 2,006,985 to Mr. Georges Claude and Mr. Paul Boucherot (Mr. Claude was d'Arsonval's student, being Mr. Claude who actually built the first OTEC plant, in Cuba in 1930, being capable the system to generate 22 kW of electricity with a low-pressure turbine); U.S. Pat. No. 2,595,164 to Mr. Leon Nisolle; U.S. Pat. No. 3,312,054 to Mr. James H. Anderson and Mr. J. Hilbert Anderson Jr.; U.S. Pat. No. 3,805,515 to Mr. Clarence Zener; U.S. Pat. No. 3,896,622 to Mr. George T. Daniello; U.S. Pat. No. 4,087,975 to Mr. Lester J. Owens, assigned to the National Aeronautics and Space Administration—NASA of the USA. And more recently in: U.S. Pat. No. 8,117,843 to Mr. Robert James Howard, et. al.

Further details regarding OTEC systems are provided in an article entitled "Engineering Aspects of OTEC Systems", by Lloyd C. Trimble, published by the Society of Naval Architects and Marine Engineers in the Proceedings of the Spring Meeting in San Francisco, Calif., on May 25-27, 1977. Prototype OTEC electrical power plants have been built in Hawaii and in Nauru to demonstrate feasibility. To date, however, full-scale OTEC electrical power plants have not been built.

There are other methods of thermal energy conversion for power generation that had not been commercially build, but that had been for over a century extensively studied and considered, where the hydropower system from the rain cycle in nature is somehow imitated. In those methods the energy is obtained from the convective flow of a working fluid through an open or closed circuit, wherein said liquefied working fluid gasifies in an evaporator unit located at the lower level of said circuit, by gaining heat from a heat source; ascending gasified the working fluid to an upper level through an ascending conduit, increasing its potential energy; liquefying said working fluid in a condenser unit located at said upper level by giving heat to a heat sink; descending the liquefied working fluid because the force of gravity through a descending conduit, and driving a power extraction apparatus that is connected to said descending conduit, which is commonly a rotary engine, as per example a turbine, that in turn drives an electric generator; returning then such liquefied working fluid to the environment when is an open cycle, or to the lower initial level of said circuit when is a closed circuit, and restarting the cycle.

Several of these methods had been disclosed in the following patents, that are chronologically cited: U.S. Pat. No. 196,759 to Thomas M. Miller; DE 361,473 to Ernst Wiefel; U.S. Pat. No. 1,544,029 to Hans J. Nelson; U.S. Pat. No. 2,636,129 to Edward A. Agnew; U.S. Pat. No. 3,140,986 to Walter A. Hubbard; U.S. Pat. No. 3,338,797 to Nicolai T. Hermansen; U.S. Pat. No. 3,375,664 to William M. Wells, wherein the invention described was made in the course of, or under, Contract No. W-7405-ENG-48 with the United Sates Atomic Energy Commission; U.S. Pat. No. 3,414,481 to Hebert C. Kelly, Jr.; DE 2,362,138 to Werner Foppe; U.S. Pat. No. 3,953,971 to Sidney A. Parker; U.S. Pat. No. 4,095,429 to Robert E. Morey; U.S. Pat. No. 4,187,686 to Lorenzo A. Pommier; U.S. Pat. No. 4,192,145 to Seiyo Tanaka; U.S. Pat. No. 4,244,189 to Emmanuel Bliamptis; WO 81/03360 to Moe, Per, H.; U.S. Pat. No. 4,255,933 to Wayne Bailey; U.S. Pat. No. 4,280,328—to Claude J. Falconer; U.S. Pat. No. 4,306,416 to Joseph Iozzi; U.S. Pat. No. 4,318,275 to Melvin H. Brown; U.S. Pat. No. 4,382,365 to Gene S. Kira et. al.; U.S. Pat. No. 4,391,100 to Derrick A. Smith; U.S. Pat. No. 4,760,706 to Gamal E. Nasser; U.S. Pat. No. 5,488,828 to Pierre Brossard; U.S. Pat. No. 6,434,942 to Walter T. Charlton; U.S. Pat. No. 6,651,434 to Sanchez Gomez, Gines; U.S. Pat. No. 8,042,338 to Anthony Russo.

DISCUSSION OF PRIOR ART

All conventional thermal power generation plants operate under efficiencies lower than 50%, using big difference in temperature between the heat source (the combustion of fossil fuels or nuclear fission reactions) and the heat sink (the atmosphere, and the water of a river or sea). In order to optimize the efficiency of the plant, high differences in temperature between the heat source and the heat sink are required, what indeed generates vast amounts of waste heat that is deposited in the environment, what could harm said environment.

Solar and wind energy are not constant sources of energy. There is no solar radiation during nights and solar radiation decreases significantly during cloudy days, the peak hours of solar radiation being for a few hours near the noon time. Wind is not predictable and never has a constant flow. All these factors force to generate and excess of energy that has to be stored in order to be used when is needed, by for example pumping water to a dam located at a higher level, and liberating the harnessed water when needed in order to obtain energy from hydropower turbines.

Geothermal plants need very high range of temperatures in order to operate, over 100 Celsius degrees or higher in conventional plants, or over 50 Celsius degrees in binary cycle plants, being in this last case the thermal efficiency not higher than 15%. Besides, geographical areas where is possible to reach these high geothermal temperatures near the ground surface, are limited to some regions worldwide. Even though geothermal power is globally sustainable, extraction must still be monitored to avoid local depletion [Rybach, Ladislaus "Geothermal Sustainability", Oregon Institute of Technology—ISSN 0276-1084]. Over the course of decades, individual wells draw down local temperatures and water levels until a new equilibrium is reached with natural flows. The three oldest sites, at Larderello, Wairakei, and the Geysers have all reduced production from their peaks because of local depletion; heat and water, in uncertain proportions, were extracted faster than they were replenished.

Despite that hydropower is far more stable in producing electric power than other natural sources of renewable energy, shortages of rainfall could dry dams and rivers, reducing significantly the amount of energy that could be produced. In the other hand, the construction of dams, as the construction of canals between rivers and dams, alter notably the ecosystems.

Hitherto constructed Sea Thermal Energy Conversion plants—OTEC had not been able to produce significant amounts of energy, when compare to nuclear or conventional thermal plants. In contrast to conventional thermal plants the thermal gradient in OTEC plants between the heat source (warm shallow sea water) and the heat sink (cold deep sea water) is very small, and that dramatically limits the output of the OTEC plant when vaporizing a working fluid in order to power a vapor turbine. Per example in case of using ammonia as the working fluid in a closed circuit in a OTEC plant located between tropics, the vapor pressure at 25° C. is approximately 9.5 Bar, while at 5° C. condenses under 5.5 Bar, so the difference in pressure will not be higher than 4 Bar, what is the equivalent pressure obtained in the bottom of a column of approximately 40 meters of water. Earlier OTEC systems had an overall efficiency of only 1% to 3%, being the theoretical maximum efficiency lying between 6% and 7%. Current designs under review will operate closer to the theoretical maximum efficiency, but despite that the energy carrier, seawater, is free, although it has an access cost associated with the pumping energy costs. Also there is a cost of pumping sea water over the sea level in order to run the plant when is floating over the sea level or when is located on dry land, as the OTEC plant located in Hawaii island.

Ferrofluid power generators could work vaporizing completely the carrier fluid, that is where the nanoscale ferromagnetic or ferrimagnetic particles are suspended, or evaporating only a part of it in the thermal absorption unit producing babbles, in order to generate a self-pumping process, but nanoscale ferromagnetic or ferrimagnetic particles will remain solid. Large differences in temperature are needed in order to produce the self-pumping and buoyancy effect, where the most important factor for the generation process is the speed of the flow—because the nature of the magnetic generator, being not significant the distance between the condenser and the thermal absorption units, especially in the micro loop thermosyphon ferrofluid power generators where it is actually really small. Nevertheless, the medium used in the first referred ferrofluid generator—U.S. Pat. No. 4,064,409—is a ferrofluid comprising magnetite of less than 100 angstroms in diameter, whose Curie Temperature is above 550 Celsius degrees, such that the referring ferrofluid generator requires a very high working temperature for enabling the magnetic flux to change significantly and thus consumes a comparatively large amount of energy; while the scale of the second ferrofluid power generator—U.S. 2006/0110262 A1—is a micro scale, related to microcircuits and the small amounts of energy in them generated. Moreover, the exposed ferrofluid generators do not reutilize the heat taken by the thermal units, passing it directly to the surrounding atmosphere or heat sink through the condenser, discarding it from the system, without reutilizing it.

The methods for producing energy by the convective flow of a working fluid through an open or closed circuit, where the hydropower system from the rain cycle in Nature is somehow imitated, had not been commercially built, despite the enormous need of new sources of energy and that the method itself was proved valid, as Mr. Anthony Russo probed it when working under United States government contract at Sandia National Laboratories in 1973; an analysis of such system is contained in an internal Sandia report: SAND 74-0259.

However, each one of these references suffers from one or more of the following disadvantages:

a very low ratio of energy output versus dimensions and cost of the plant when compared with today common thermal power plants;

the use of hazardous working fluids, as per example when using explosive gases as propane and ethane, or toxic substances as mercury;

the use of a working fluid with a high specific heat and latent heat of evaporation values, as per example when water is proposed as the working fluid, which needs important quantities of thermal energy to evaporate at standard conditions of temperature and pressure;

the use of a working fluids that have a boiling point at standard pressure over the temperature of the heat source, what forces the system to work under vacuum conditions, what in turn reduces considerably the density of the column of gas that ascends from the evaporator;

the use of working fluid with low molecular mass, even lower than air, what reduces considerably the density of the column of gas that ascends from the evaporator, and the density of the column of liquefied working fluid that falls from the condenser downwards the power extraction apparatus;

the need of locating the evaporating and condensing unit at the place or level of the heat source and heat sink respectively, what reduces the possibilities for the system for being located in a more convenient location;

the direct transfer of heat between the working fluid and the heat source and the heat sink, through the evaporating and condensing units respectively, without reutilizing or recycling such heat within the circuit, that in case of using warm shallow sea water, or geothermal energy as the heat source, could alter notably the ecosystem or produce a rapid depletion of the heat source;

the use of non-continuous renewable sources of heat without the use of heat accumulative means, that will reduce or stop the production of energy from the system when the source of heat decreases, as per example when using wind or direct solar radiation, what reduces the output from the system during low-wind days or during the hours of low solar radiation, and that makes it impracticable during the nights;

the use of a mixture of two or more different working fluids simultaneously in the thermodynamic circuit, in order to adequate the system to variations in temperature of the heat source and heat sink, what reduces the overall efficiency of the system since each working fluid performs optimally under a particular set of conditions under a given temperature;

the reduction in temperature of the gasified working fluid while ascends through the ascending conduit, what makes the gasified working fluid to liquefy when the pressure in the ascending conduit gets higher than the vapor pressure of said working fluid at the new reduced temperature, what in turn reduces the power output of the system;

the use of the vapor pressure of the ascending column of vaporized working fluid in order to drive a gas/steam turbine at the top of the ascending conduit, what reduces notably the pressure in the condensing unit, and what in turns will low the boiling point of the working fluid in said condensing unit, needing lower temperatures in order to liquefy it; and furthermore, not any of the uncovered documents specifies the limit height at what the condenser should be located in relation with the pressure at what the gasified working fluid exits from the top of the ascending conduit, and the temperature at what the working fluid will liquefy in said condenser. In order for the gasified working fluid to liquefy in the condenser at a given temperature, it will be necessary to reach a minimum pressure inside of said condenser. This minimum pressure inside of the condenser could be obtained by three different ways, depending of the used method: a.) in a closed circuit being exerted by the gasified working fluid that exits from the ascending conduit; b.) in a closed or open circuit being exerted by mechanical means, as per example by a compressor; c.) in an open circuit being exerted by the environment, as per example by the surrounding natural atmospheric pressure. If the first method is applied, the condenser will could not be located over a given height from the evaporator, because the pressure and density of a column of gasified working fluid decreases with height. And if the second method is applied, the extra power needed in order to run the compressor, will make more reasonable to locate the condenser at a lower level wherein the needed pressure could be obtained directly from the ascending column of gasified working fluid, instead of by mechanical means. In order to justify my second asseveration I would like to refer to the following physic equation that allows to estimate the needed work in order to comprises a gas under a constant temperature (isothermal process):

$$W = n*R*T*\mathrm{Ln}\left(\frac{V_f}{V_i}\right)$$

where 'n' is the numbers of moles, 'R' is a constant (8.31 J/mol·K), 'T' is temperature in Kelvin degrees, 'Vf' is the final volume and 'Vi' the initial volume. It will show that the amount of work made for an expanding volume of gas inside the ascending conduit (that makes the over standing gas to raise), is the same that the work made for the compressor to compress it (dismissing the efficiency values for the compressor, and the gain of heat from the frictions and resistance of its internal pieces and mechanisms).

The present disclosure is directed to the problems set forth above.

SUMMARY OF THE DISCLOSURE

A thermal energy conversion plant, includes a closed-loop thermodynamic circuit, furthermore including a pressurized working fluid; an evaporator located in its lowest level; a widening ascending conduit connected to said evaporator; a condenser connected with the top exit of the widening ascending conduit; a descending pipe that connects back the condenser with the evaporator, closing the circuit; and at least one power extraction apparatus connected to said descending pipe. The liquefied working fluid gasifies in the evaporator, from where ascends, under constant temperature, through the widening ascending conduit up to the condenser, wherein the gasified working fluid liquefies, and from where descends because gravity through the descending conduit powering the power extraction apparatus, flowing then back into the evaporator, completing a self-pumping process, and restarting the cycle.

BRIEF DESCRIPTION OF THE SEVERAL VIEWS OF THE DRAWING

FIG. 1A is a data table that shows the variation in pressure for three different gases under constant temperature.

FIG. 2B is a schematic illustration of the detail V1 from FIG. 2A, depicting how the gasified working fluid ascends through a low section of the widening ascending conduit, according to the present disclosure.

FIG. 2C is a schematic illustration of the detail V2 from FIG. 2A, depicting how the gasified working fluid ascends through an upper section of the widening ascending conduit, according to the present disclosure.

FIG. 2D is a schematic illustration of the detail V3 from FIG. 2A, depicting the liquefied working fluid flowing through the descending conduit, according to the present disclosure.

FIGS. 5E, 5F and 5G are a three-dimensional view in perspective of the floating vessel under sections I-I' and V-V'.

FIG. 6C is a schematic illustration of the detail V10 from FIG. 6A showing the external encasement that surrounds the vertical descending high-pressure resistant submergible vessel of the widening ascending conduit, and the submergible high pressure resistant vessel of the evaporator.

FIG. 6D is a schematic illustration of the detail V11 from FIG. 6A showing the external encasement of the descending pipes.

FIG. 6E is a schematic illustration of the heat pump of the second embodiment.

FIGS. 6G-1, 6G-2 and 6G-3 are a side view of the second embodiment.

FIG. 6H is a three-dimensional view in perspective of the external encasement of the vertical descending high-pressure resistant submergible vessel, under sections VI-VI', and VII-VII'.

FIG. 9E is a three-dimensional view in perspective of the first scenario of the fifth embodiment.

FIG. 9F is a three-dimensional view in perspective of the third scenario of the fifth embodiment.

DETAILED DESCRIPTION

Figure 1B:
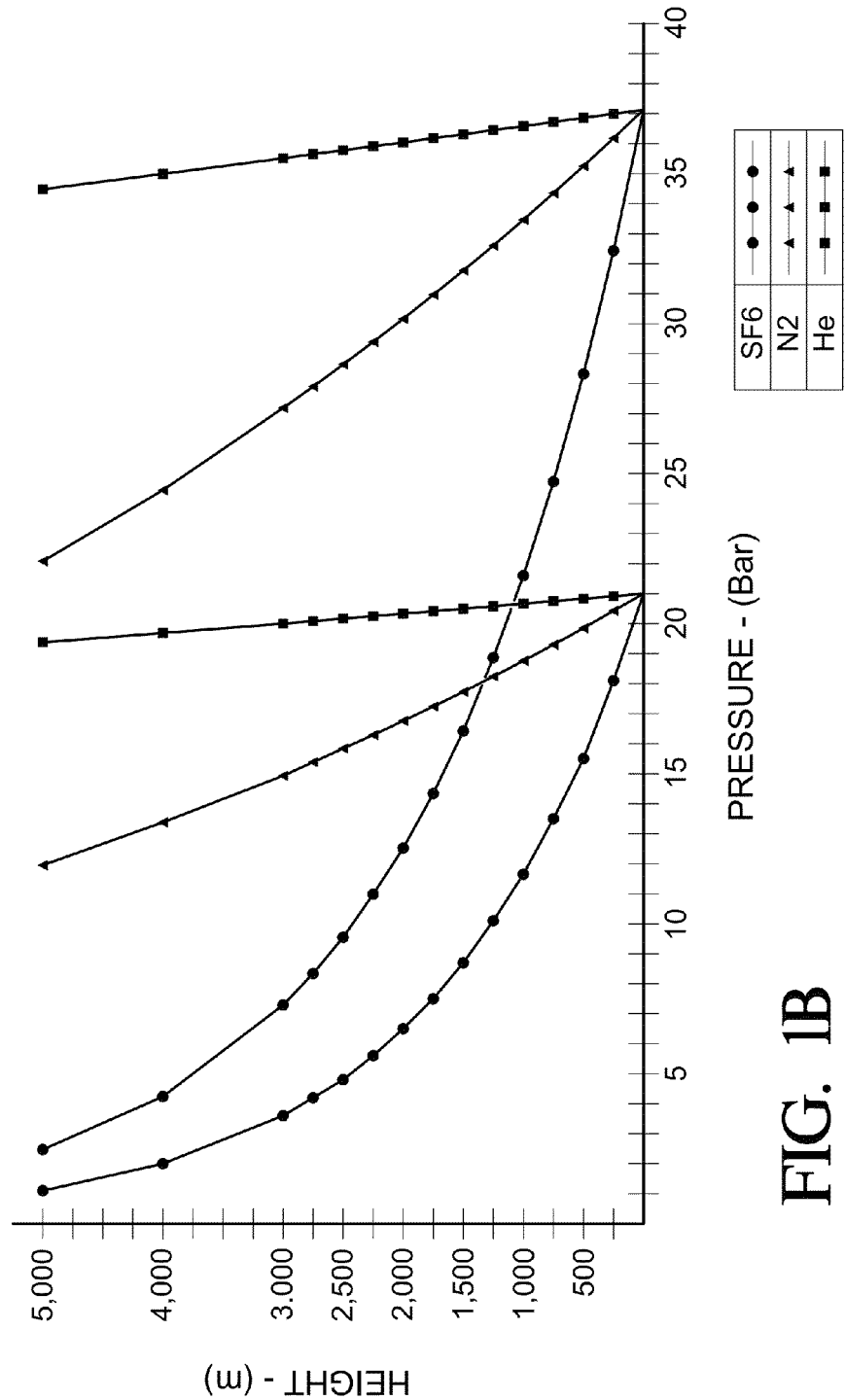
FIG. 1B is the graphic representation of the data from the table I of FIG. 1A

In the following description, certain illustrative, non-limiting embodiments will be described in greater detail with reference to the accompanying drawings. The same drawings reference numerals are used for the same elements even in different drawings and embodiments. The maters defined in the description such as a detailed construction and elements are only provided to assist in a comprehensive understanding. Thus, it is apparent that the present application can be carried out without those defined matters. Also, well-known functions or constructions are not described in detail since they would obscure the detailed description in unnecessary detail.

Introductory description of some physic concepts and formulas:

Formula of the principle of barometric law:

$$[P=P_0 * e^{-mgy/TK_B}]$$

provides the variation of pressure of a column of gas between different altitudes, under a constant temperature, where: 'P' is the final pressure in Bar; '$P_0$' is the initial pressure in Bar; 'e' is a mathematical constant −2.71828 . . . ; 'm' is the molar mass of the gas in Kg/mol; 'g' is the gravitational acceleration—9.08665 m/s²; 'y' is height in meters; '$K_B$' is the Boltzmann constant (1.38×10⁻²³); 'T' is the temperature in Kelvin degrees.

Estimations of density under the barometric law formula:

$$[D=D_0 * e^{-mgy/TK_B}]$$

the formula of the barometric law adapted in order to estimate the variation of the density in a column of gas between different altitudes, under constant temperature, where: 'D' is the final density in kilograms per square meter (Kg/m³), '$D_0$' is the initial density in Kg/m³, 'e' is a mathematical constant—2.71828 . . . , 'm' is the molar mass of the gas in Kg/mol, 'g' is the gravitational acceleration: 9.08665 m/s², 'y' is height in meters, '$K_B$' is the Boltzmann constant (1.38×10⁻²³), 'T' is the standard temperature in Kelvin degrees.

Pressure:

$$[P=P_0+d*g*y]$$

in physics pressure is the force per unit area, what means that is the force acting on a surface divided by the area over which it acts. 'P' is final pressure in Pascals (Pa), 'Po' is initial pressure in Pascals (Pa), 'd' is density in kilograms per square meter (Kg/m³), 'g' is the gravitational acceleration: 9.08665 m/s²; 'y' is height in meters.

Power related to pressure:

$$[P_W=P*Q]$$

in physics, power is the rate at which work is performed or energy is converted. 'Pw' is power measured in Watts (W), 'P' is pressure in Pascals (Pa), and 'Q' is the volumetric flow rate, measured in cubic meters per second (m³/s).

FIG. 1A is a data table (Table I) wherein is depicted the variation in pressure as a variation of height, for two different values of initial pressure '$P_0$' (21.08 Bar and 37.13 Bar) and under constant temperatures (20° C. and 45° C.) for three different gases: sulfur hexafluoride, formulated SF6; helium, formulated He; and nitrogen, formulated N2. FIG. 1B represents said data table graphically.

Figures 1C, 1D:
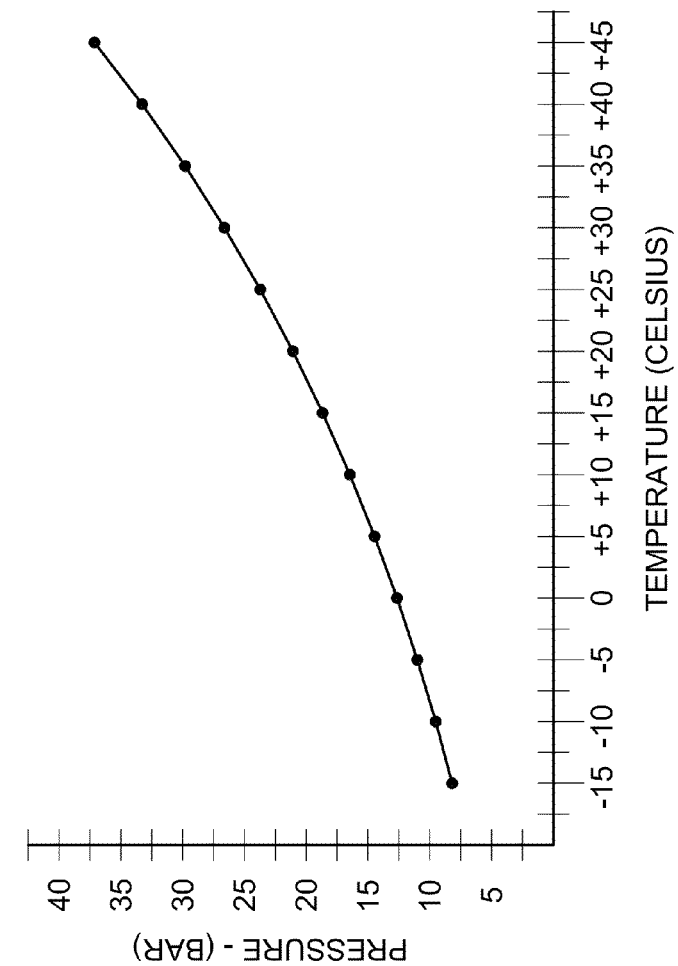
FIG. 1C is a data table showing different vapor pressure values under different temperatures for sulfur hexafluoride, formulated SF6.
FIG. 1D is the graphic representation of the data from the table II of FIG. 10.

FIG. 1C represents a data table (Table II) with values of vapor pressure of sulfur hexafluoride, SF6, under different temperatures. FIG. 1D represents said data table graphically.

Figure 2A:
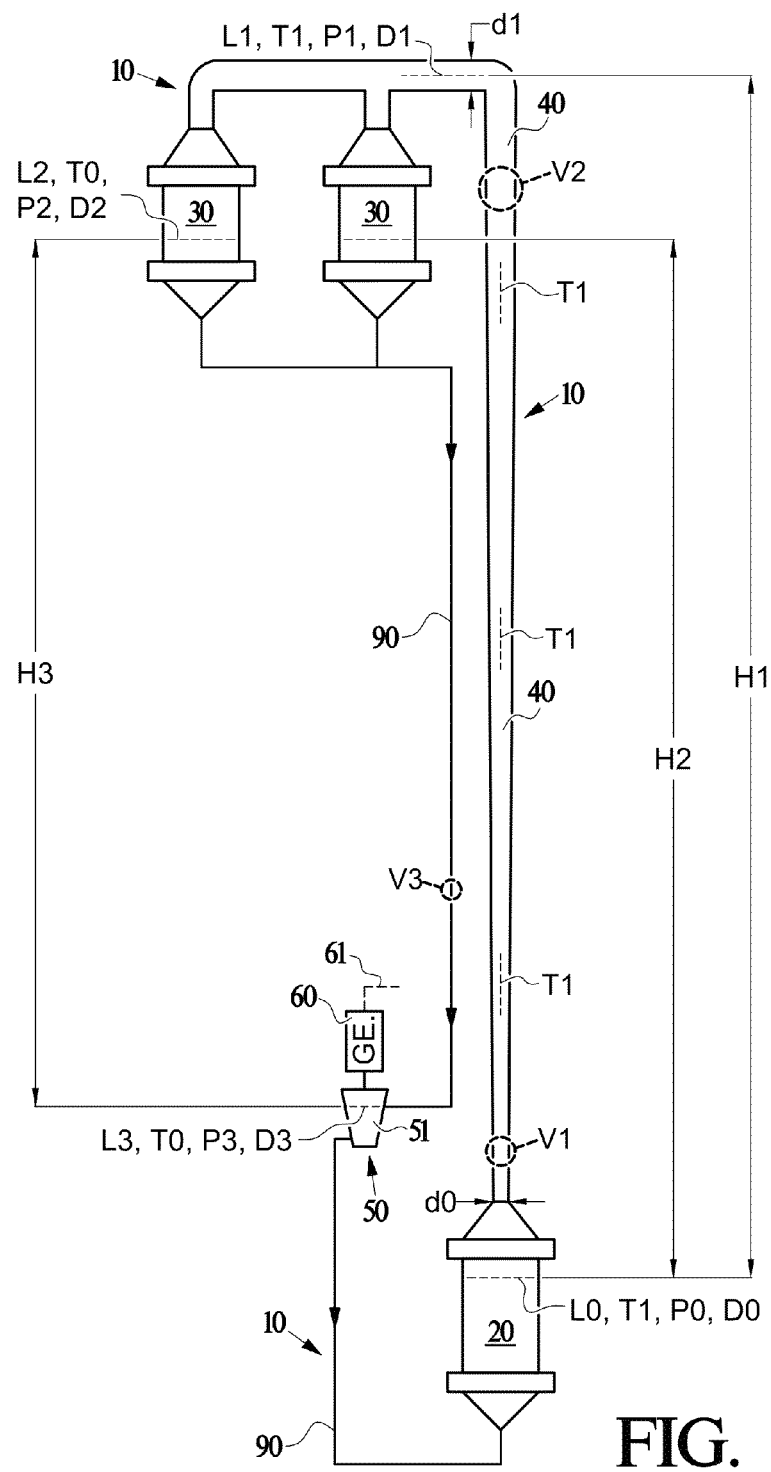
FIG. 2A is a schematic illustration showing the basic scheme of the thermal energy conversion plant, according to the present disclosure.

FIG. 2A is a schematic illustration showing the basic scheme of the thermal energy conversion plant of the present disclosure, wherein is depicted a closed-loop thermodynamic circuit 10, which comprises: a pressurized working fluid, which alternates gasified and liquefied phases through said thermodynamic circuit 10; one evaporator unit 20 located at the lowest level of said thermodynamic circuit 10; one widening ascending conduit 40 connected to said evaporator unit 20, in which the initial lowest diameter, d0, is smaller than the highest final diameter, d1; a group of two condensers units 30 located at a level higher than that of the evaporator unit 20, which are connected to the top-exit of said ascending conduit 40; one descending conduit 90 that connects back the condenser units 30 with the evaporator unit 20, closing the circuit; and a power extraction apparatus 50 connected to said descending conduit 90.

The number of condenser 30 and evaporator 20 units installed in the closed loop thermodynamic circuit 10 is optional, being possible to have a single or multiple units, depending of the preferred embodiment. In the present disclosure the number of condensers 30 and evaporators 20 units assembled in the closed-loop thermodynamic circuit 10 will vary from one embodiment to another.

Please refer back to FIG. 2A wherein H1 represents the height between level L0, that is the level at which the liquefied working fluid gasifies with a temperature of T1 at the evaporator unit 20, and level L1 at the top-exit of the widening ascending conduit 40; H2 represent the height between said level L0 and level L2 that is the level at which the gasified working fluid liquefies at the condenser units 30 with a temperature of T0; and H3 represents the height between said level L2 and the level L3 of the power extraction apparatus 50, wherein the liquefied working fluid arrives with a temperature of T0.

The working fluid will be a heavy molar mass gas or compound, with a high density in its liquefied phase. For the present disclosure sulfur hexafluoride, formulated SF6, is the proposed working fluid because its absence of hazards, being a nontoxic and nonflammable gas, with a very heavy molecular weight, high density in its liquefied phase, and low viscosity. Its characteristics are: molecular weight: 146.05 g/mol; gas density: 6.07 kg/m$^3$ (at 1 Bar of pressure and 20° C. of temperature); liquid density: 1,523.3 Kg/m$^3$ (at 15 Bar of pressure and 15° C. of temperature); vapor pressure: 14.47 Bar of pressure at 5° C. of temperature and 21.08 Bar of pressure at 20° C. of temperature; and a very low viscosity of 0.277 centiposoides—cP at 25° C. (significantly lower than the viscosity of water, 0.894 centiposoides—cP at 25° C.). Also, any other heavy molecular weight gas could be selected as working fluid, as for example the nonflammable and nontoxic Hexafluoroethane, formulated C2F6, also known as R-116, which has a molar mass of 138.02 g/mol.

The mode of operation is as follows (please, refer to FIGS. 2A, 2B, 2C, 2D, 2E and 2F): The working fluid enters liquefied 12 into the evaporator unit 20 wherein gasifies at level LO after raising its temperature to T1; then the gasified working fluid 11 egresses from the evaporator unit 20 and ascends through the widening ascending conduit 40 up to the condenser units 30 under constant temperature of T1 (details V1 and V2, depicted in FIGS. 2B, 2C and 2E, 2F); then the gasified working fluid 11 exits the widening ascending conduit at level L1, with a temperature of T1, entering into the condenser units 30, wherein liquefies at level L2 after lowering its temperature to T0; then the liquefied working fluid 12 egresses from the condenser units 30 and falls because gravity, under constant temperature of T0, through the descending conduit 90 (detail V3, depicted in FIG. 2D), powering the power extraction apparatus 50; then, from the power extraction apparatus 50 the liquefied working fluid 12 flows back into the evaporator 20, completing a self-pumping process and restarting the cycle.

Different kind of power extraction apparatus 50 could be configured in different embodiments of the invention. Due to the wide state-of-the-art use of turbines, a turbine will be the preferred power extraction apparatus depicted in the different embodiments of this disclosure. Due to the primary use of turbines for hydro-power, short kind of research and development will be needed in order to obtain an optimal design of turbine for other working fluids than water. In FIG. 2A it is depicted a power extraction apparatus that is a reaction turbine 51, which is connected to an electrical generator 60, which is driven by the motion of said turbine 51, generating electricity that will be transmitted through an electric transmission cable 61.

In some preferred embodiments, a pressuring gas 41 could be optionally arranged in the widening ascending conduit 40, having said pressuring gas 41 a significantly much lighter molar mass than the working fluid. The pressuring gas 41 does not liquefy in the condenser. An optimal pressuring gas would be Helium, because its qualities as a noble monatomic gas with a very low atomic mass, that has the lowest boiling point of all the elements, with an extremely low solubility. Its properties are: Molecular Weight: 4.0026 g/mol; Gas Density: 0.169 kg/m$^3$ (at 1 Bar of Pressure and 15° C. of Temperature). Nitrogen is another good option as pressuring gas because its low molecular mass 28.0134 g/mol, low chemical reactivity, and its big occurrence in the atmosphere, what makes it very feasible from a commercial viewpoint.

Figure 2F:
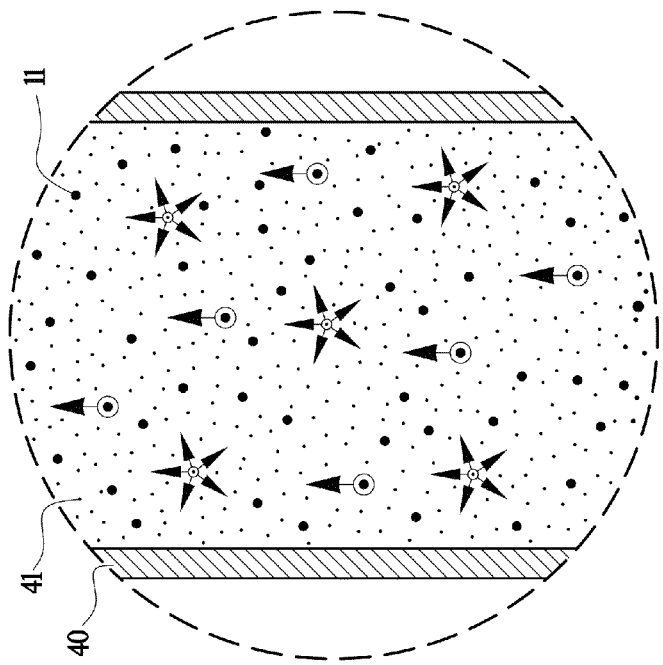
FIG. 2F is a schematic illustration of the detail V2 from FIG. 2A, depicting how the gasified working fluid mixes with the pressuring gas at an upper section of the widening ascending conduit, when a pressuring gas is allocated in the widening ascending conduit, according to the present disclosure.
Figure 2E:
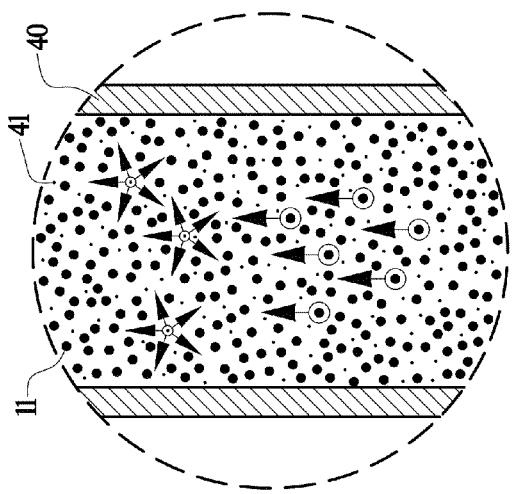
FIG. 2E is a schematic illustration of the detail V1 from FIG. 2A, depicting how the gasified working fluid mixes with the pressuring gas at a low section of the widening ascending conduit, when a pressuring gas is allocated in the widening ascending conduit, according to the present disclosure.

Please, refer to FIGS. 2E and 2F wherein the details V1 and V2 from FIG. 2A are again depicted, being in this case illustrated how the gasified working fluid 11 mixes with a pressuring gas 41 in the widening ascending conduit 40 at two different levels. Because the much lighter molecular mass of the pressuring gas 41, the distribution of gasified working fluid 11 and pressuring gas 41 will not be equal with height inside of the widening ascending conduit 40, being a much higher concentration of the heavier gasified working fluid 11 at lower levels than of the pressuring gas 41 (FIG. 2E), and the vice versa at higher levels (FIG. 2F).

For a given gasified working fluid 11 (FIGS. 2B and 2C), or for a given mixture of a gasified working fluid 11 and a pressuring gas 41 (FIGS. 2E and 2F), and with the help of the barometric law, based on theirs particular molar masses and under a given temperature, it will be possible to make a gross estimation of the variation with height (HI and H2) of the initial pressure P0 and density D0 obtained at level L0 at the evaporator unit 20, and the pressure P1 and density D1 obtained at level L1 at the top exit of the widening ascending conduit 40, and the final pressure P2 and density D2 obtained at level L2 at the condenser units 30. But, because the barometric law (as well as other formulas as the ideal gas law) is a formula related to gases near to standard conditions of temperature and pressure, and because the particular pressurized conditions of the working fluid 11, or of the mixture of gasified working fluid 11 and pressuring gas 41 in the widening ascending conduit 40, it will be required some experimentation until the exact pressure (P1 and P2) and density (D1 and D2) at levels L1 (H1) and L2 (H2) could be accurately known.

Please, refer again to FIGS. 2A, 2B, 2C, 2E and 2F. In order to assure an optimal flow of working fluid through the thermodynamic circuit 10, the ascending conduit 40 widens with height in the same proportion as the gasified working fluid 11 loses density (FIGS. 2B and 2C), or its percentage in the mixture with the pressuring gas 41 decreases (FIGS. 2E and 2F), so the final mass of gasified working fluid 11 that exits through the top exit of the ascending conduit 40 at level L1, will be the same than the mass of working fluid that, at level L0, gasifies at the evaporator unit 20.

Please, refer again to FIGS. 2A, 2B, 2C, 2E and 2F. Referring back to the barometric law the initial pressure 'P$_0$' will be the pressure P0 at which the working fluid gasifies at level L0 at the evaporator unit 20, and flows into the widening ascending conduit 40. The final pressure 'P' is the pressure P2 exerted by the gasified working fluid 11, or by the mixture of gasified working fluid 11 and the pressuring gas 41 (depending of the chosen preferred embodiment), at level L2 at the condenser units 30. For a given temperature T0 in the condenser units 30, the gasified working fluid 11 will liquefy when the pressure P2 has a value equal or greater than the value of the vapor pressure of said working fluid at said temperature T0.

Please, refer again to FIGS. 2A, 2E and 2F when using a pressuring gas 41 in the widening ascending conduit, because of the much lighter molar mass of said pressuring gas 41, its diminish of density with height will be significantly lower than for the heavier gasified working fluid 11, which has a much greater molar mass. In this way, with a mixture of a heavy gasified working fluid 11 and a significantly much lighter pressuring gas 41 in the widening ascending conduit 40 it will be possible to achieve a much greater height, H2, between level L0 (at the evaporator unit 20) and level L2 (at the condenser units 30), than if only a much heavier gasified working fluid 11 was present in the widening ascending conduit 40.

The proposed closed-loop thermodynamic circuit 10 of the present disclosure is capable of generating great amount of power from natural occurring heat sources and heat sinks, for which the difference in temperature between them is very small (temperature gradient), what makes them impracticable of being used in conventional thermal power plants because the small gradient in temperature, and just suitable of a very small power output in not conventional ones, as in current ocean thermal energy conversion—OTEC, plants. Per example, it will be possible to use warm tropical shallow sea water (that typically exceeds 20° C. throughout the year) as a heat source in order to gasify sulfur hexafluoride in the evaporator unit 20 at 20° C.; and cold deep sea water (typically under 5° C.) in order to liquefy it in the condenser unit 30 at 5° C. Under said conditions, sulfur hexafluoride, SF6, will gasify with a vapor pressure of 21.08 Bar (P0) at 20° C. (T1) at level L0 in the evaporator unit 20, and will liquefy at level L2 in the condenser unit 30 when the pressure (P2) is equal or greater than 14.47 Bar, that is the vapor pressure of sulfur hexafluoride at 5° C. (T0) (FIGS. 1C and 1D). For that, and based on the barometric law formula, the difference in height H2 between level L0 at the evaporator unit 20 and level L2 at the condenser unit 30 should not be higher than about 550 meters, that will be the approximate height (H2) at which a column of gasified sulfur hexafluoride (with an initial vapor pressure in its lowest level of 21.08 Bar) will exert a pressure of about 15 Bar at level L2 at the condenser unit 30 (FIGS. 1A and 1B). In the other hand, if a much lighter pressuring gas 41 mixes with said sulfur hexafluoride (the gasified working fluid 11) in the widening ascending conduit 40, and for the same given conditions of gasification and liquefaction described above, said difference in height H2 could be up to 2,500 meters if nitrogen, formulated N2, is used as the pressuring gas 41 (height at which its pressure will be lightly over the needed 15 Bar; FIGS. 1A and 1B), and of several thousands of meters more (than for nitrogen) if helium, formulated He, is used has the pressuring gas 41 (FIGS. 1A and 1B).

Please refer back to FIG. 2A. The pressure P3 exerted by the descending column of liquefied working fluid 12 (detail V3, depicted in FIG. 2D) at level L3 of the power extraction apparatus 50, will be the sum of pressure P2, which is the pressure that the gasified working fluid 11, or the mixture of gasified working fluid 11 and the pressuring gas 41, exerts on top of the liquefied working fluid 12 at level L2 in the condensers 30, plus the weight of said column of descending liquefied working fluid 12, that, with a height of H3, is contained between level L2 at the condensers 30 and the level L3 of the power extraction apparatus 50. With the illustrated formula of Power is possible to estimate the gross power capability ('Pw') of the system by multiplying the pressure value P3 ('P') by the flow value ('Q'). The density in the descending column of liquefied working fluid 12 will increase with depth, as the pressure increases by the accumulation of weight, because the increase in height of the standing column of liquefied working fluid. Following are some values of density for Sulfur Hexafluoride at 5° C., under different pressures (measured in Bar): 1,523.3 Kg/m$^3$ at 15 Bar; 1629 Kg/m$^3$ at 100 Bar; 1,704 Kg/m$^3$ at 200 Bar; and 1,759 Kg/m$^3$ at 300 Bar.

The pressuring gas 41 will be also helpful in achieving the highest possible pressure P2 in the condenser unit 30, what in turn will increase the pressure P3 at the level L3 of the power extraction apparatus 50.

During operation, and despite of the use of thermal insulating materials, the thermal energy conversion plant will inevitably exchange heat with the environment, in a way that the warmer than the environment components of the plant (as per example the evaporator 20, and the widening ascending conduit 40) will give heat to the colder environment; and the colder than the environment parts (as per example the condenser 30, and the descending conduit 90) will gain heat from the warmer environment. Because of the great size of the thermal energy conversion plant, different parts of the plant could be exposed to different environments and temperatures. In order to correct said losses or increases in heat in the thermal energy conversion plant, the closed-loop thermodynamic circuit will exchange heat with a heat source and a heat sink. Said exchange of heat could be done in a direct (FIG. 3A) or indirect way. Several systems are proposed in this disclosure for an indirect way of exchange of heat between the closed-loop thermodynamic circuit and the heat source and heat sink; namely: through a thermal circuit (FIG. 3B); through an auxiliary heating and auxiliary cooling thermal circuits (FIG. 3C); through a combination of a thermal circuit and an auxiliary heating and auxiliary cooling thermal circuits (FIG. 3D); and through a thermal circuit and a heat pump (FIG. 3E). These proposed systems could be combined in other different ways in other preferred embodiments of the invention, not depicted in this disclosure.

Figure 3A:
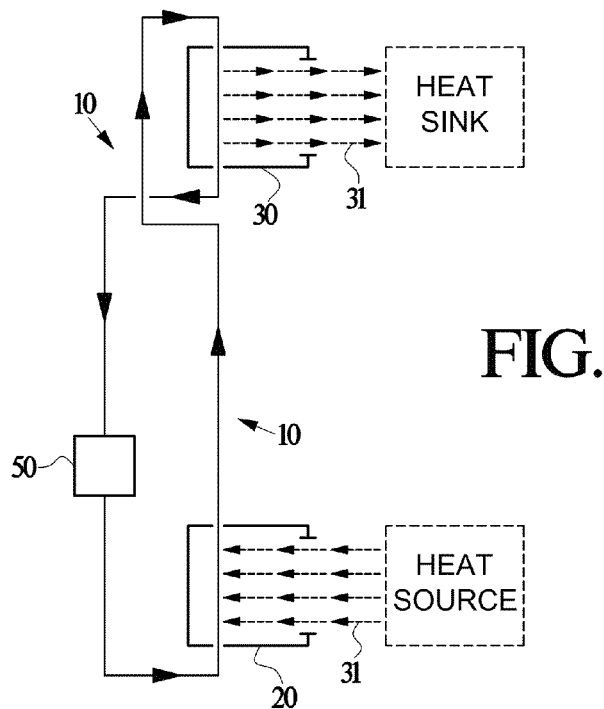
FIG. 3A is a block diagram wherein is depicted a direct transfer of heat between the evaporator and the condenser of the closed-loop thermodynamic circuit with, a heat source and a heat sink, respectively, according to a first exemplary scheme of operation of the present disclosure.

Please, refer to FIG. 3A that depicts a first exemplary scheme of operation of the invention, wherein there is a direct transfer of heat 31 between a heat source and the evaporator 20 of the closed-loop thermodynamic circuit 10, and between the condenser 30 and a heat sink, what could be done per example by locating in direct contact the evaporator 20 with the heat source (per example, warm tropical shallow sea water or a gas/coal furnace), and the condenser 30 in direct contact with the heat sink (cold deep sea water or cold atmosphere, per example).

Figure 3B:
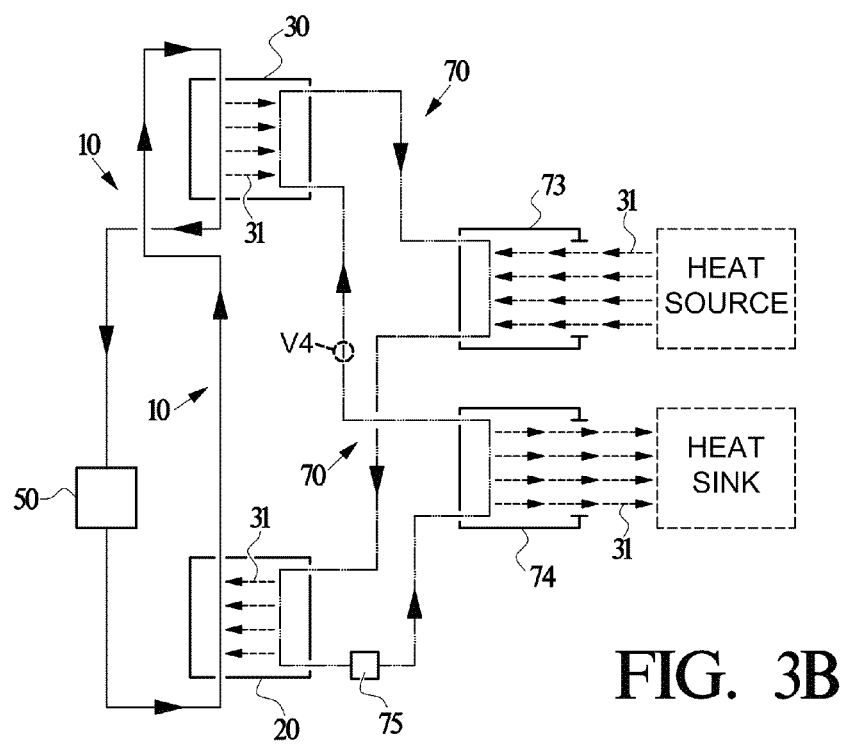
FIG. 3B is a block diagram wherein through a thermal circuit heat is drove back from the condenser into the evaporator, in order to recycle it, rectifying the thermal circuit its temperature by direct transfer of heat with the heat source and the heat sink, according to a second exemplary scheme of operation of the present disclosure.
Figure 3C:
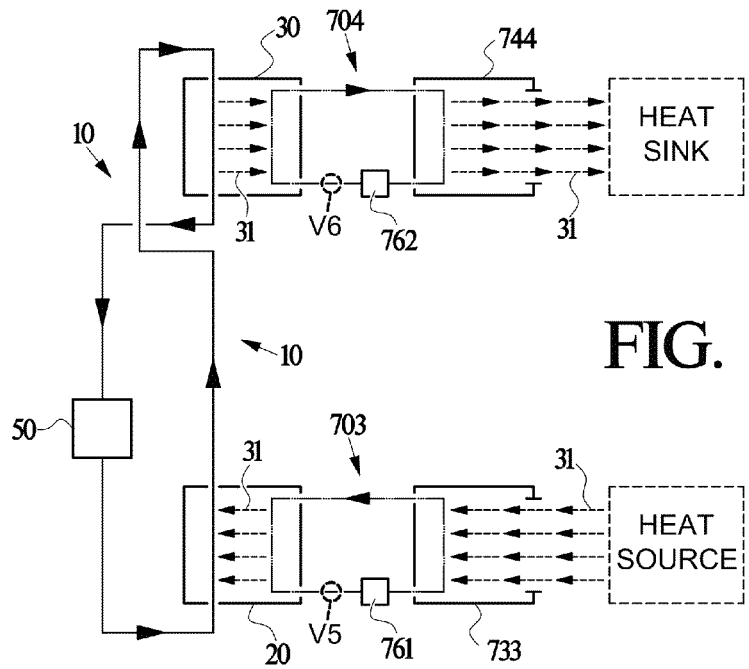
FIG. 3C is a block diagram wherein there is an indirect transfer of heat between the evaporator and the heat source through an auxiliary heating thermal circuit; and between the condenser and the heat sink through an auxiliary cooling thermal circuit, according to a third exemplary scheme of operation of the present disclosure.
Figure 3D:
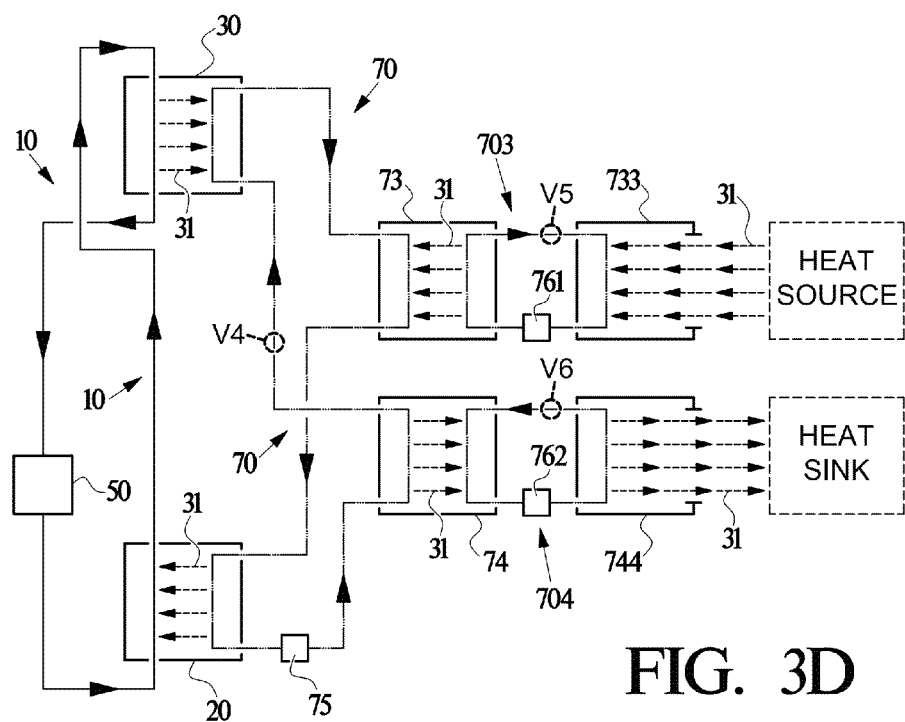
FIG. 3D is a block diagram wherein through a thermal circuit heat is drove back from the condenser into the evaporator, in order to recycle it, being an indirect transfer of heat between the thermal circuit and the heat source through an auxiliary heating thermal circuit; and between the thermal circuit and the heat sink through an auxiliary cooling thermal circuit, according to a fourth exemplary scheme of operation of the present disclosure.
Figure 3E:
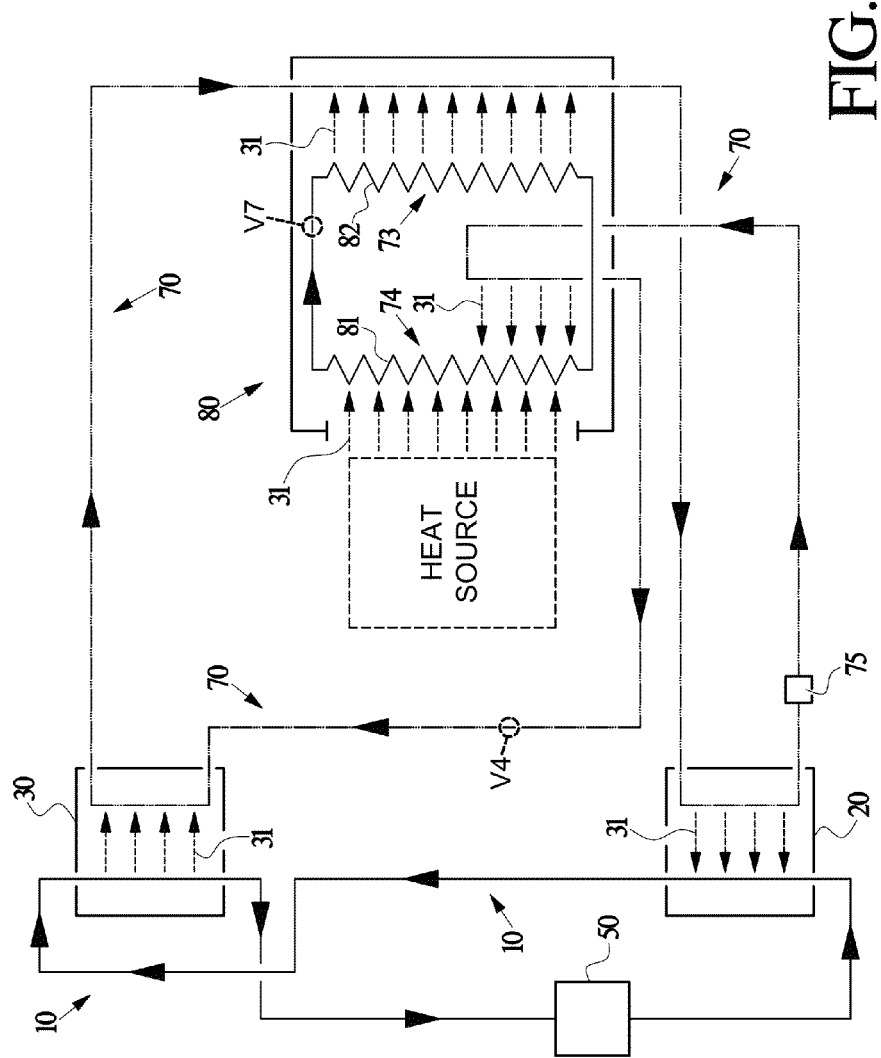
FIG. 3E is a schematic illustration wherein through a thermal circuit heat is drove back from the condenser into the evaporator, in order to recycle it, rectifying the thermal circuit its temperature by means of a heat pump, through which also heat is divert from a heat source into the thermal circuit, according to a fifth exemplary scheme of operation of the present disclosure.
Figure 3F:
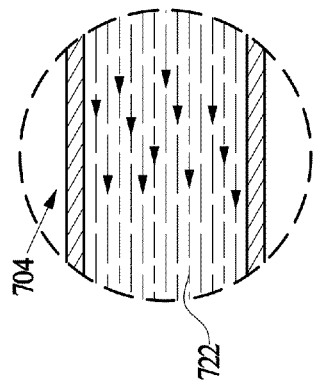
FIG. 3F is a schematic illustration depicting the detail V4 from FIGS. 3B, 3D and 3E, wherein the thermal fluid is illustrated flowing through the thermal circuit, according to the present disclosure.

Please, refer to FIGS. 3B and 3F wherein is depicted a second exemplary scheme of operation of the invention, wherein by means of a thermal fluid 71 (detail V4, depicted in FIG. 3F) which flows through a thermal circuit 70 by the action of a pump 75, heat 31 is drove back from the condenser 30 to the evaporator 20 in order to recycle it, rectifying said thermal fluid 71 its temperature by direct transfer of heat 31 from a heat source through a heating unit 73, which is in direct contact with said heat source; and by direct transfer of heat to a heat sink through a cooling unit 74, which is in direct contact with said heat sink. The use of a thermal circuit will be preferred in order to avoid depletion of natural and renewables heat sources, and in order to reduce the rate of heat transferred into the environment (heat or thermal pollution) when using natural and renewables heat sinks. The thermal circuit will be explained with greater detail in FIGS. 4A and 4B.

Figure 3H:
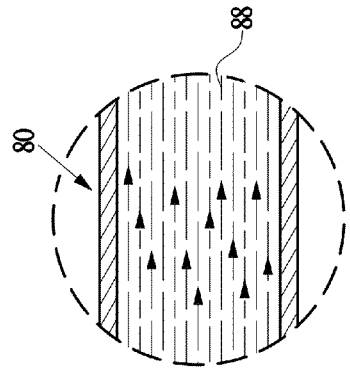
FIG. 3H is a schematic illustration depicting the detail V6 from FIGS. 3C and 3D wherein the auxiliary cooling thermal fluid is illustrated flowing through the auxiliary cooling thermal circuit, according to the present disclosure.
Figure 3G:
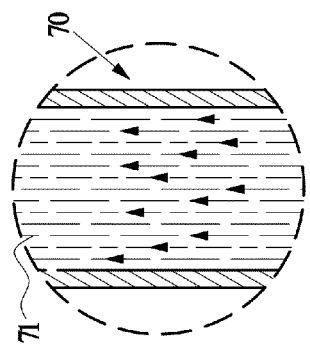
FIG. 3G is a schematic illustration depicting the detail V5 from FIGS. 3C and 3D wherein the auxiliary heating thermal fluid is illustrated flowing through the auxiliary heating thermal circuit, according to the present disclosure.

Please, refer to FIG. 3C which depicts a third exemplary scheme of operation of the invention, wherein there is an indirect transfer of heat 31 from a heat source into the evaporator 20, through an auxiliary heating thermal circuit 703; and from the condenser 30 into a heat sink through an auxiliary cooling thermal circuit 704. The auxiliary heating thermal circuit 703 comprises: an auxiliary heating thermal fluid 721 (detail V5, depicted in FIG. 3G); at least one pump 761; at least one auxiliary heating unit 733, in contact with the heat source; at least one pipe that connects the auxiliary heating unit 733 with the evaporator 20 of the closed-loop thermodynamic circuit 10; and at least one pipe that connects the evaporator 20 back with the auxiliary heating unit 733, closing the circuit; wherein the auxiliary heating thermal fluid 721 flows through the auxiliary heating thermal circuit 703 by the action of the pump 761, driving heat 31 from the heat source into the evaporator 20. The auxiliary cooling thermal circuit 704 comprises: an auxiliary cooling thermal fluid 722 (detail V6, depicted in FIG. 3H); at least one pump 762; at least one auxiliary cooling unit 744, in contact with the heat sink; at least one pipe that connects the auxiliary cooling unit 744 with the condenser 30 of the closed-loop thermodynamic circuit 10; and at least one pipe that connects the condenser 30 back with the auxiliary cooling unit 744, closing the circuit; wherein the auxiliary cooling thermal fluid, 722 flows through the auxiliary cooling thermal circuit 704 by the action of the pump 762, driving heat 31 from the condenser 30 into the heat sink through the auxiliary cooling unit 744.

Please, refer to FIGS. 3D, 3F, 3G and 3H which depict a fourth exemplary scheme of operation, wherein, there is a combination of the thermal circuit 70 depicted in FIG. 3B and the auxiliary heating 703 and auxiliary cooling 704 thermal circuits depicted in FIG. 3C. As in the second exemplary scheme of operation, by means of the thermal fluid 71 (detail V4, depicted in FIG. 3F) that flows through the thermal circuit 70, heat 31 is drove back from the condenser 30 into the evaporator 20 in order to recycle it, but rectifying in this fourth exemplary scheme said thermal fluid 71 its temperature by indirect exchange of heat 31 with a heat source and a sink through the auxiliary heating 703 and auxiliary cooling 704 thermal circuits, respectively. For that, as in the third exemplary embodiment, the auxiliary heating thermal fluid 721 (detail V5, depicted in FIG. 3G) flows through the auxiliary heating thermal circuit 703 by the action of the pump 761, transferring heat 31 from the heat source into the heating unit 73, wherein the thermal fluid 71 increases its temperature. In the other hand the auxiliary cooling thermal fluid 722 (detail V6, depicted in FIG. 3H) flows by the action of the pump 762 through the auxiliary cooling thermal circuit 704 transferring the heat 31 gained from the thermal fluid 71 in the cooling unit 74 into the heat sink.

Several devices could perform as heating 73 and cooling 74 units, as per example: a coal-fired or gas-fired furnace and a nuclear reactor (as will be depicted in following embodiments), a cooling tower, and heat exchanger and heat pump. There are many kind state-of-the-art heat exchangers, as per example those made by plates or tubes, which will allow an exchange of heat between the working fluid, the thermal fluid 71, and the auxiliary heating 721 and auxiliary cooling 722 thermal fluids with the heat source and heat sink, without physical contact between fluids (being the heat transferred through the walls of the pipes and plates). In the other hand, there are many types of state-of-the-art heat pumps, as per example compression and absorption heat pumps.

Figure 3I:
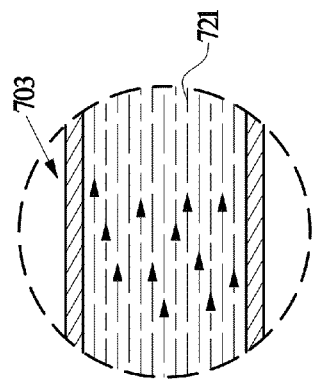
FIG. 3I is a schematic illustration depicting the detail V7 from FIG. 3E, wherein the working fluid of the heat pump is illustrated flowing through said heat pump according to the present disclosure.

Please, refer to FIGS. 3E and 3I which illustrated a fifth exemplary scheme of operation of the invention, wherein as in the depicted second exemplary scheme, by means of a thermal fluid 71 (detail V4, depicted in FIG. 3F) which flows through a thermal circuit 70, heat 31 is drove back from the condenser 30 to the evaporator 20 in order to recycle it, rectifying in this case said thermal fluid 71 its temperature through a compression heat pump 80, wherein by means of the heat pump's working fluid 88 (detail V7, depicted in FIG. 3I) heat 31 is drove from the cold thermal fluid that exits from the evaporator 20 into the warm thermal fluid that exits from the condenser 30. A heat source will provide the extra heat 31 needed in order to recover the system from the heat lost (transferred) into the environment.

In this fifth exemplary scheme of operation, the heat pump 80 works at the same time as the heating 73 and cooling unit 74 for the thermal circuit 70. Depending of the temperature at what the cold thermal fluid (that comes from the evaporator 20) reaches the heat pump 80, the internal working fluid 88 of said heat pump 80 will extract more or less heat 31 from said cold thermal fluid through the evaporator 81 of the heat pump 80, working in this case said cold thermal fluid also as heat source for the system, and diverting said extracted heat 31 into the warm thermal fluid that comes from the condenser 30 through the heat pump's condenser 82, working said warm thermal fluid in this case as heat sink. Hence the evaporator 81 of the compression heat pump 80 will work as the cooling unit 74 of the thermal circuit 70; meanwhile the condenser 82 of said heat pump 80 will work as the heating unit 73.

Heat pumps are well known state of the art devices that divert heat from a source at a lower temperature to another 'sink' or 'heat sink' at a higher temperature. Many of them operating with a coefficient of performance, COP, over 3, what is used to describe the ratio of useful heat movement to work input. In contrast that when using conventional heat exchangers as heating units, when using heat pumps it will be possible to heat the working fluid to a higher temperature than that of the heat source. Higher temperatures will produce higher vapor pressure of the gasifying working fluid in the evaporator 20, what in turns will increase the density and pressure of said gasified working fluid 11 along the widening ascending conduit 40, being possible is this way to reach greater heights (H1 and H2, FIG. 2A) in the closed-loop thermodynamic circuit 10.

The use of the described thermal circuit 70, auxiliary heating 703 and cooling 704 thermal circuits, or a combination of them, will allow to locate the closed-loop thermodynamic circuit 10 far from the heat source and heat sink, because the heat 31 could be drove long distances by the thermal fluid 71, or by the auxiliary heating and cooling thermal fluids (721, 722) from said heat source into the closed-loop thermodynamic circuit 10, and from said closed-loop thermodynamic circuit 10 into the heat sink. Also, the use of said thermal circuits (70, 703, 704) will allow the working fluid to flow with a steady flow through the closed-loop thermodynamic circuit, despite of the variations in temperature of the heat source and heat sink, since the transfer of heat between the thermal fluids and the heat source and heat sink could be regulated through the heating and cooling units (73, 733, 74, 744).

Figure 4A:
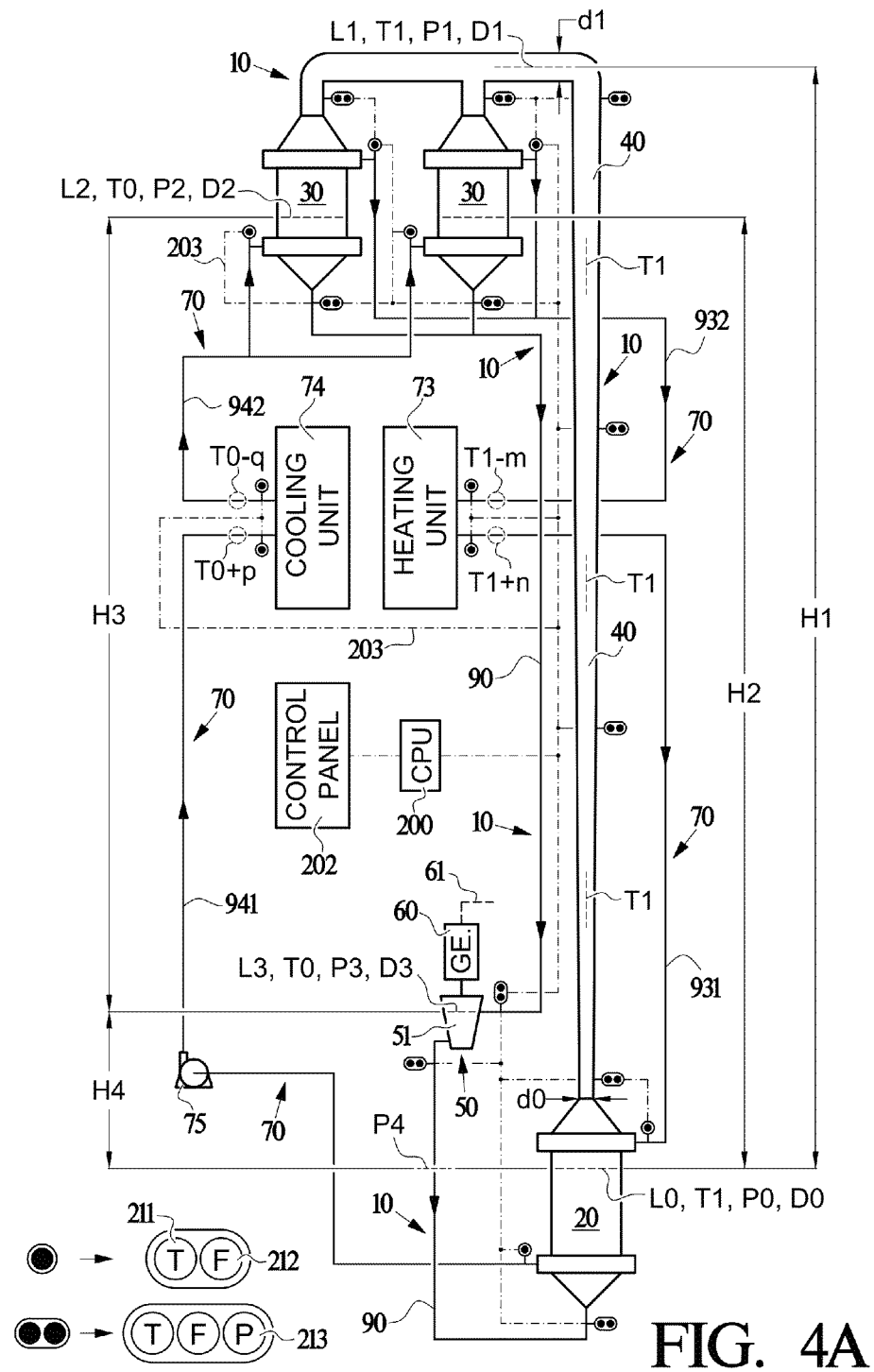
FIG. 4A is a schematic illustration depicting the basic scheme of the invention according to a preferred embodiment in which the power extraction apparatus is a reaction turbine, and in which through a thermal circuit heat is driven back from the condenser into the evaporator, in order to recycle it.
Figure 4B:
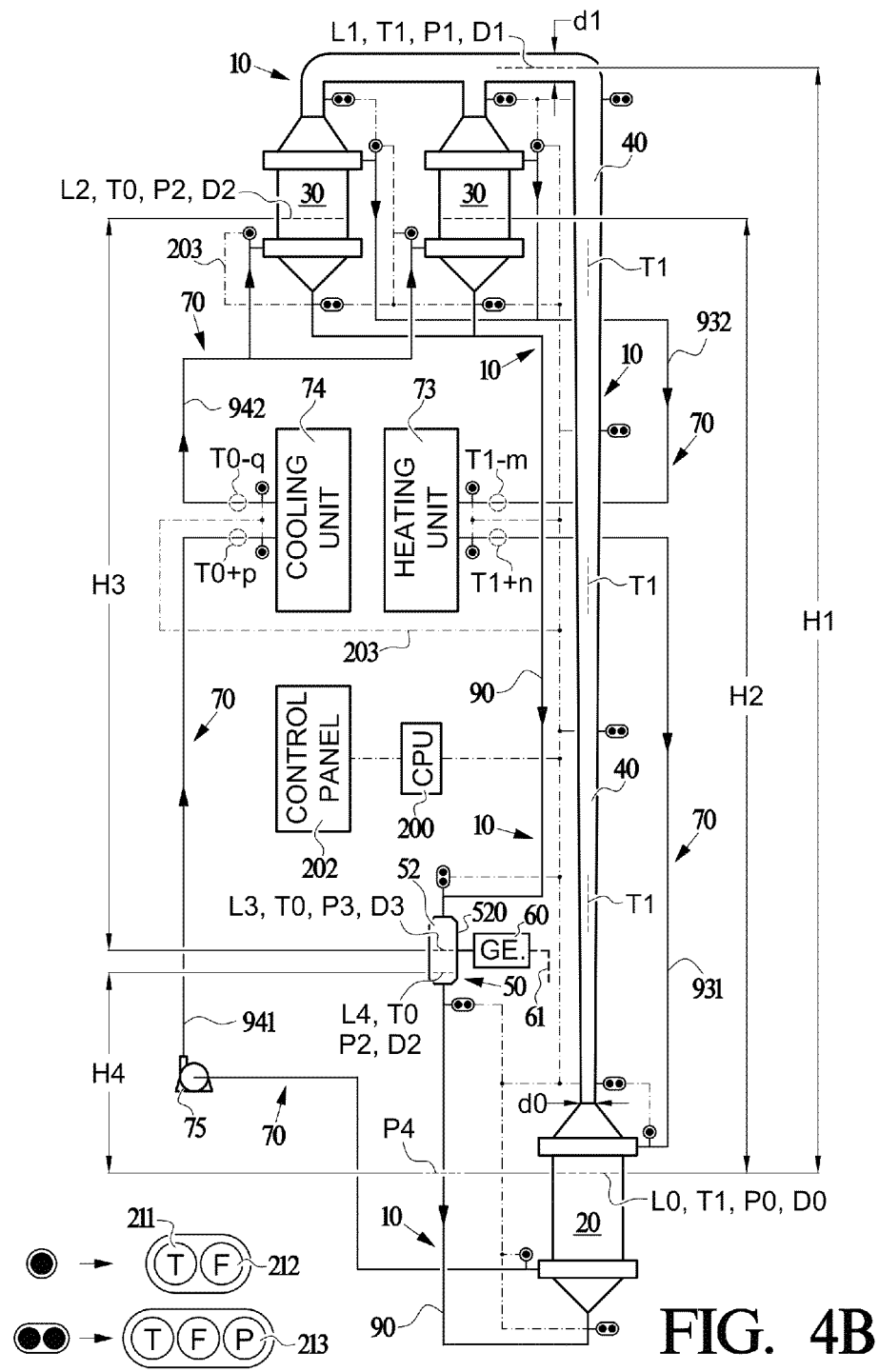
FIG. 4B is a schematic illustration depicting the basic scheme of the invention according to a preferred embodiment in which the power extraction apparatus is an impulse turbine, and in which through a thermal circuit heat is driven back from the condenser into the evaporator, in order to recycle it.

In FIGS. 4A and 4B is illustrated with greater detail a scheme of thermal energy conversion plant wherein through a thermal circuit 70 heat is drove back from the condensers 30 into the evaporator 20 in order to recycle it, as described in the schematics drawings showed in FIGS. 3B, 3D and 3E. The thermal circuit 70 comprises: a thermal fluid; a pump 75; a heating unit 73; a cooling unit 74; a pipe 931 connecting the heating unit 73 with the evaporator 20; a pipe 941 connecting the evaporator 20 with the cooling unit 74; a pipe 942 connecting the cooling unit 74 with the condensers 30; and a pipe 932 connecting the condensers 30 with the heating unit 73, closing the thermal circuit 70. The mode of operation is as follow: The thermal fluid flows through the thermal circuit 70 by the action of the pump 75, entering into the heating unit 73 where the thermal fluid increases its temperature from T1−m to T1+n, and from where the thermal fluid exits entering into the evaporator 20; in the evaporator 20 the liquefied working fluid gasifies at a level L0 after gaining heat from the thermal fluid, increasing its temperature to T1, meanwhile the thermal fluid reduces its temperature from T1+n to T0+p; then the gasified working fluid egresses from the evaporator 20 and ascends through the widening ascending conduit 40 up to the condensers 30 under constant temperature of T1; the thermal fluid exits the evaporator 20 and enters into the cooling unit 74 where reduces its temperature from T0+p to T0-q, and from where flows into the condensers 30; in the condensers 30 the gasified working fluid liquefies after giving heat to the thermal fluid, lowering its temperature to T0, meanwhile the thermal fluid raises its temperature from T0-q to T1-m; from the condensers 30 the thermal fluid flows back again into said heating unit 73, closing the thermal circuit 70; and then the liquefied working fluid 12 falls because gravity under constant temperature of T0 through the descending conduits 90, powering the power extraction apparatus 50, from where the liquefied working fluid flows back into the evaporator 20, completing a self-pumping process, and restarting the cycle.

FIG. 4A represents the basic scheme wherein the power extraction apparatus 50 is a reaction turbine 51, being those turbines acted on by fluid, which changes pressure as it moves through the turbine and gives up its energy; and FIG. 4B represents the basic scheme wherein the power extraction apparatus 50 is an impulse turbine 52, wherein prior to hitting the turbine blades, the fluid's pressure is converted to kinetic energy by a nozzle focused on the turbine, with no pressure change occurring at the turbine blades, pushing the fluid jet the turbine's curved blades which changes the direction of the flow. Newton's third law describes the transfer of energy for reaction turbines, and Newton's second law the one for impulse turbines. In both embodiments, the reaction turbine 51 and the impulse turbine 52 are connected to an electrical generator 60 which will be driven by the motion of the turbine, generating electricity that will be transmitted by an electric transmission cable 61. For long distances said transmission could be done in high-voltage direct current, HVDC.

In FIG. 4A, H4 represents the height between the level L3 of the turbine, and level L0 at the evaporator 20 (that is the level at which the liquefied working fluid gasifies in said evaporator 20), for preferred embodiments in which the arranged turbine is a reaction turbine 51; whereas in FIG. 4B, H4 represents the height between level L4, that is the level at which the liquefied working fluid is collected in the encasement of the impulse turbine 52 (after the liquefied working fluid had acted on the blades of the impulse turbine) and said level L0 at the evaporator 20.

The above mentioned initial pressure P0 at level L0 at the evaporator 20, that is the pressure at what the gasified working fluid exits from the top of the evaporator 20, will push also backwards the column of liquefied working fluid that flows from the turbine into the evaporator 20; in addition to pressure P0, the viscosity of the liquefied working fluid 12, and its friction with the internal walls of the pipes, and the internal walls of the tubes or plates of the evaporator 20, will produce a resistance that will oppose the flowing of the liquefied working fluid 12 into said evaporator 20.

Please, refer again to FIG. 4A, where in a preferred embodiment the turbine is a reaction turbine 51, that is hermetically encased. In order to overcome the initial pressure P0 at the top of the evaporator 20, and the frictional and viscosity resistances, the reaction turbine 51 is located in a level L3 higher than the level L0 where the liquefied working fluid gasifies in the evaporator 20, with a difference in height H4 that will create a column of descending liquefied working fluid that will be contained between these two levels, L3 and L0, and that because weight will produce a pressure P4 over the liquefied working fluid contained below the level L0, what will let to overcome the initial pressure P0 and frictional and viscosity resistances, assisting the liquefied working fluid in flowing into the evaporator 20. In other preferred embodiments the reaction turbine 51 could be designed in order to leave a residual amount of pressure P3 in the outflow that exits the turbine that will help to overcome the mentioned initial pressure P0 and frictional and viscosity resistances, what will allow to locate the reaction turbine 51 on a level (L3) closer or equal to level L0.

Please refer again to FIG. 4B, where the turbine in this preferred embodiment is an impulse turbine 52, that is also hermetically encased, and located in a level L3 higher than that of the evaporator 20, wherein part of the jet of liquefied working fluid that flows through the nozzles will gasify in the turbine's encasement 520 after acting on the turbine's blades, with a temperature about T0 and a vapor pressure about P2 as in the condensers 30. After acting on the turbine the liquefied working fluid is collected at a level L4 in the turbine encasement 520, at a height H4 higher than that of the level L0, what as in the example of the reaction turbine 51, will create a column of descending liquefied working fluid that will be contained between these two levels, L4 and L0, that also because gravity will produce a pressure P4 over the liquefied working fluid contained below the level L0, that added to the pressure of about P2 of the gasified working fluid contained in the turbine encasement 520, will let to overcome the initial pressure L0, as the friction and viscosity resistances as well, assisting the liquefied working fluid in flowing into the evaporator 20.

In FIGS. 4A and 4B, the closed-loop thermodynamic circuit 10 and the thermal circuit 70 had been provided with measuring and monitoring units, to monitor the temperature 211, flow 212 and, pressure 213 of the working fluid and thermal fluid. The measured and monitored data is sent through a data transferring circuit 203, which could also be wireless (not shown in the drawings), to a central processing unit 200, CPU, from which the plant could be operated on automated mode; or on manual mode, by connecting said central processing unit 200 to a control panel 202.

Please, refer to FIGS. 5A, 5B, 5C, 5D-1, 5D-2, 5E, 5F, 5G, 5H, 5I, 5J and 5K that depict a first embodiment of the invention, wherein the thermal energy conversion plant is located in a floating platform. This first embodiment had been designed for tropical warm seas, wherein the warm shallow sea water has a notable difference in temperature with the cold deep sea water, and wherein the warm shallow sea water 83 will be the heat source, and the cold deep sea water 84 will be the heat sink.

This first embodiment had been provided with a thermal circuit 70 through which the closed-loop thermodynamic circuit 10 gains heat from the warm shallow tropical sea water 83 (heat source), and through which gives heat to the cold deep sea water 84 (heat sink). The heating 73 and cooling 74 units of the thermal circuit 70 will be of the type of plate heat exchanger, in which the fluids are exposed to a much larger surface area than in conventional heat exchangers, what improves the transfer of heat.

The thermal fluid will be demineralized water, because its low viscosity, abundant natural occurrence, null toxicity, and good thermal conductivity value, 0.58 k·W/(m·K) at 25° C. Algaecides and anticorrosion additives could be added to the demineralized water in order to assure a good performance through the thermal circuit 70. Any other fluid with good thermal conductivity, and low viscosity, could be used as well.

The floating platform comprises a floating vessel 103 wherein are located four condensers 30, four heating 73 and four cooling 74 units, eight pumps 75 for the pumping of thermal fluid through the thermal circuit 70, four pumps 783 for the intake of warm shallow sea water 83, and four pumps 784 for the intake of cold deep sea water 84. Also the floating vessel contains the central processing unit, CPU, 200 that is connected to a control panel, CP 202 through which the floating thermal energy conversion plant could be manually operated.

The floating vessel 103 is connected through a flexible joint 107 with a vertical descending high-pressure resistant submergible vessel 104 in which is contained the widening ascending conduit 40. The lowest end of said vertical descending submergible vessel 104 is connected with a high-pressure resistant submergible vessel 102 that contains the evaporator 20. In this first preferred embodiment of the invention the vessel 102 of the evaporator 20 in being suspended from the floating vessel 103 by high-strength synthetic fiber ropes 106 in order to make lighter the floating platform. In other preferred embodiments the synthetic fiber ropes could be substituted by chains or wire ropes as well; or even by a rigid structure, per example, made with metal and concrete. Two descending thermal-isolated pipes 90 connect the condensers 30 with the evaporator 20, closing the circuit. Two high-pressure resistant submergible vessels 105 are connected to said descending pipes 90, at a level higher than that of the evaporator 20 but far below than that of the condensers 30, containing each submergible vessel a reaction turbine 51 connected to an electrical generator 60. For this preferred embodiment all the vessels are provided with a thermal-isolating layer 101 in order to reduce the exchange of heat between the plant and the environment.

The floating vessel 103 contains also four external filters 771, which work as warm shallow sea water 83 collectors, being each of them connected through a pipe 933 to a water pump 783 which injects the warm shallow sea water 83 into a second filter 781 before entering into the heating units 73. In the heating units 73, the filtered warm sea water 83 gives heat through the plates of the thermal exchanger to the thermal fluid, that flows through the thermal circuit 70 from the condensers 30 into said heating units 73, by the action of the eight pumps 75. The sea water is double filtered before entering the heat exchangers in order to avoiding that big particles and impurities could clog the flow between the plates of said heat exchangers (73 and 74). After giving heat to the thermal fluid in the heating units 73 the warm shallow sea water 83 returns to the sea through a pipe 934 and a group of exits 981 that are located in the bottom level of the floating platform 103. Each of these exits is provided with an electrically operated valve 991 that is operated by the central processing unit, CPU, 200 which regulates the exiting flow, creating a variable force or impulse, as a part of the dynamic position system, DP, 205 that will be lately explained. The temperature of the shallow sea water that exits the heating units 73 is slightly lower than the temperature of the shallowest sea water 83. In order to avoid mixing the colder exiting water with the warmer water of the sea surface, the exits 981 are located at the bottom of the floating vessel 103, where the surrounding lawyer of sea water has a slightly lower temperature than the shallowest sea water.

Figure 5A:
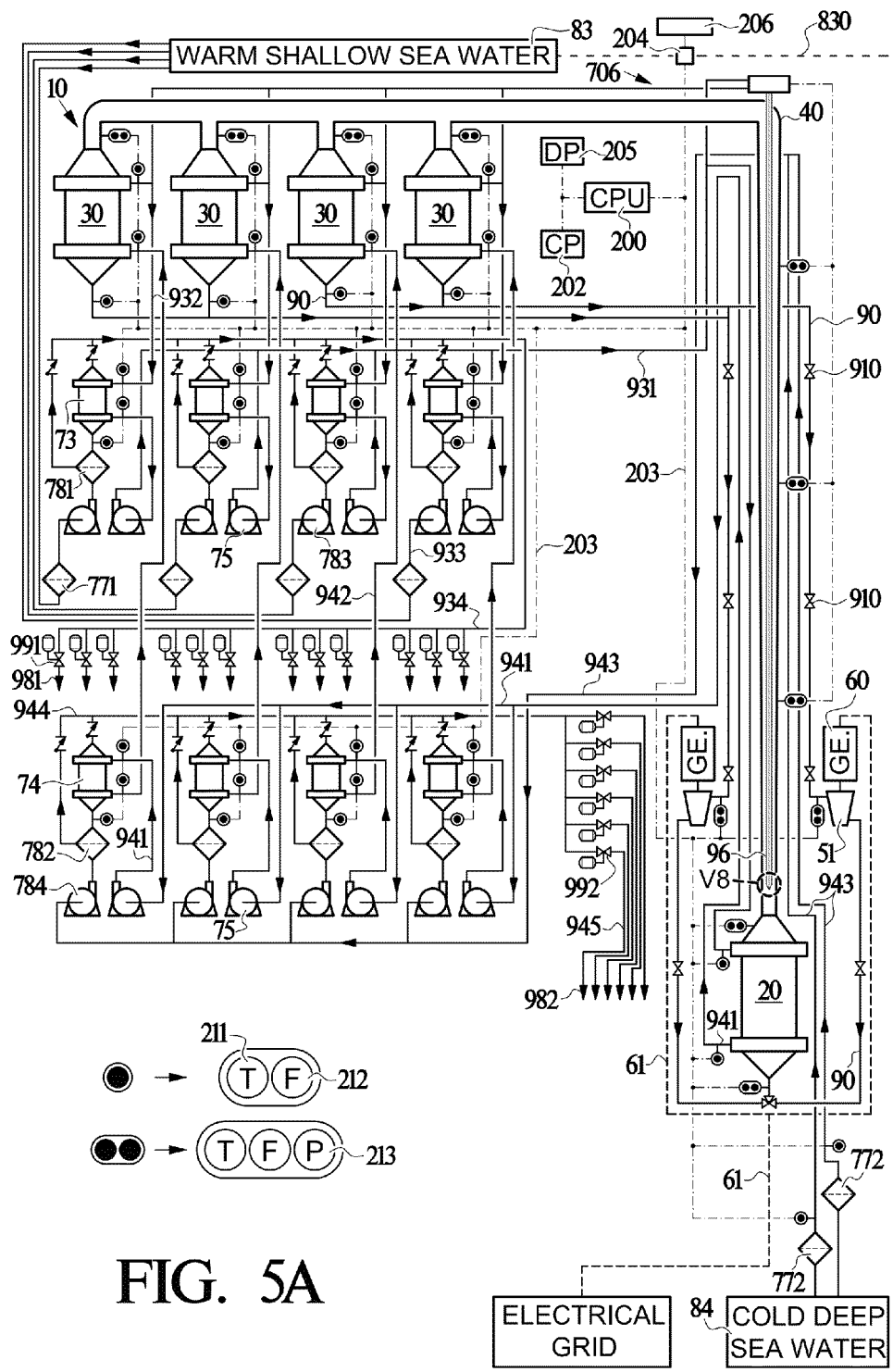
FIG. 5A is a schematic illustration showing a first embodiment.
Figure 5B:
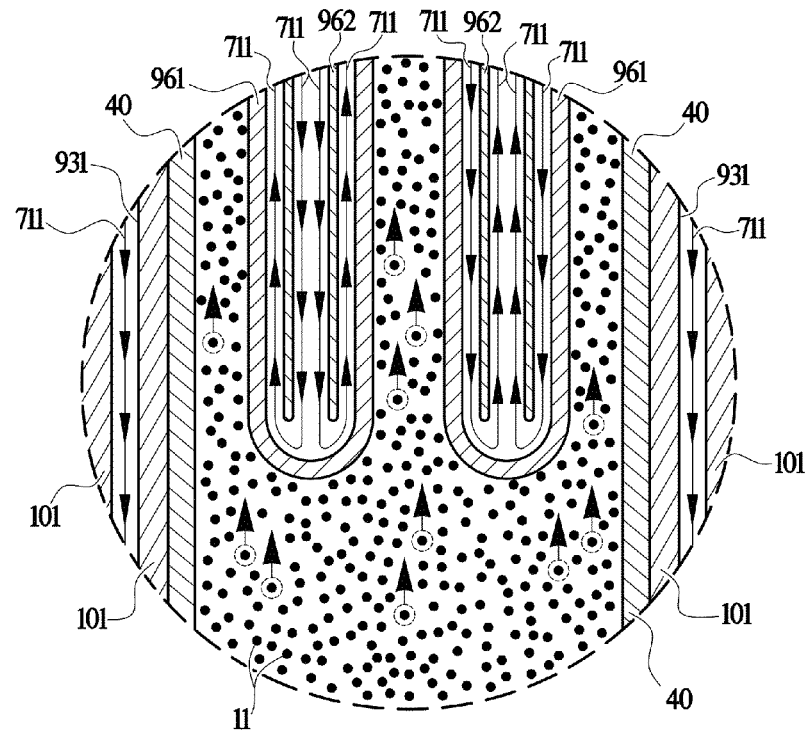
FIG. 5B is a schematic illustration of the detail V8 from FIG. 5A, wherein a section of the widening ascending conduit is depicted, showing the gasified working fluid ascending through the said ascending conduit.
Figure 5C:
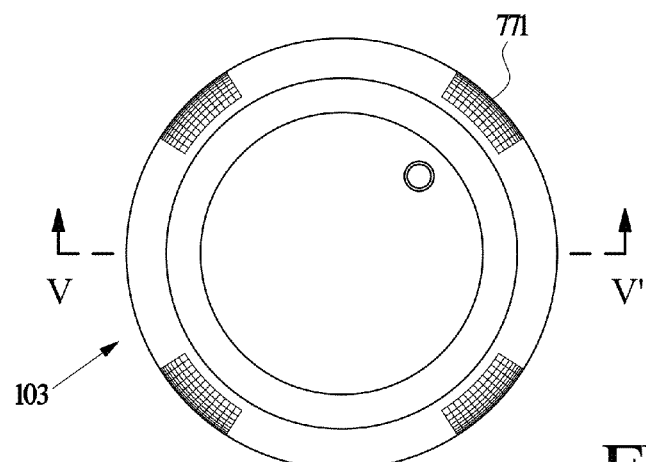
FIG. 5C is a top view of the first embodiment.
Figures 1, 5D:
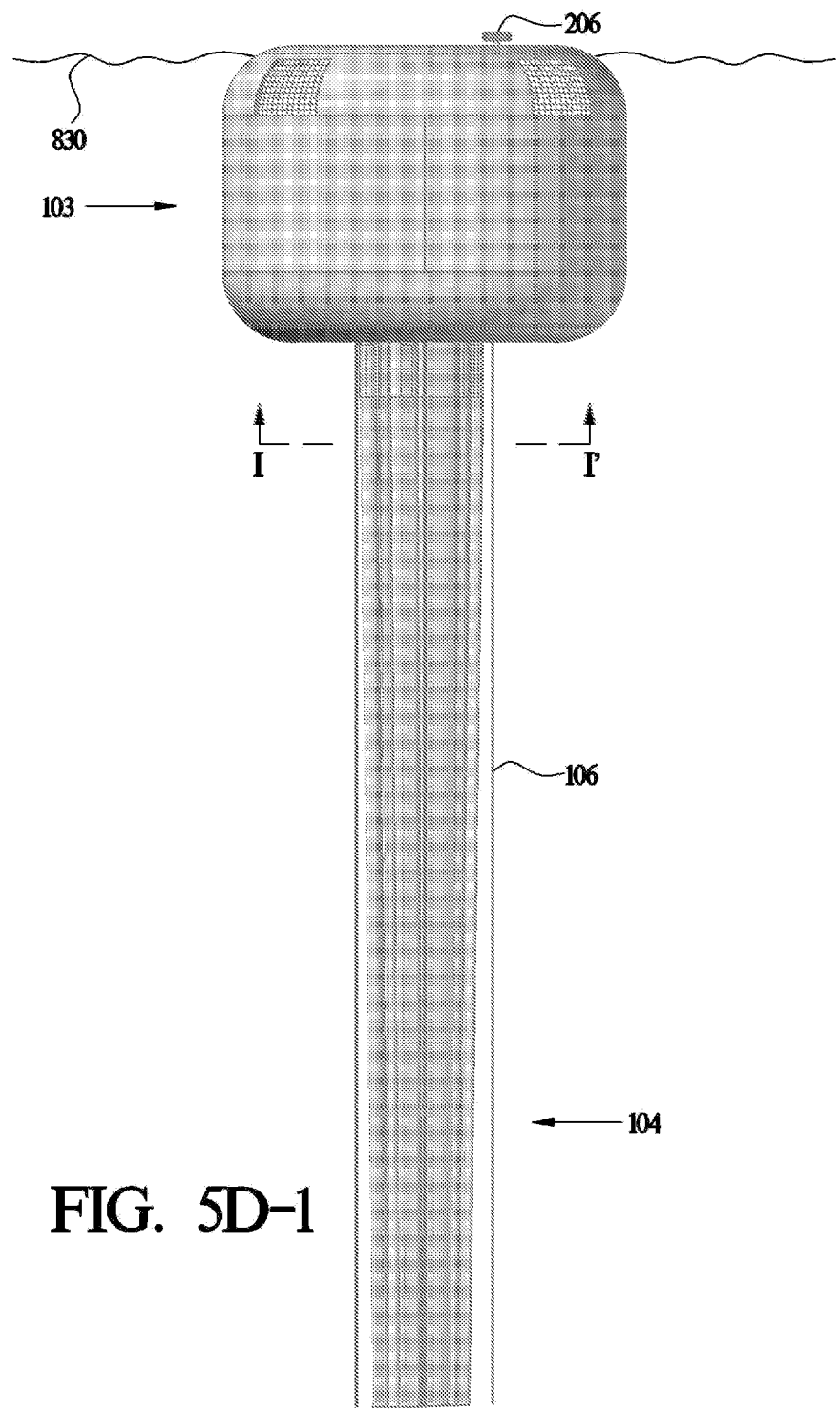
FIGS. 5D-1 and 5D-2 are a side view of the first embodiment.
Figures 2, 5D:
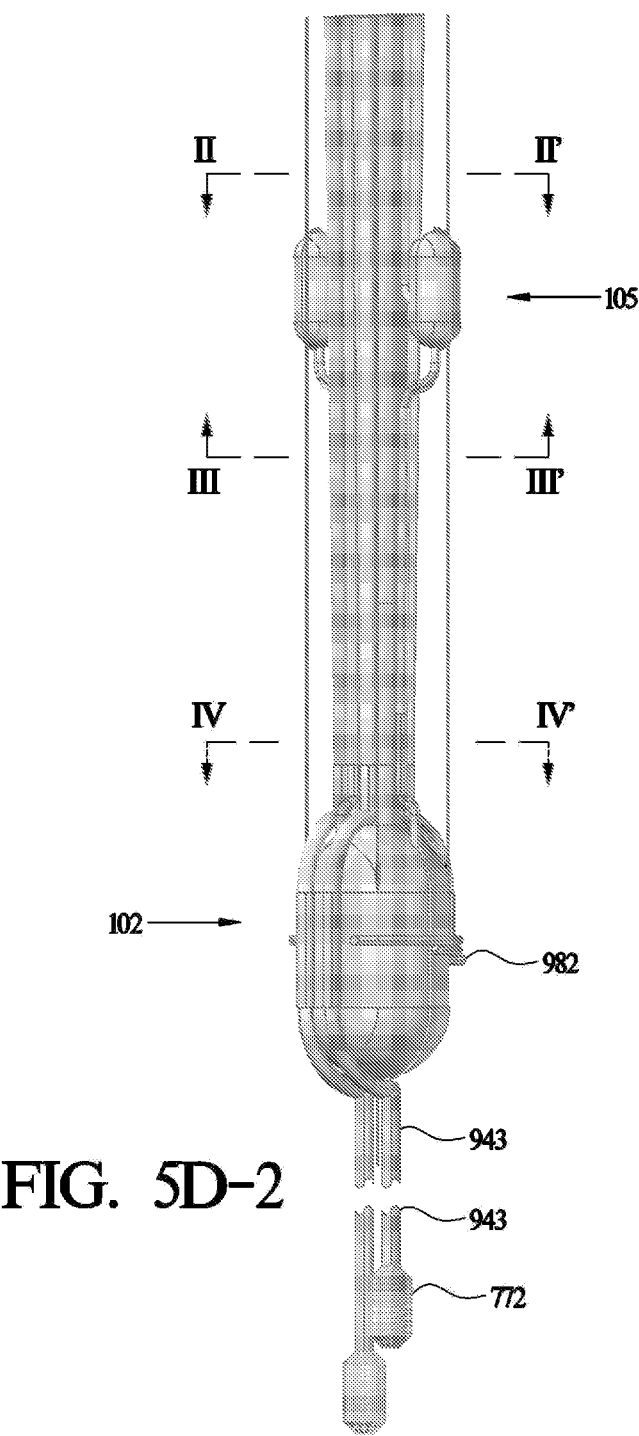
Figure 5G:
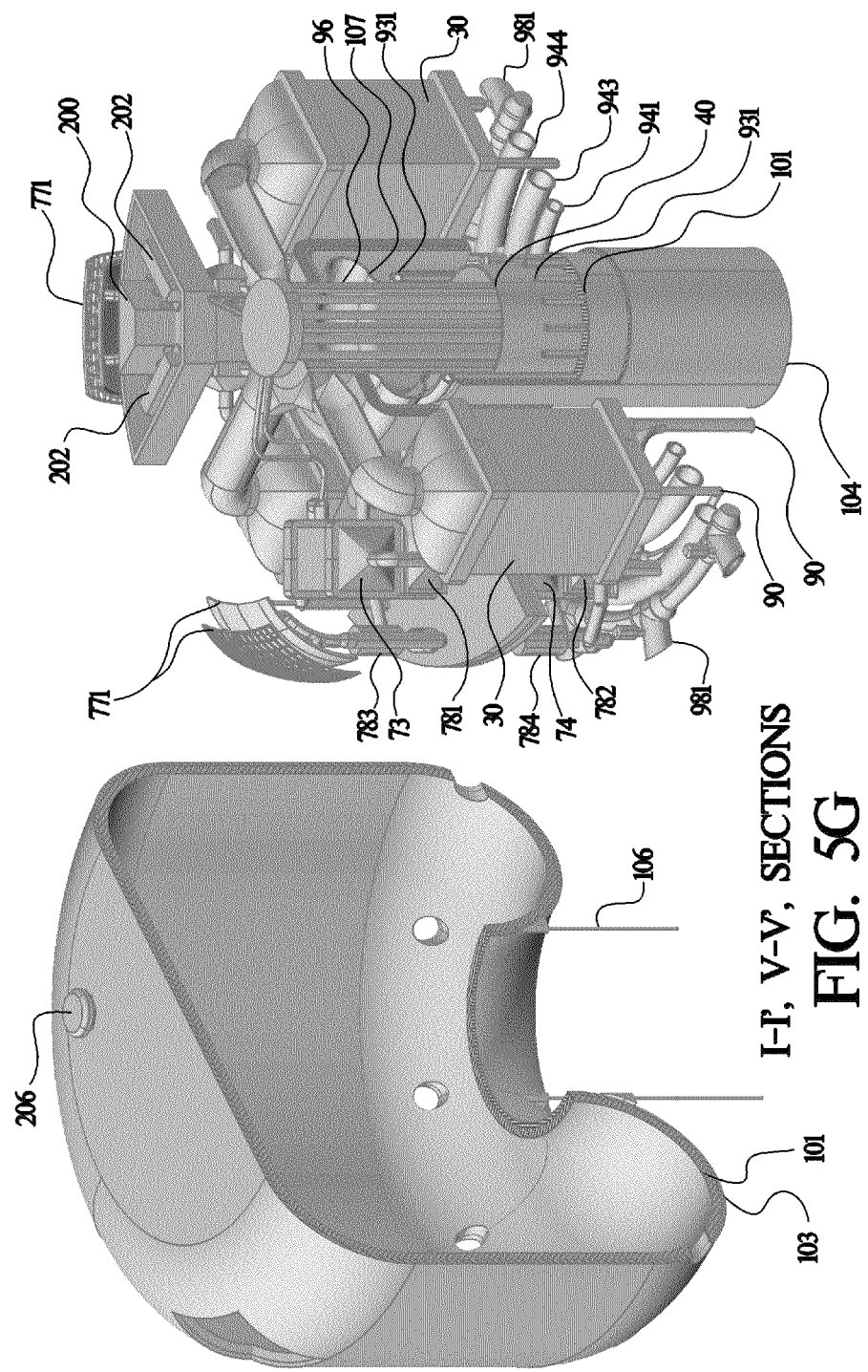
Figure 5H:
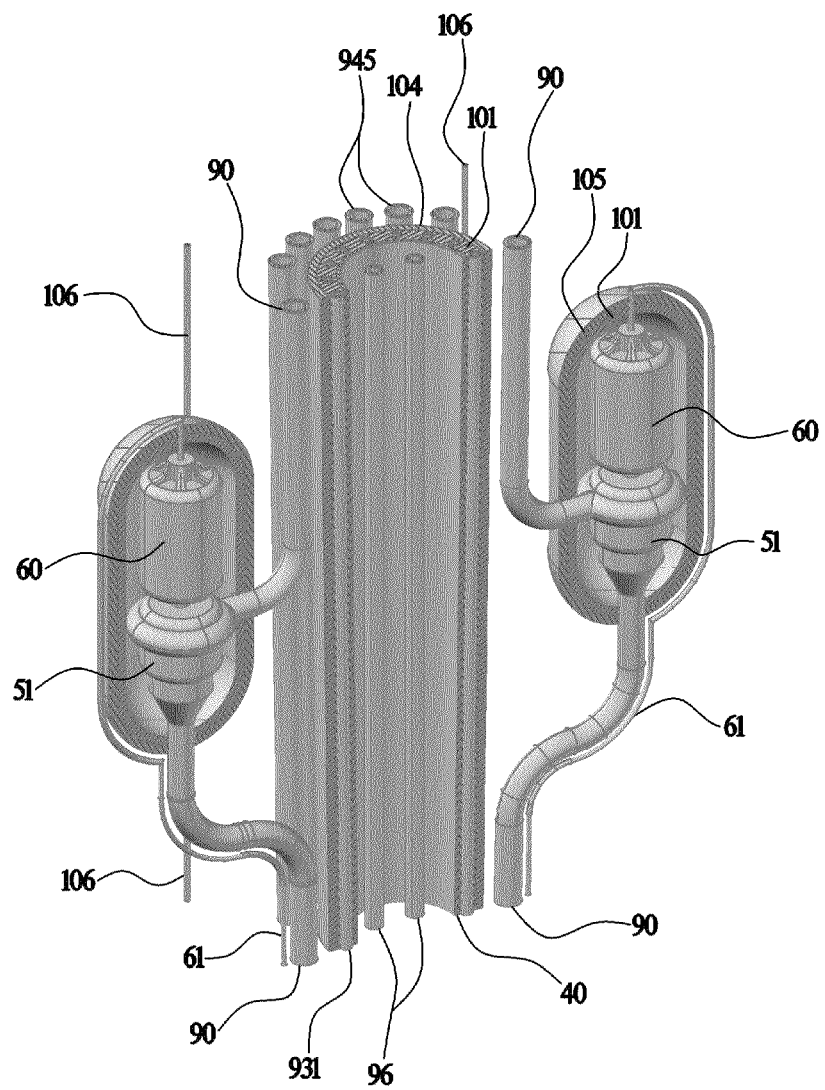
FIG. 5H is a three-dimensional view in perspective of the submergible vessel of the turbine and generator under sections II-II', III-III', and V-V'.
Figure 5I:
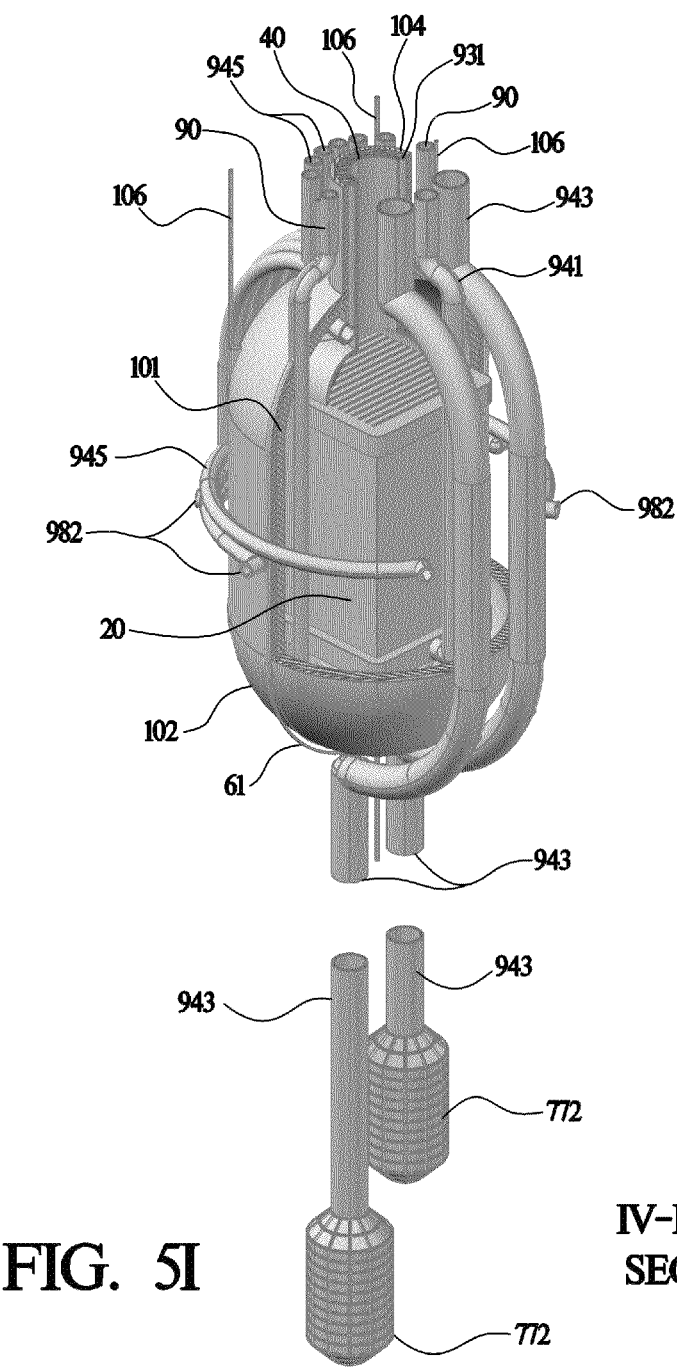
FIG. 5I is a three-dimensional view in perspective of the submergible vessel of the evaporator under sections IV-IV', and V-V'.

After exiting the heating units 73, the warm thermal fluid 711 will head downwards to the evaporator 20 through a group of pipes 931 disposed through the thermal-isolating lawyer 101 of the vertical descending high-pressure resistant submergible vessel 104, surrounding the external wall of the ascending conduit 40 (detail V8, depicted in FIG. 5B).

On the other hand, the cold thermal fluid 712 that exits the evaporator 20 will head upwards to the cooling units 74 where will give heat to the cold deep sea water 84 that flows through two thermal-isolated pipes 943, by the action of four water pumps 784. Before entering into the cooling units 74 the cold deep sea water 84 had been also double filtered by a first 772 and a second 782 filters. After exiting the cooling units 74 the cold thermal fluid 712 flows toward the condensers 30, where gains heat from the gasified working fluid 11 that enters into said condensers 30 from the widening ascending conduit 40, cooling and liquefying it. Then the thermal fluid exits the condensers 30 flowing back through a group of pipes 932 into the heating units 73, closing and restarting the cycle. The cold sea water that exits from the cooling units 74 is collected by a common pipe 944 that is connected to a flow control unit composed by a group of six valves 992 electrically operated, which divides the flow from the common pipe 944 into six individual pipes 945 that descend in parallel to the vertical descending submergible vessel 104, from the base of the floating vessel 103 down to the submergible vessel 102 of the evaporator 20, being these valves 992 also operated by the central processing unit, CPU, 200 as a part of the dynamic position system, DP 205. After passing through the cooling units 74, the returning cold deep sea water has raised slightly its temperature when compare with the cold deep sea water 84, so the exits 982 are located at a level higher than that from where the cold deep sea water 84 was taken, where the lawyer of sea water has a slightly higher temperature.

A dynamic position system, DP, is an estate of the art computer controlled system to automatically maintain a vessel's position and heading by using her own propellers and thrusters. Position reference sensors, combined with wind sensors, motion sensors and gyro compasses, provide information to the computer pertaining to the vessel's position and the magnitude and direction of environmental forces affecting its position. In this embodiment the propellers and thrusters are being substituted by the water pumps use to inject shallow and cold sea water into the system, and the exiting flow will be used as the propulsive thrust. The dynamic position system, DP, 205, under the information obtained from the current meter 204 and the meteorological station 206, will control the exiting flow of sea water through the exits (981, 982), increasing, decreasing or ceasing the flow through each of them, giving to the floating vessel 103 and the submerged vessel 102 of the evaporator 20 motion in one or another direction.

Inside of the widening ascending conduit 40 are disposed a group of thermal pipes 96 which function is to keep a constant temperature in the widening ascending conduit 40, and replace the heat that, despite the thermal-isolating protection layer 101, could pass from the warm widening ascending conduit 40 into the cold deep sea environment that surrounds the vertical descending submergible vessel 104. Each of those thermal pipes 96 is double-walled, and through them flow warm thermal fluid 711 in two opposite directions. Please, refer to FIG. 5B wherein is depicted the detail V8 (from FIG. 5A) of the widening ascending conduit 40, wherein is shown how the internal wall 962 of the thermal pipes 96 ends before reaching the bottom of the external wall 961, in a way that when the descending warm thermal fluid 711 reaches the bottom of the thermal pipe 96, it returns upwards thought the other side. In order to optimize the distribution of heat in the interior of the ascending conduit 40, is disposed that through half of the thermal pipes 96 the warm thermal fluid 711 will flow downwards through the exterior part of the thermal pipe 96 (flowing through the space between the external 961 and internal 962 walls) and will return upwards flowing thought the internal 962 wall; being the opposite for the other half of the thermal pipes 96. The warm thermal fluid 711 is diverted from the thermal circuit 70 into the thermal pipes 96 through an auxiliary thermal circuit 706.

The liquefied working fluid 12 from every two condensers 20 is collected by one thermal-isolated high pressure resistant pipe 90 that drives the falling liquefied working fluid 12 downwards from the condensers 30 back to the evaporator 20, passing through a reaction turbine 51. Each descending pipe 90 is equipped with a group of high pressure resistant valves 910 that divide the pipe in sections, working as flow controllers, that when closed interrupt the flow of the descending column of liquefied working fluid 12 in order to prevent the loose into the environment of said liquefied working fluid 12 in case of an accidental crack or break of the pipe 90. The liquefied working fluid 12 falls as a column of fluid through the pipes because gravity, increasing its density with depth. The reaction turbines 51 are activated by the potential energy of the falling column of liquefied working fluid 12 that reaches them with a very high pressure, what in turns drive the electrical generators 60, being the electricity generated transmitted to an electrical grid by an electric transmission cable 61.

In order to assure an optimal transfer of heat between the thermal fluid and the warm 83 and cold 84 sea water in the heating 73 and cooling 74 units, the central processing unit, CPU 200 will actuate on the pumps (783, 784) that injects said warm 83 and cold 84 sea waters into the heating 73 and cooling 74 units, increasing or decreasing their flow, what in turns will increase or reduce the rate of heat transfer between the thermal fluid and the warm 83 and cold 84 sea waters through said heating 73 and cooling 74 units.

Figure 5J:
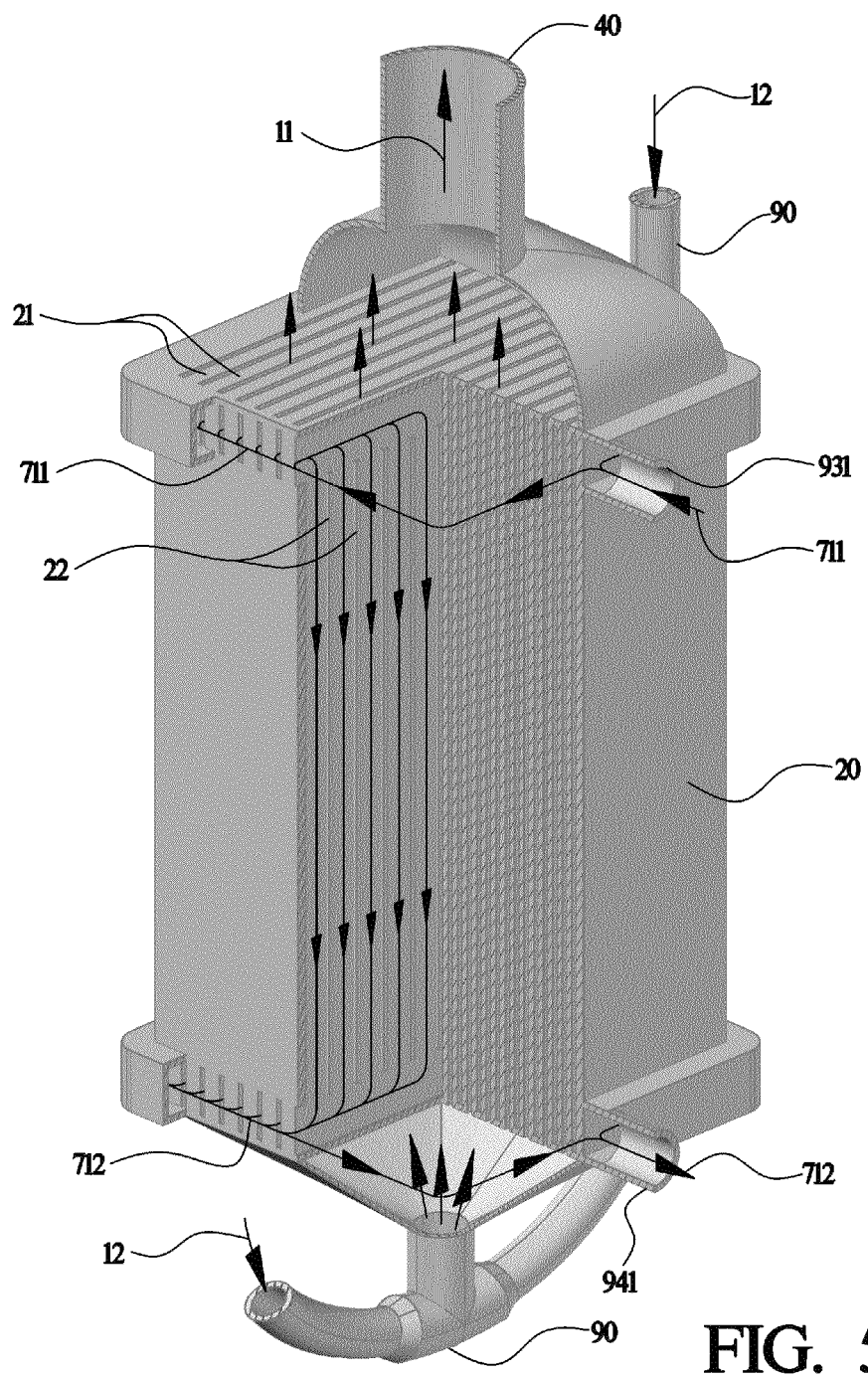
FIG. 5J is three-dimensional schematic illustration showing an example of operation of the evaporator.
Figure 5K:
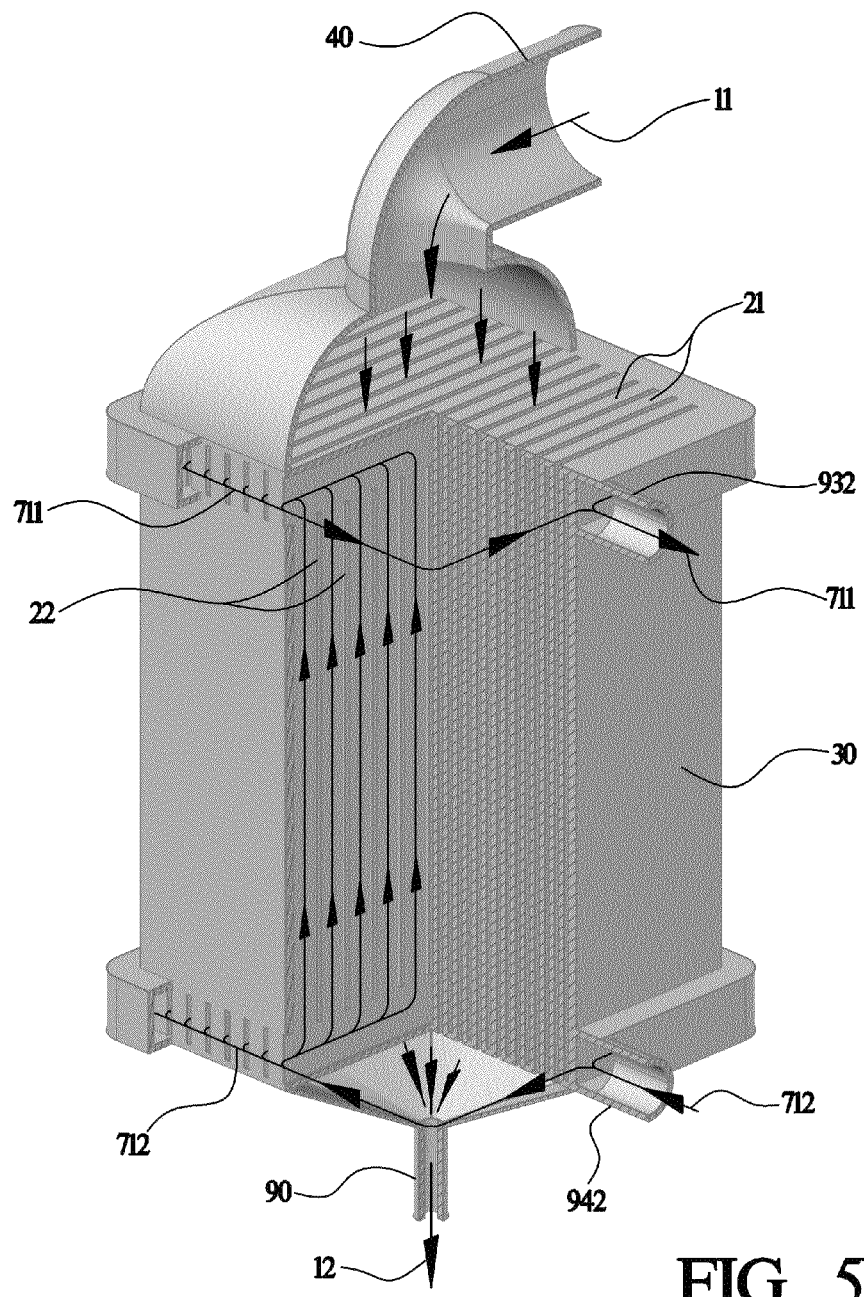
FIG. 5K is three-dimensional schematic illustration showing an example of operation of the condenser.

Please, refer to FIGS. 5J and 5K which are a three-dimensional illustration showing the mode of operation of the evaporator 20 and the condenser 30 respectively. In FIG. 5J the liquefied working fluid 12 comes into the evaporator 20 through the bottom and ascends gaining heat from the descending warm thermal fluid 711, which flows downwards though the parallel plates 21; after gaining the enough heat the liquefied working fluid 12 evaporates and leaves the evaporator 20, ascending gasified 11 through the ascending conduit 40. The condenser 30 depicted in FIG. 5K works in the opposite way, wherein the cold thermal fluid 712 comes into the condenser 30 from the bottom, while the gasified working fluid 11 enters through the top and exits liquefied 12 through the bottom, after giving heat to the ascending cold thermal fluid 712. Because in both, the evaporator 20 and the condenser 30, the warner and cold fluids flow in opposite directions, one end of the thermal exchanger will be warmer than the other. The proposed evaporator 20 and condenser 30 of this embodiment are made by parallel plates because the area for heat exchange is greater, what improves notably the heat transfer between fluids, being said plates made from an aluminum-zinc alloy in order to obtain high strength, great corrosion resistance, and very high thermal conductivity; having also aluminum alloys the advantage of being notably lighter than steel. The plates 21 are provided with longitudinal parallel ribs 22, in a way that when the plates are alienated the ribs 22 are alienated also one next to the other, providing additional strength, and providing a thin space of a few millimeters between plates through which the working fluid and the thermal fluid flow in opposite directions, being the heat transferred without having any physical contact between them. Excepting for the planned entries and exits of the working fluid and thermal fluid, the edges of the plates 21 are welded in order to avoid escapes under the high pressures at which the plant operates.

Figure 6A:
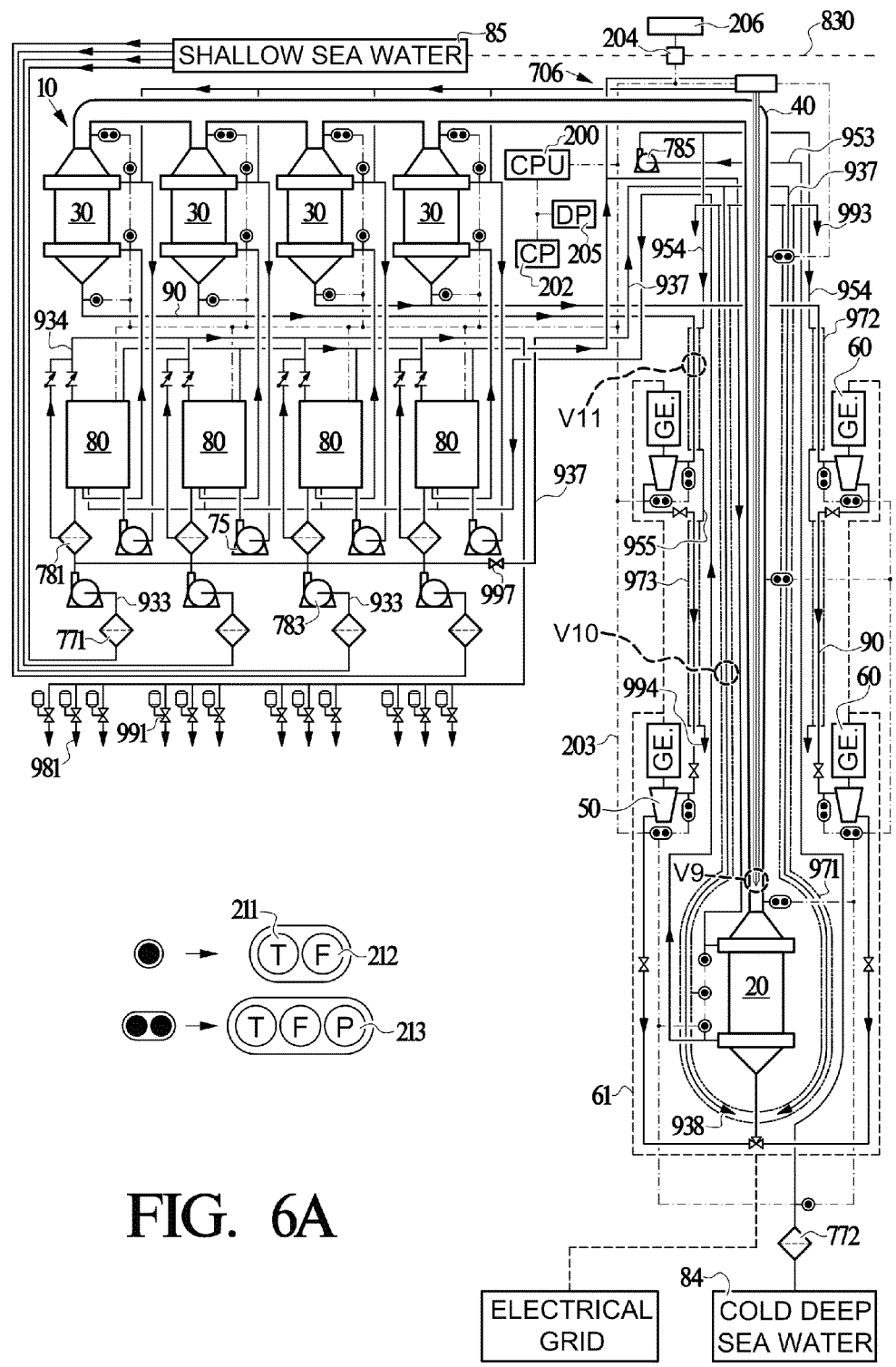
FIG. 6A is a schematic illustration showing a second embodiment.
Figure 6B:
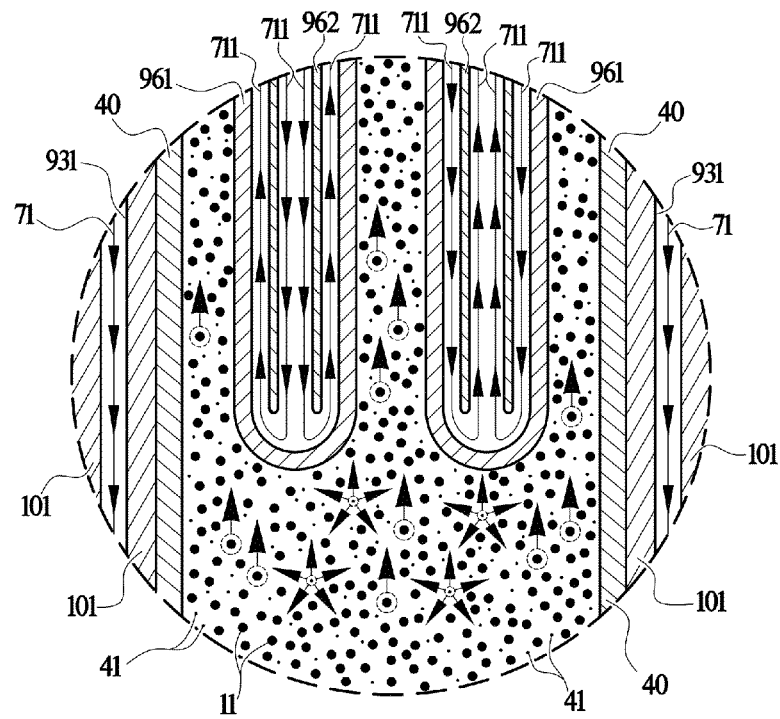
FIG. 6B is a schematic illustration of the detail V9 from FIG. 6A, wherein a section of the ascending conduit is depicted, showing the gasified working fluid ascending through the widening ascending conduit, while mixes with the pressuring gas.
Figure 6F:
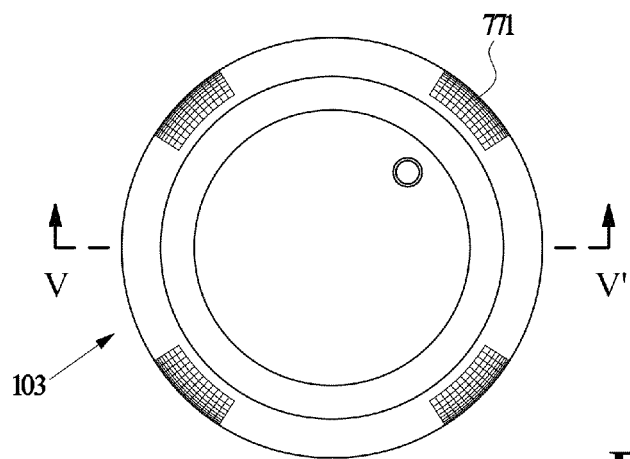
FIG. 6F is a top view of the second embodiment.
Figures 1, 6G, 6H:
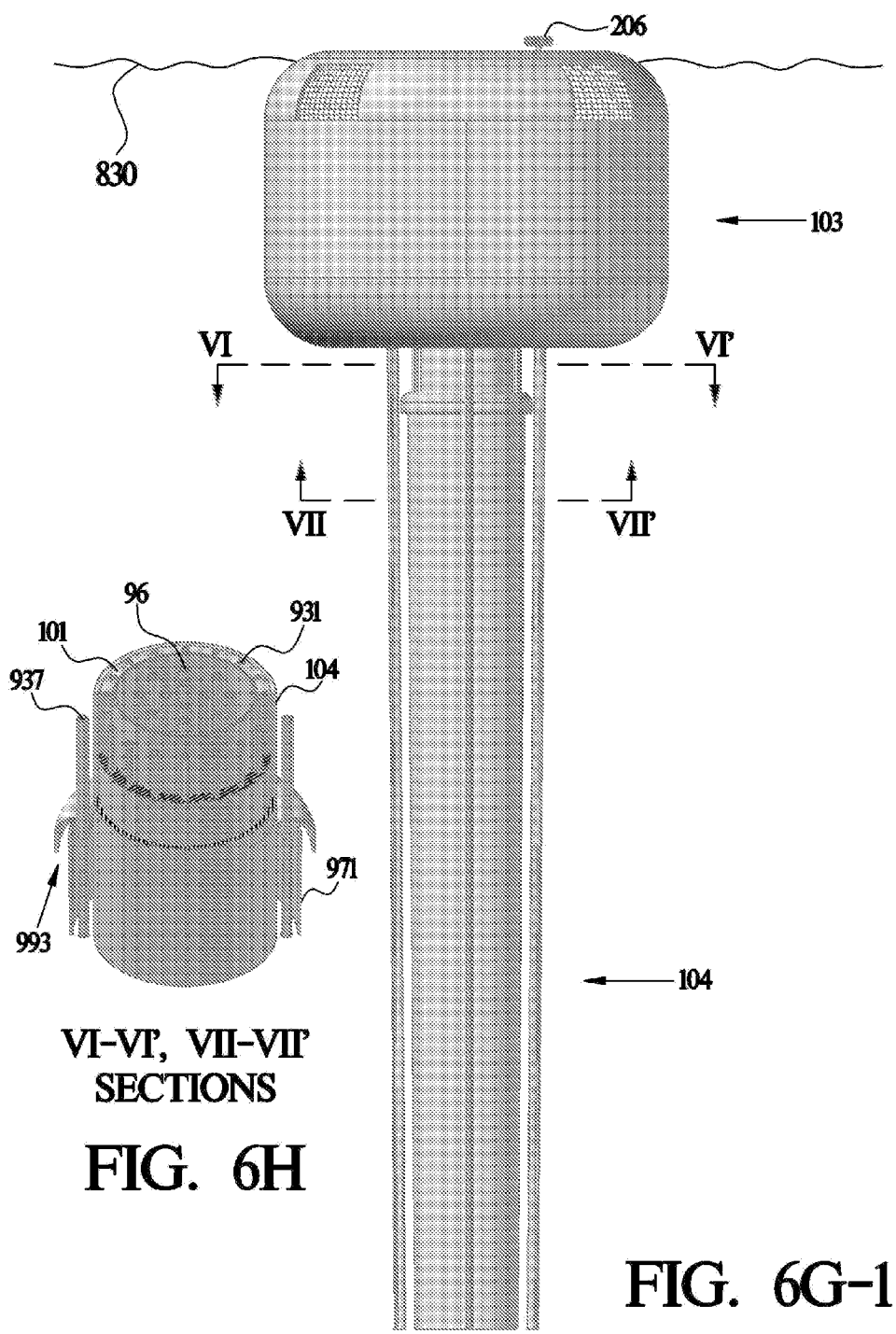
Figures 2, 6G:
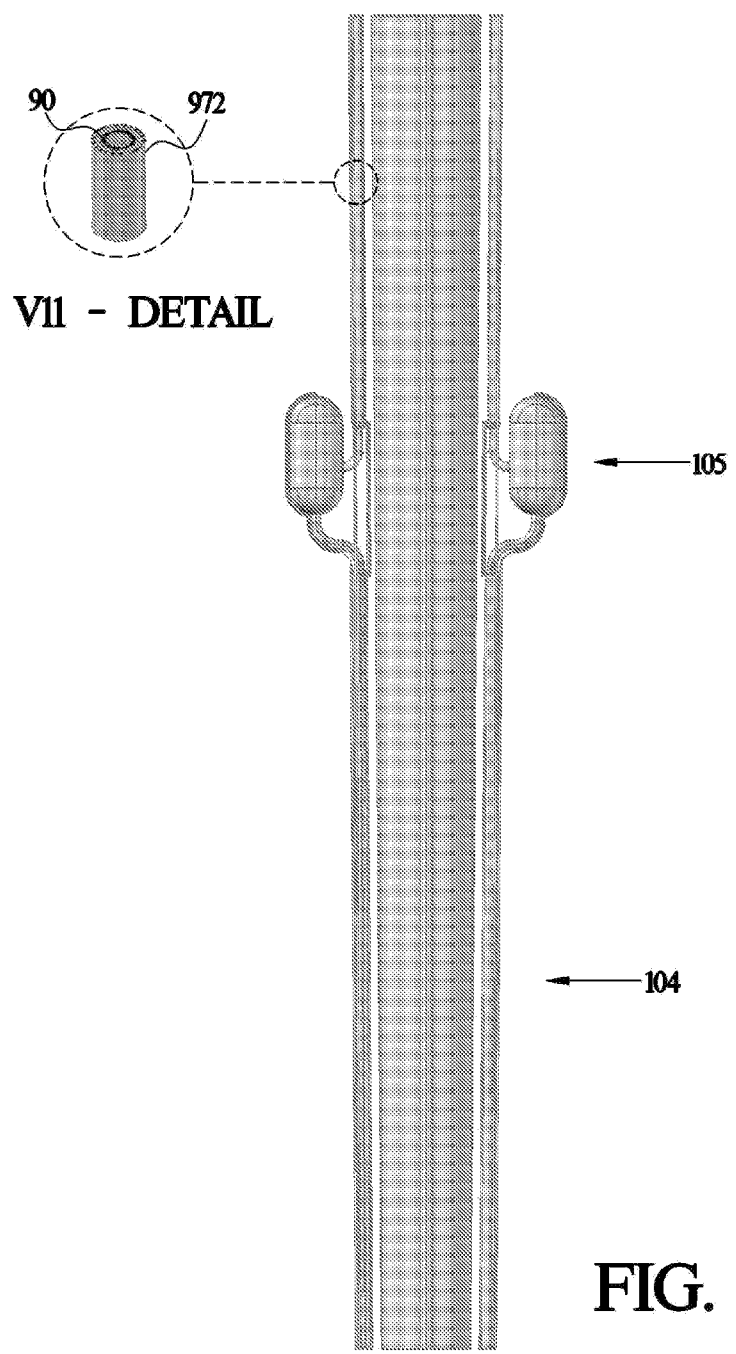
Figures 3, 6G:
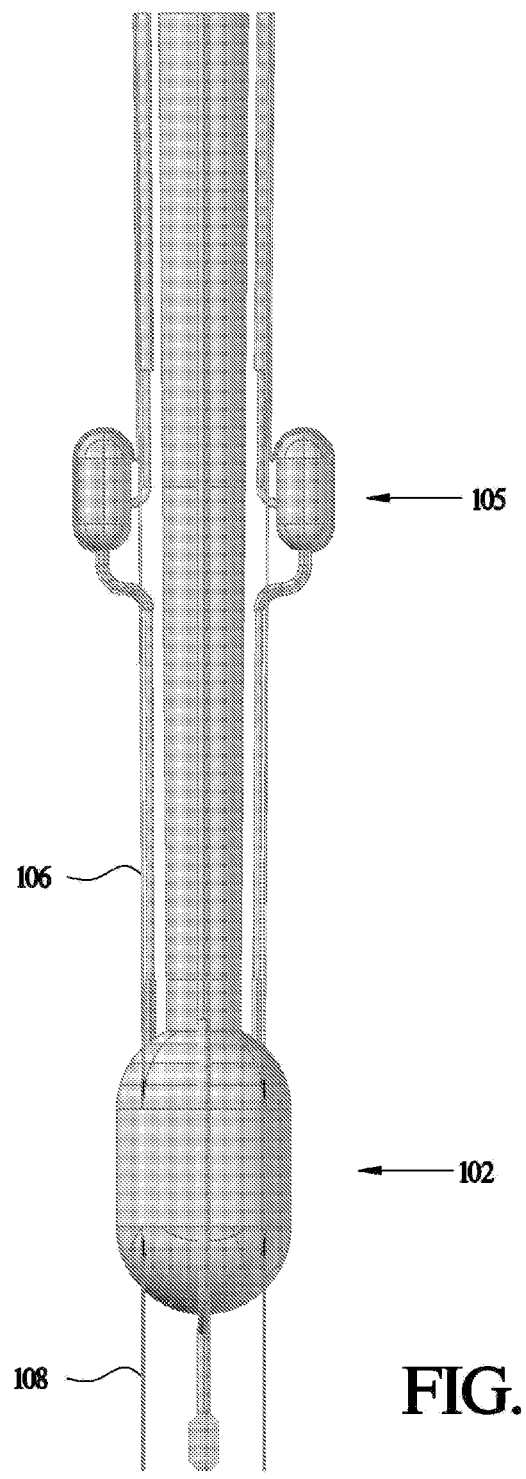

Please refer to FIGS. 6A, 6B, 6F, 6C, 6D, 6F, 6F, 6G-1, 6G-2, 6G-3 and 6H that depict a second embodiment of this invention, wherein, as in the first embodiment, the thermal energy conversion plant is located in a floating platform. This second embodiment had not been designed only for warm seas, but for any other sea wherein the shallow sea water has not necessarily a notable difference in temperature with the deep sea water (as happens in cold seas). In this second embodiment, a pressuring gas 41 had been included in the widening ascending conduit 40 (FIG. 6B). The heating 73 and, cooling 74 units are the condenser 82 and the evaporator 81 units of a compression heat pump 80 (FIG. 6E). The working fluid of this second embodiment gasifies in the evaporator 20 at a higher temperature than that of the sea water 85 (heat source), from which the thermal fluid gains heat through the heat pump 80, recovering the lost heat that transfers from the warmer closed-loop thermodynamic circuit 10 into the colder environment. Because the use of a heat pump in this second embodiment allows the system to work at higher temperatures, the working fluid will gasify in the evaporator 20 at a temperature closer to its critical temperature, obtaining also a vapor pressure closer to its critical pressure at said evaporator 20, what allows obtaining higher heights in the thermodynamic circuit, than those obtained with the first embodiment.

As in the first embodiment, the floating platform comprises a floating vessel 103 wherein in this second embodiment are arranged four condensers 30; four heat pumps 80; four pumps 75 for the pumping of thermal fluid through the thermal circuit 70; four external filters 711 connected through a group of pipes 933 to four internal filters 781, through which sea water 85 is double filtered and injected into the heat pumps 80 by the action of four pumps 783; and a central processing unit, CPU 200, that is connected to a control panel, CP 202. Also said floating vessel 103 is connected with a vertical descending high-pressure resistant submergible vessel 104 wherein the widening ascending conduit 40 is contained, which in turns in connected at its lowest level with a high-pressure resistant submergible vessel 102 wherein the evaporator 20 is arranged. In this second embodiment the vessel 102 of the evaporator 20 has been also suspended from the floating vessel 103 by high-strength synthetic fiber ropes 106, while two descending pipes 90 connect the condensers 30 of the floating platform 103 with the evaporator 20. Four high-pressure resistant submergible vessels 105 are connected to said descending pipes 90 at two different levels, containing each submergible vessel 105 a reaction turbine 51 connected to an electrical generator 60, being the electricity generated transmitted to an electrical grid by electric transmission cables 61. As in the first improvement the floating and submergible vessels are provided with a thermal-isolating layer 101 in order to reduce the exchange of heat with the environment.

Please, refer to FIG. 6E wherein the heat pump 80 is depicted in greater detail. The heat pump 80 works as the heating 73 and cooling 74 unit for the thermal circuit 70. Depending of the temperature at what the cold thermal fluid 712 (that comes from the evaporator 20) reaches the heat pump 80, the internal working fluid of said heat pump 80 will extract more or less heat from the cold thermal fluid 712 through an auxiliary evaporator 811, diverting the extracted heat from the cold thermal fluid 712 into the warm thermal fluid 711 that comes from the condensers 30, through the heat pump's condenser 82 unit. Hence the area of the auxiliary evaporator 811 will work as the cooling unit 74; meanwhile the area of the condenser 82 will work as the heating unit 73. For that purpose the central processing unit, CPU 200, will actuate over the valve 996 that controls the flow of cold thermal fluid 712 that flows into the cooling unit 74 of the heat pump 80, and over the internal valves 999 that regulates the flow of the heat pump's working fluid that flows from the condenser 82 into the auxiliary evaporator 811 by the action of the heat pumps' compressor 89.

Reaction turbines 51 are the kind of turbines selected for this second embodiment, but due to the great height of the thermodynamic circuit 10 (achieved because the use of a pressuring gas 41 in the widening ascending conduit 40) two levels of turbines had been arranged in order to avoid an excess of pressure on a single line of turbines 51 installed at the lowest level.

The floating platform of this second embodiment is anchored to the sea bed by a group of high-strength synthetic fiber mooring ropes 108, meanwhile the floating vessel is governed by a dynamic position system 205, DP, that as in the first embodiment, and under the information obtained from the current meter 204 and the meteorological station 206, will control the exiting flow of sea water through the exits 981 disposed at the bottom level of the floating vessel 103, increasing, decreasing or ceasing said flow through each of them, giving to the floating vessel 103 motion in one or another direction.

Refer again to FIGS. 6A, 6C, 6D, 6G-1, 6G-2, 6G-3 and 6H. When the floating platform is located on warm seas, the vertical descending high-pressure resistant submergible vessel 104, as well as the submergible high-pressure resistant vessel 102 of the evaporator 20, can be provided with an external encasement 971 (detail V10, depicted in FIG. 6C) through which will flow warm shallow sea water 83 that will provide a thermal-insulating lawyer of warm sea water 83 that surrounding the submergible vessels (102 and 104) and in combination with the internal thermal pipes 96 (detail V9, depicted in FIGS. 6B and 6H) of the widening ascending conduit 40, will help to reduce the loose of heat from the thermodynamic circuit 10 into the colder deep sea environment. For that purpose, an auxiliary pipe 937 diverts part of the flow of filtered warm sea water 83 that is collected by the action of the pumps 783, wherein a valve 997, controlled by the central processing unit, CPU 200, will regulate the flow of warm sea water 83 that passes into said auxiliary pipe 937. Then the auxiliary pipe 937 descends through the external encasement 971 to its lowest level, from where the warm shallow sea water emerges through an opening 938, filling the external encasement 971 and ascending through it to its upper level, from where returns back into the open sea through a wide opening 993.

Please, refer to detail V11 from FIG. 6A, and FIG. 6G-1, 6G-2, 6G-3. The upper and medium levels of the descending pipes 90 are also provided with an external encasement (972, 973) through which flows cold deep sea water 84, in order to provide a thermal-insulating lawyer of cold sea water 84 that helps to better thermal-isolated the cold liquefied working fluid from the surrounding warmer shallow sea water. Cold deep sea water is first filtered through a filter 772 located in the deep sea and then lifted by the action of a water pump 785 through an ascending pipe 953. The water pump then injects the cold deep sea water 84 into a second pipe 954 which ends in a first encasement 972 that surrounds the first portion of the descending pipe 90 which connects the condensers 30 with the first level of turbines 51. The cold sea water 84 then exits the first encasement 972 through a third pipe 955 entering into a second encasement 973 that surrounds the middle portion of the descending pipe 90 that connects the first and second levels of turbines 51, exiting said cold sea water 84 through an opening 994 located at the lowest level of the second encasement 973, returning into the cold deep sea.

Figure 7A:
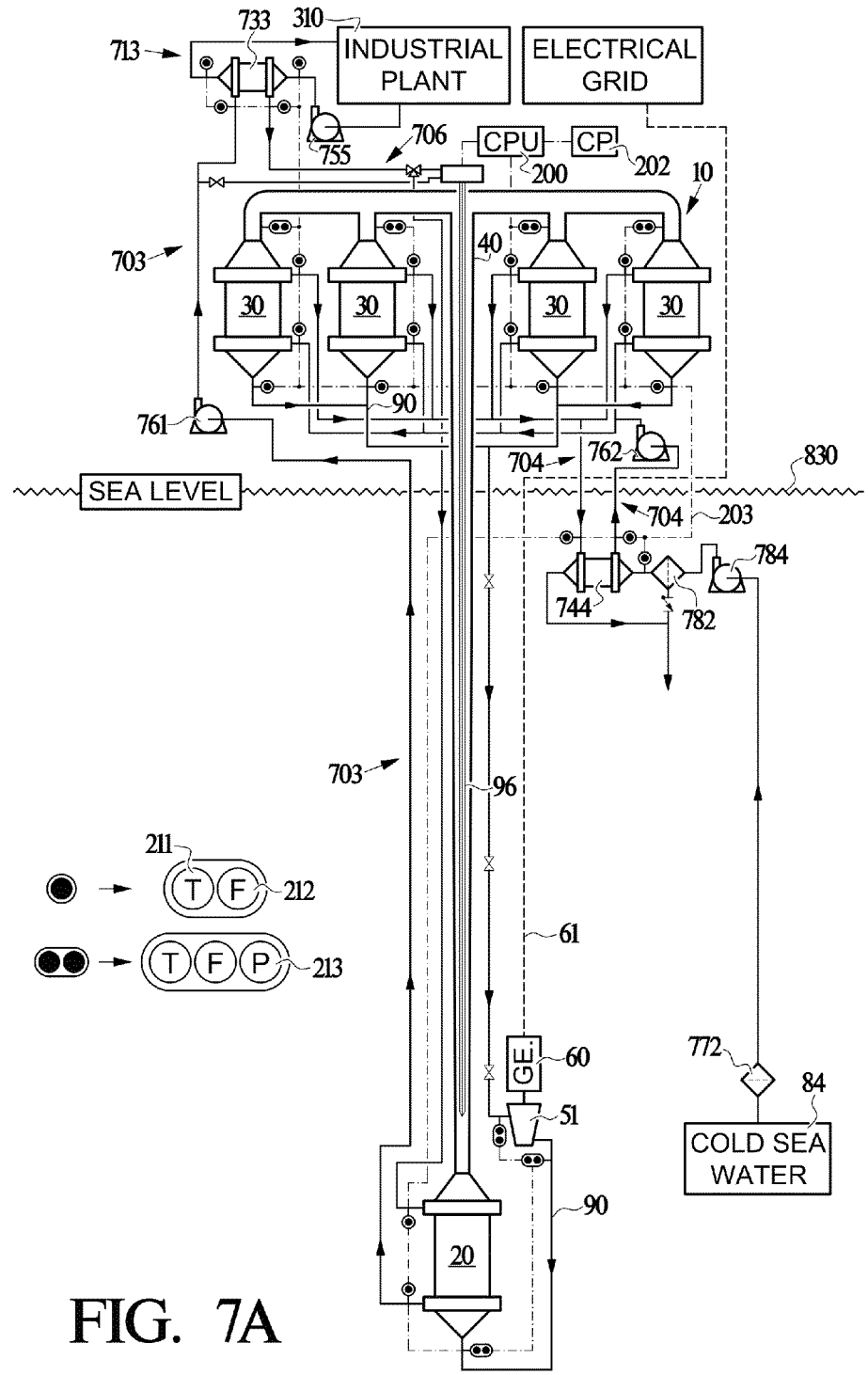
FIG. 7A is a schematic illustration showing a third embodiment.
Figure 7B:
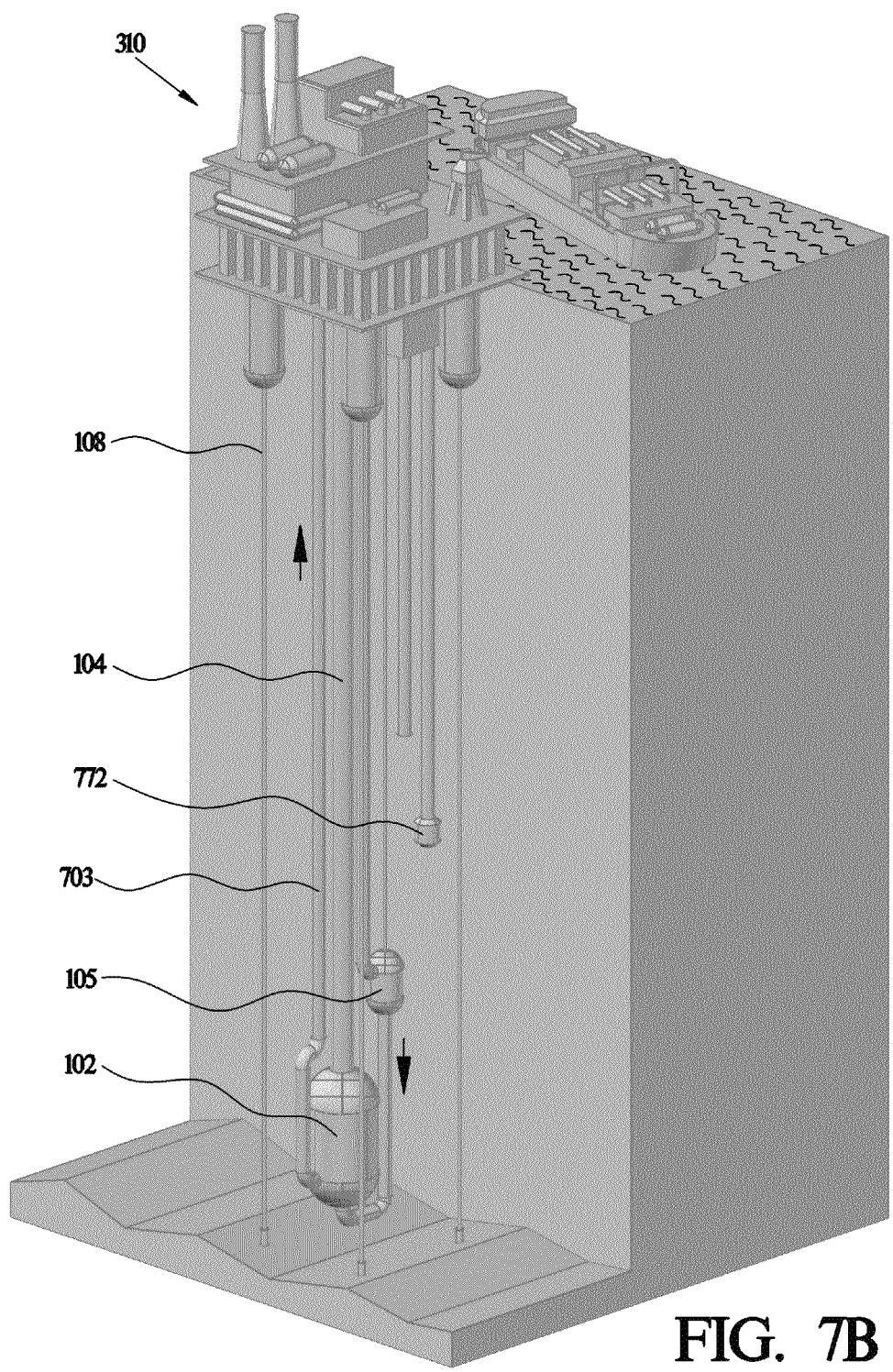
FIG. 7B is a three-dimensional perspective view of the third embodiment.

Please refer to FIGS. 7A and 7B wherein a third embodiment is depicted. In this third embodiment the thermal energy conversion plant had been arranged in a floating platform as in the first and second embodiments, being also the evaporator 20 and the widening ascending conduit 40 arranged in high-pressure resistant submergible vessels (102, 104). The floating platform of this third embodiment is anchored to the sea bed by a group of high-strength synthetic fiber mooring ropes 108. The selected turbine of this third embodiment is also a reaction turbine 51. The heat sink is cold deep sea water 84, and the heat source is the waste heat from an aluminum industrial processing plant 310 (artificial heat source). Any other kind of industrial plant could be suitable as well.

In this third embodiment, there is an indirect transfer of heat between the closed-loop thermodynamic circuit 10 and the heat source and heat sink, in a way that through an auxiliary heating thermal circuit 703 heat is driven from the industrial processing plant 310 (heat source) into the evaporator 20; and through an auxiliary cooling thermal circuit 704 heat is driven from the condenser 30 into the cold deep sea water 84 (heat sink). In contrast to the first and second embodiments, in this third embodiment the heat gave up by the working fluid in the condensers is not recycled in the evaporator 20 through a thermal circuit. The waste heat from the aluminum plant 310 is driven into the auxiliary heating unit 733 of the auxiliary heating thermal circuit 703 by an external thermal fluid, which flows through an external heating thermal circuit 713 by the action of a pump 755. This system could be preferred when there is an abundant heat source (as the aluminum processing plant 310), and it is needed to use a fluid (external thermal fluid) with low temperature as refrigerant for the industrial processing plant.

The auxiliary heating thermal circuit 703 comprises: and auxiliary heating unit 733; a group of pipes connecting said auxiliary heating unit 703 with the evaporator 20, and the evaporator 20 back to said auxiliary heating unit 733, making a closed circuit; a pump 761 connected to said group of pipes; and an auxiliary heating thermal fluid. As described, the external fluid drives the waste heat from the aluminum processing plant 310 into the auxiliary heating unit 733 wherein the auxiliary heating thermal fluid heats up (cooling down the external thermal fluid) prior to entering into the evaporators 20. In the other hand, the auxiliary cooling thermal circuit 704 comprises: an auxiliary cooling unit 744; a group of pipes connecting said auxiliary cooling unit 744 with the condensers 30, and the condensers 30 back to said auxiliary cooling unit 744, making a closed circuit; a pump 762 connected to said group of pipes; and an auxiliary cooling thermal fluid. Through the auxiliary cooling unit 744 passes doubled filtered (772, 782) cold deep sea water 84, which flows, by the action of a pump 784, through an open circuit that is submerged under the sea level 830. The filtered cold sea water 84 passes then through the auxiliary cooling unit 744 gaining heat from the auxiliary cooling thermal fluid.

As in previous embodiments a group of internal thermal pipes 96 helps in keeping a constant temperature inside of the widening ascending conduit 40. Through said internal thermal pipes 96 flows in this embodiment heated auxiliary heating thermal fluid, which is diverted from the auxiliary heating thermal circuit 103 into said internal thermal pipes 96 by an auxiliary circuit 706.

Figure 8A:
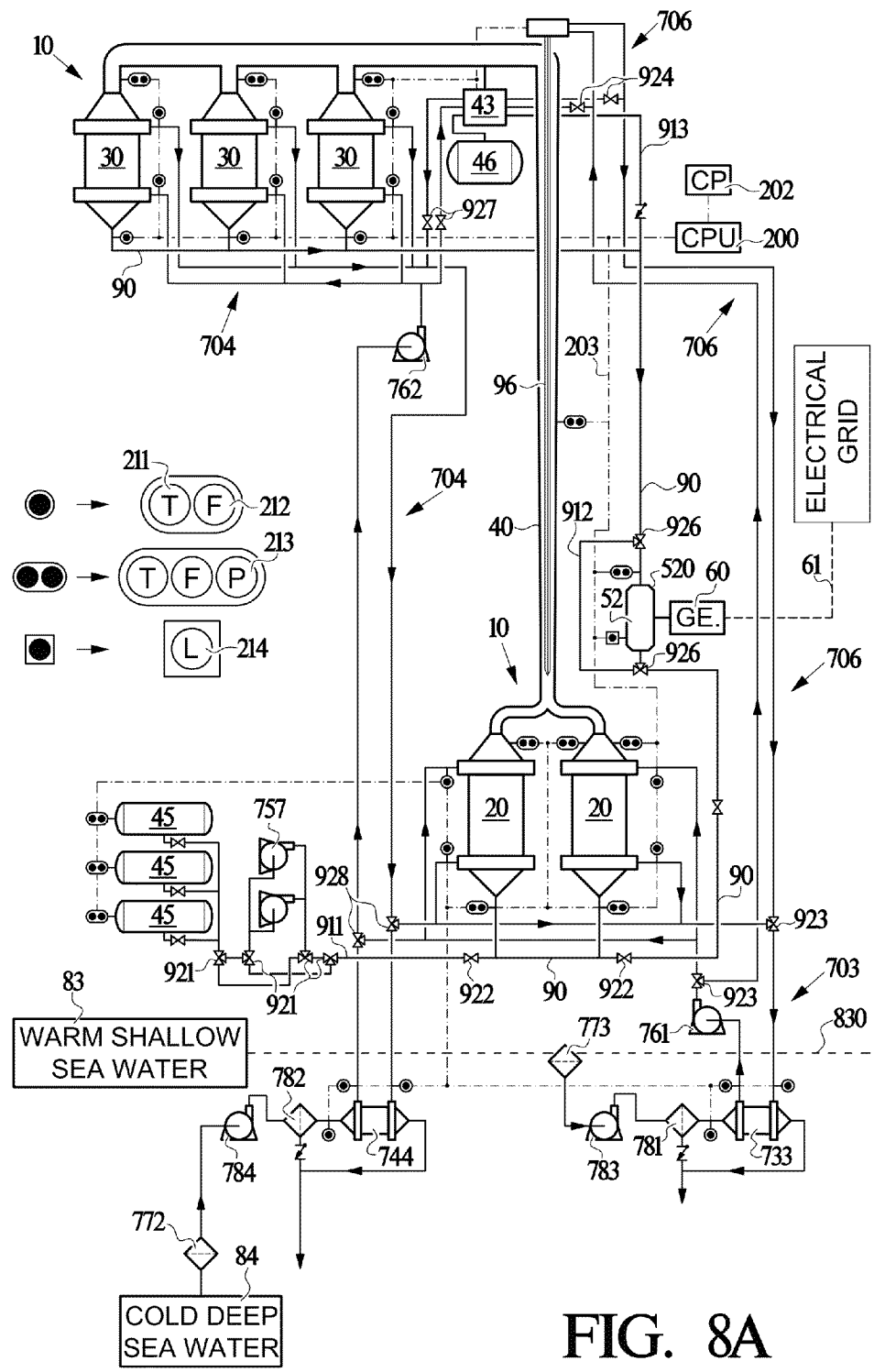
FIG. 8A is a schematic illustration showing a fourth embodiment.
Figure 8B:
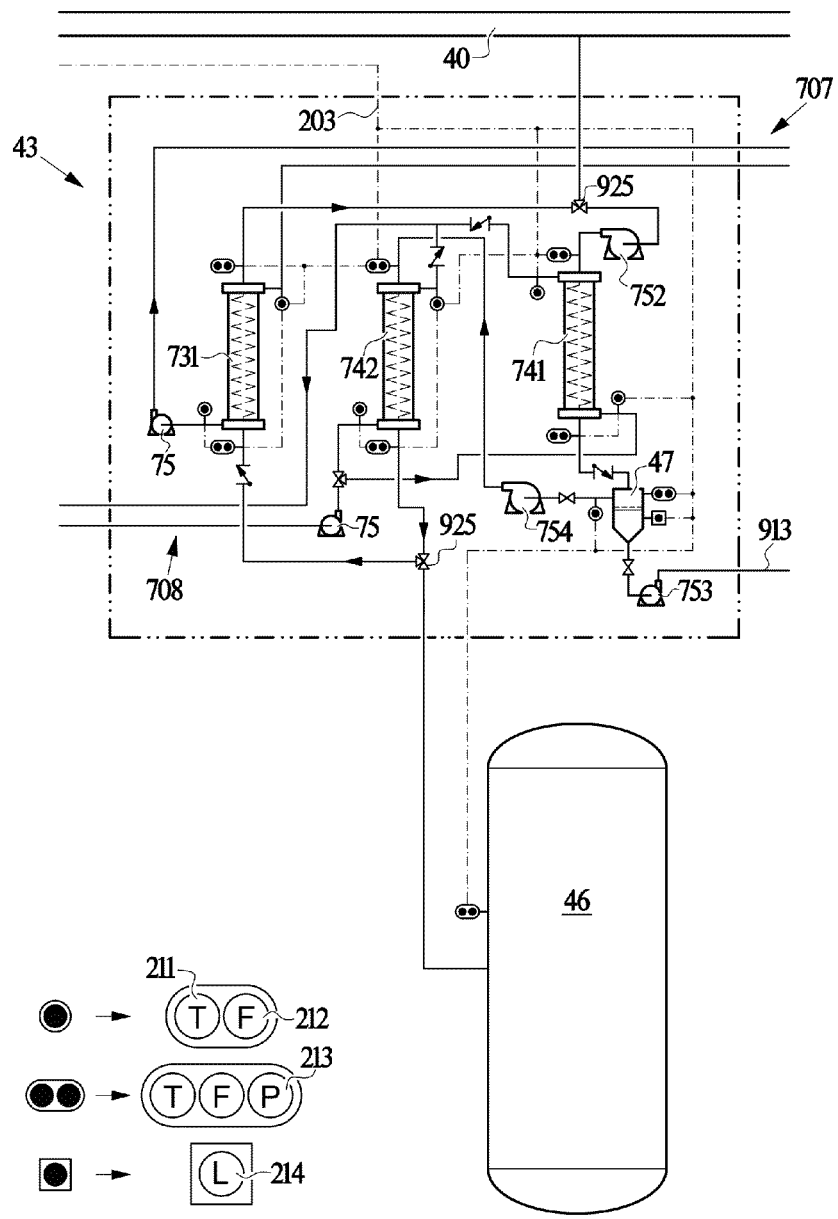
FIG. 8B is a schematic illustration showing the auxiliary gas station of the fourth embodiment.
Figure 8C:
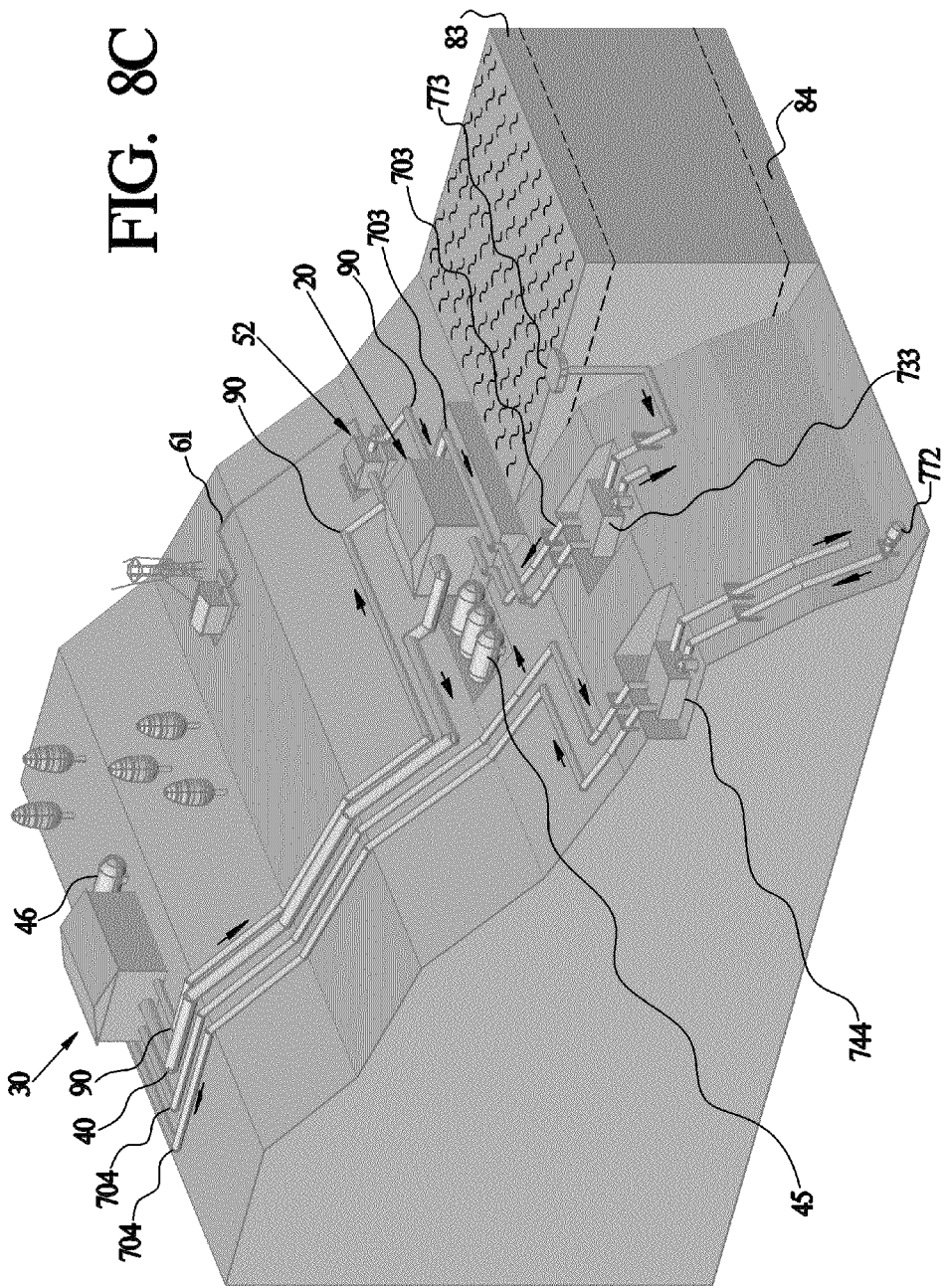
FIG. 8C is a three-dimensional view in perspective of the fourth embodiment.

Please refer to FIGS. 8A, 8B and 8C wherein a fourth embodiment is depicted. In this fourth embodiment the closed-loop thermodynamic circuit 10 had been disposed on dry land, being the condensers 30 located on a mountain, and the evaporators 20 on the shore of a warm sea. The widening ascending conduit 40 ascends on the mountain side, connecting the evaporator 20 and the condenser 30. The turbine selected for this preferred embodiment of the invention is an impulse turbine 52. In this embodiment warm shallow sea water 83 is the heat source, and cold deep sea water 84 is the heat sink. In this fourth embodiment, there is an indirect transfer of heat also between the closed-loop thermodynamic circuit 10 and the heat source and heat sink, in a way that through an auxiliary heating thermal circuit 703 heat is driven from the warm shallow sea water 83 (heat source)into the evaporator 20; and through an auxiliary cooling thermal circuit 704 heat is driven from the condenser 30 into the cold deep sea water 84 (heat sink).

The auxiliary heating thermal circuit 703 comprises an auxiliary heating unit 733; a group of pipes connecting said heating 733 unit with the evaporator 20, making a closed circuit; a pump 761 connected to said group of pipes; and an auxiliary heating thermal fluid. By the action of a pump 783 warm shallow sea water 83 is collected through a floating filter 773 at sea level 830; flowing through an open circuit (which is submerged under said sea level 830) and passing through a second filter 781 before entering into the auxiliary heating unit 733, wherein gives heat to the auxiliary heating thermal fluid. Then the warmed up auxiliary heating thermal fluid flows through said auxiliary thermal circuit 703 by the action of the pump 761 entering into the evaporators 20. In the other hand, the auxiliary cooling thermal circuit 704 comprises an auxiliary cooling unit 744; a group of pipes connecting said auxiliary cooling unit 744 with the condensers 30, and the condensers 30 back to said auxiliary cooling unit 744, making a closed circuit; a pump 762 connected to said group of pipes; and an auxiliary cooling thermal fluid. Through the auxiliary cooling unit 744 passes doubled filtered (772,782) cold deep sea water 84, which flows, by the action of a pump 784, through an open circuit that is also submerged under the sea level 830. Then the filtered cold sea water 84 passes through the auxiliary cooling unit 744 wherein gains heat from the auxiliary cooling thermal fluid, which had raised its temperature after gaining heat from the gasified working fluid in the condensers 30. As in the third embodiment, the heat given up by the gasified working fluid in the condensers 30 is not reutilized in the evaporator through a thermal circuit, as in the first and second embodiment was showed. This system could be preferred when the heat source and heat sink are abundant, and it is convenient to shave costs by limiting the dimensions of the condenser, evaporators and heat exchangers. But as explained before, it could result in a bigger heat or thermal pollution into the environment.

In this fourth embodiment it is shown an example of the starting and the stopping operation of the thermal energy conversion plant. The starting operation comprises three steps (please, refer to FIGS. 8A and 8B): In the first step the working fluid is contained liquefied and pressurized in a group of deposits 45, and the pressuring gas is contained pressurized in a second deposit 46 that is connected to a pressuring gas station 43. A first 921 and a second 922 group of valves are operated in order to let the liquefied working fluid flow from the deposits 45 into a group of pumps 757, and, from said pumps 757 into the evaporators 20 through an extension pipe 911 that is connected with the descending conduit 90. Simultaneously the auxiliary heating thermal circuit 703 starts operating driving heat from the warm shallow sea water 83 into the evaporators 20. A third group of valves 923 is operated in a way that part of the auxiliary heating thermal fluid that flows through the heating thermal circuit 703 is diverted through an auxiliary circuit 706 into a group of thermal doubled-walled pipes 96, that run inside of the widening ascending conduit 40, in order to help to maintain a constant temperature inside of said ascending conduit 40. A fourth group of valves 924 is operated in order to divert part of the auxiliary heating thermal fluid that flows through said auxiliary circuit 706 into a second auxiliary circuit 707, which connects with the pressuring gas station 43, wherein a fifth group of valves 925 is operated (FIG. 8B), allowing the pressuring gas contained in the deposit 46 to flow into a gas heating unit 731, wherein said pressuring gas gains heat from the aforementioned auxiliary heating thermal fluid that flows through said second auxiliary circuit 707 into said gas station 43.

During this first step the auxiliary cooling thermal circuit 704 is not operating.

Once the widening ascending conduit 40 has been filled with gasified working fluid and pressuring gas, and the right temperature and pressure of operation had been achieved, the second step begins in which the auxiliary cooling thermal circuit 104 gets activated making the gasified working fluid to liquefy in the condensers 30, by giving heat said gasified working fluid to the auxiliary cooling thermal fluid, which in turns gives said heat to the cold deep sea water 84 in the auxiliary cooling unit 744. Then the liquefied working fluid falls from the condensers 30 through the descending conduit 90, in which a sixth group of valves 926 prevents the liquefied working fluid from entering into the turbine's encasement 520, diverting it through an auxiliary descending conduit 912. Once the descending conduit 90 is full of liquefied working fluid, the first 921 and second 922 group of valves are again operated letting the descending liquefied working fluid enter into the evaporators 20, and interrupting the flow of liquefied working fluid from the deposits 45 into the thermodynamic circuit 10. Simultaneously the sixth group of valves 926 is again operated letting the descending liquefied working fluid enter into the turbine encasement 520 and act over the impulse turbine 52, which in turn will start driving the electrical generator 60.

Even after the thermodynamic circuit 10 had been closed, and no more working fluid is being added into said thermodynamic circuit 10, the pressuring gas station 43 will continue working in order to adjust the amount of pressuring gas in the widening ascending conduit 40. From the data collected by the temperature 211, flow 212 and pressure 213 measuring and monitoring units set in the widening ascending conduit 40, the central processing unit, CPU 200, will continue operating said pressuring gas station 43, regulating the concentration of the pressuring gas in the ascending conduit 40, until an optimal concentration value is obtained. In order to extract the possible excess of pressuring gas from the widening ascending conduit 40, the pressuring gas station 43 (please, refer again to FIG. 8B) is provided with a first compressor 752 that extracts a mix of gasified working fluid and pressuring gas from the widening ascending conduit 40, and injects said mix into a first gas cooling unit 741, wherein the pressurized working fluid liquefies, meanwhile the pressuring gas remains gasified. Then the cooled liquefied working fluid and the gasified pressuring gas will flow from said first gas cooling unit 741 into a vertical separator 47, wherein the liquefied working fluid separates by gravity from the gasified pressuring gas. An auxiliary pump 753 drives the liquefied working fluid from the vertical separator 47, through an auxiliary pipe 913, into the descending conduit 90. A second compressor 754 will inject the cooled gasified working fluid collected in the vertical separator 47, into a second gas cooling unit 742, before entering in the deposit 46. Both gas cooling units (741, 742) use the auxiliary cooling thermal fluid that after operating a seventh group of valves 927, flows through a third auxiliary circuit 708, from the auxiliary cooling thermal circuit 104, into the gas station 43. Once the pressure and temperature of the gasified working fluid and the pressuring gas are optimal in the widening ascending conduit 40, the pressuring gas station 43 will stop operating, finishing in this way the third step of the starting operation.

The stopping operation consists in a group of simultaneous operations that will stop the flow of working fluid through the thermodynamic circuit 10 (the number assigned to the valves is the same as for the starting operation): The first 921 and the second 922 group of valves will be now operated in order to let the liquefied working fluid flow from the descending conduit 90 and evaporators 20 into the pumps 757, and from the pumps 757 back into the deposits 45. The sixth group of valves 926 surrounding the turbine encasement 520 is operated in order to divert the flow of the descending liquefied working fluid from the descending conduit 90 into the auxiliary descending conduit 912, preventing it from acting on the impulse turbine 52. The third 923 and fourth group of valves 924 are operated in a way that the auxiliary heating thermal fluid will just flow from the auxiliary heating unit 733 into the first auxiliary circuit 706, and from it into the thermal pipes 96 of the widening ascending conduit 40, an into the pressuring gas station 43 through the second auxiliary circuit 707, without passing said auxiliary heating thermal fluid through the evaporators 20. A eighth group of valves 928 will divert part of the auxiliary cooling thermal fluid that flows through the auxiliary cooling thermal circuit 704 into the evaporators 20, in order to condensate the gasified working fluid that could get in them. Because of the constant withdraw of working fluid the internal pressure in the thermodynamic circuit 10 will decrease dramatically. In order to maintain the needed pressure P2 (please, refer to FIGS. 2A and 4B) for the liquefaction of the gasified working along the closed-loop thermodynamic circuit 10, the pressuring gas station 43 will inject an extra amount of pressuring gas into the widening ascending conduit 40, what will help to raise the internal pressure along the thermodynamic circuit 10. Once the working fluid had been withdrawn, the pressuring gas station 43 will start recovering the pressuring gas from the widening ascending conduit 40, lowering its internal pressure.

During normal operation, in the turbine encasement 520 part of the liquefied working fluid that had acted on the impulse turbine 52 will gasify under temperature of about T0 with a pressure of about P2, that is equivalent to the pressure obtained in the condensers 30, what will generate a cloud of pressurized gas in the turbine encasement 520 that will help to keep liquefied most of the working fluid that, after acting on the turbine 52 is collected at the lower level of said turbine encasement 520, where accumulates because gravity, being its level constantly measured and monitored 214.

Please refer to FIGS. 9A, 9B, 9C, 9D, 9E, 9F, in which a fifth embodiment is depicted, wherein the evaporator 20, a reaction turbine 51 and generator 60 are disposed in high-pressure resistant submergible vessels (102, 105) on a sea bed, meanwhile the condenser 30 is located on dry land, on the top of a hill. This firth embodiment is pretended for geographical areas where there are not high mountains near a sea, and it is more convenient to arrange half of the thermal energy conversion plant under the sea level 830, gaining advantage from the sea's depth.

In this fifth embodiment a thermal circuit 70 drives heat back from the condenser 30 into the evaporator 20, as depicted in the first and second embodiments.

Figure 9A:
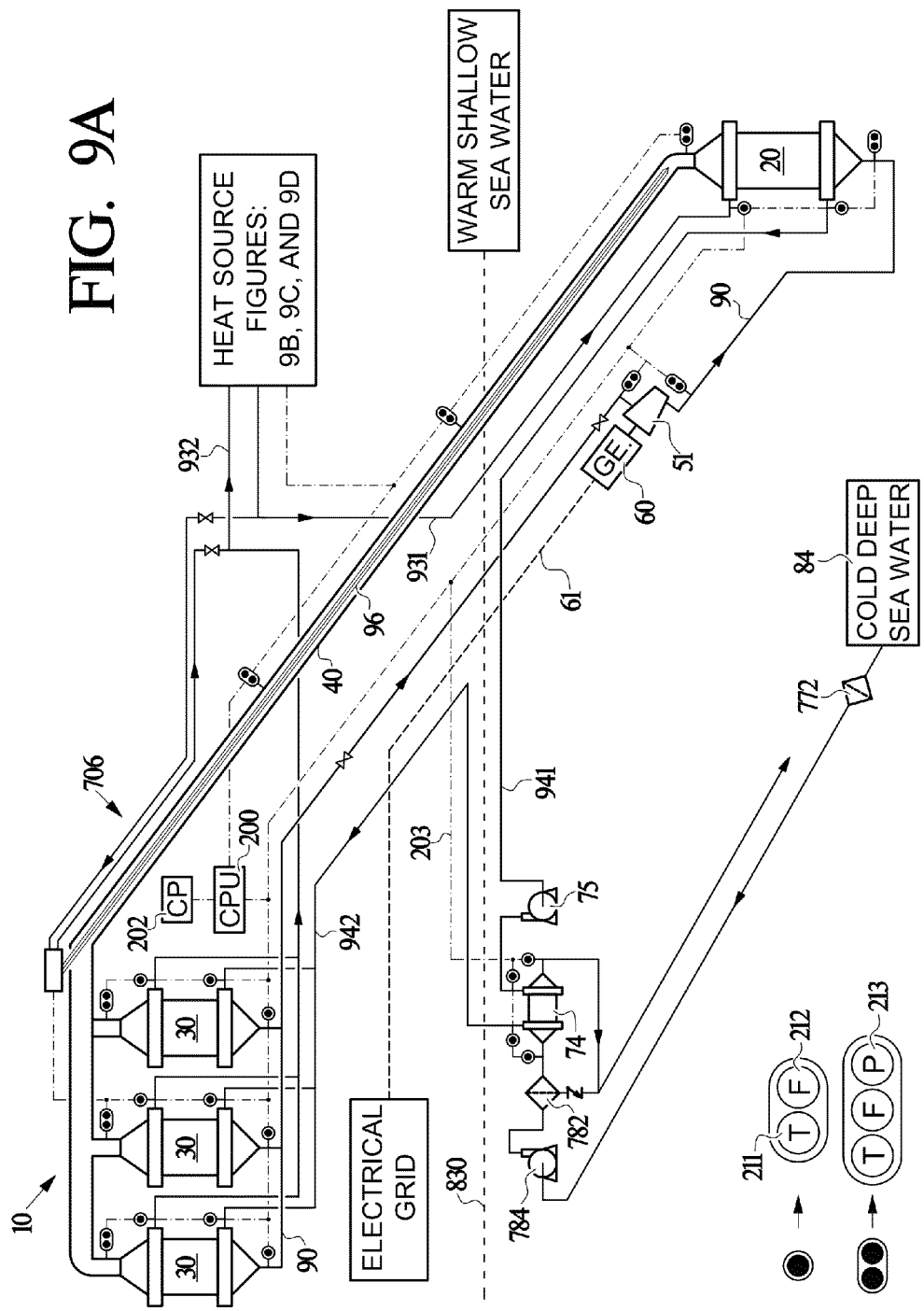
FIG. 9A is a schematic illustration showing a fifth embodiment.
Figure 9B:
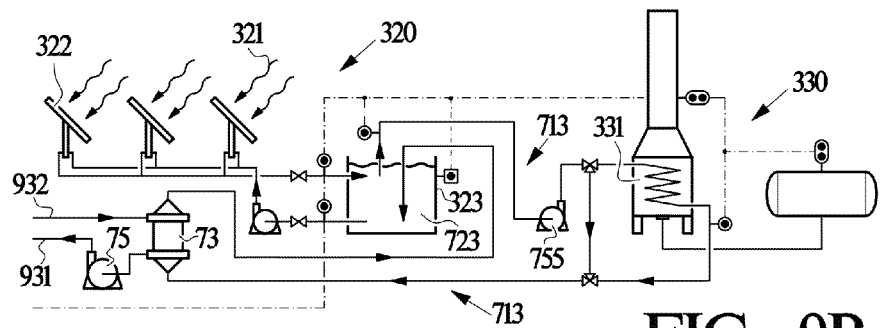
FIG. 9B is a schematic illustration showing a first scenario of the fifth embodiment.

Please refer to FIGS. 9B and 9E wherein a first scenario of this fifth embodiment is depicted. In a solar plant 320 an external thermal fluid 723 (per example water) is heated by solar radiation 321 through solar panels 322. The warm external thermal fluid 723 is stored in a thermal pool 323 from where flows through an external heating thermal circuit 713, which is connected with the heating unit 73, by the action of a pump 755. The external heating thermal circuit 713 is also connected with a gas fired plant 330, wherein the external thermal fluid 723 gains heat from a burning gas in a gas furnace 331, when its temperature is lower than an optimal value, what could occur, as per example, because a decrease in solar radiation due to seasonal or climatic reasons.

Figure 9C:
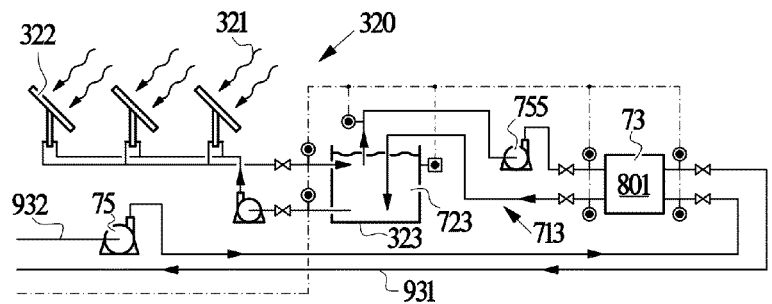
FIG. 9C is a schematic illustration showing a second scenario of the fifth embodiment.

Please refer to FIG. 9C wherein a second scenario is depicted, in which a heat pump 801 works as the heating unit 73, diverting heat from the sun-heated warm external thermal fluid 723 into the thermal fluid.

Figure 9D:
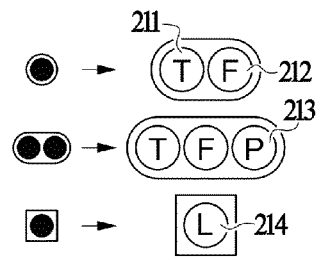
FIG. 9D is a schematic illustration showing a third scenario of the fifth embodiment.
Figure 9D:
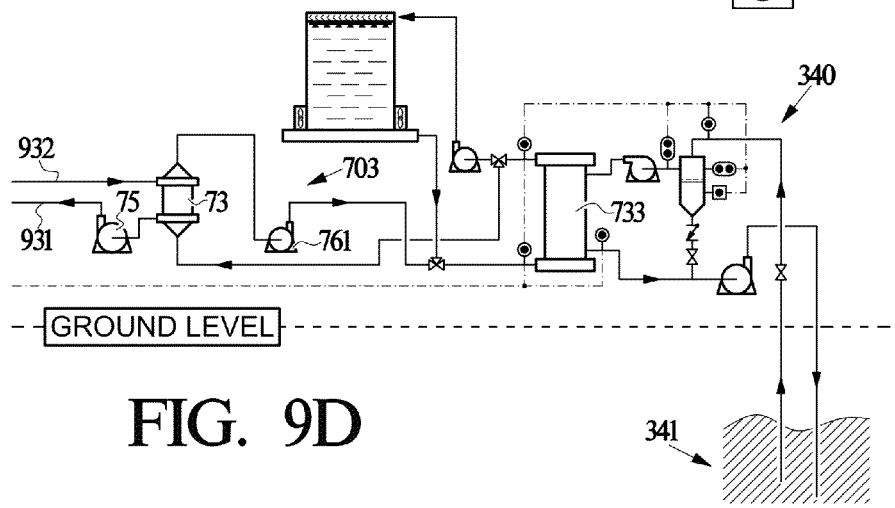

Please refer to FIGS. 9D and 9F wherein a third scenario is depicted, wherein an auxiliary heating thermal fluid is heated in an auxiliary heating unit 733 by geothermal energy 341 through a geothermal plant 340. The auxiliary heating thermal fluid flows through an auxiliary heating thermal circuit 703 by the action of a pump 761, giving said heat to the thermal fluid in the heating unit 73.

Figure 10A:
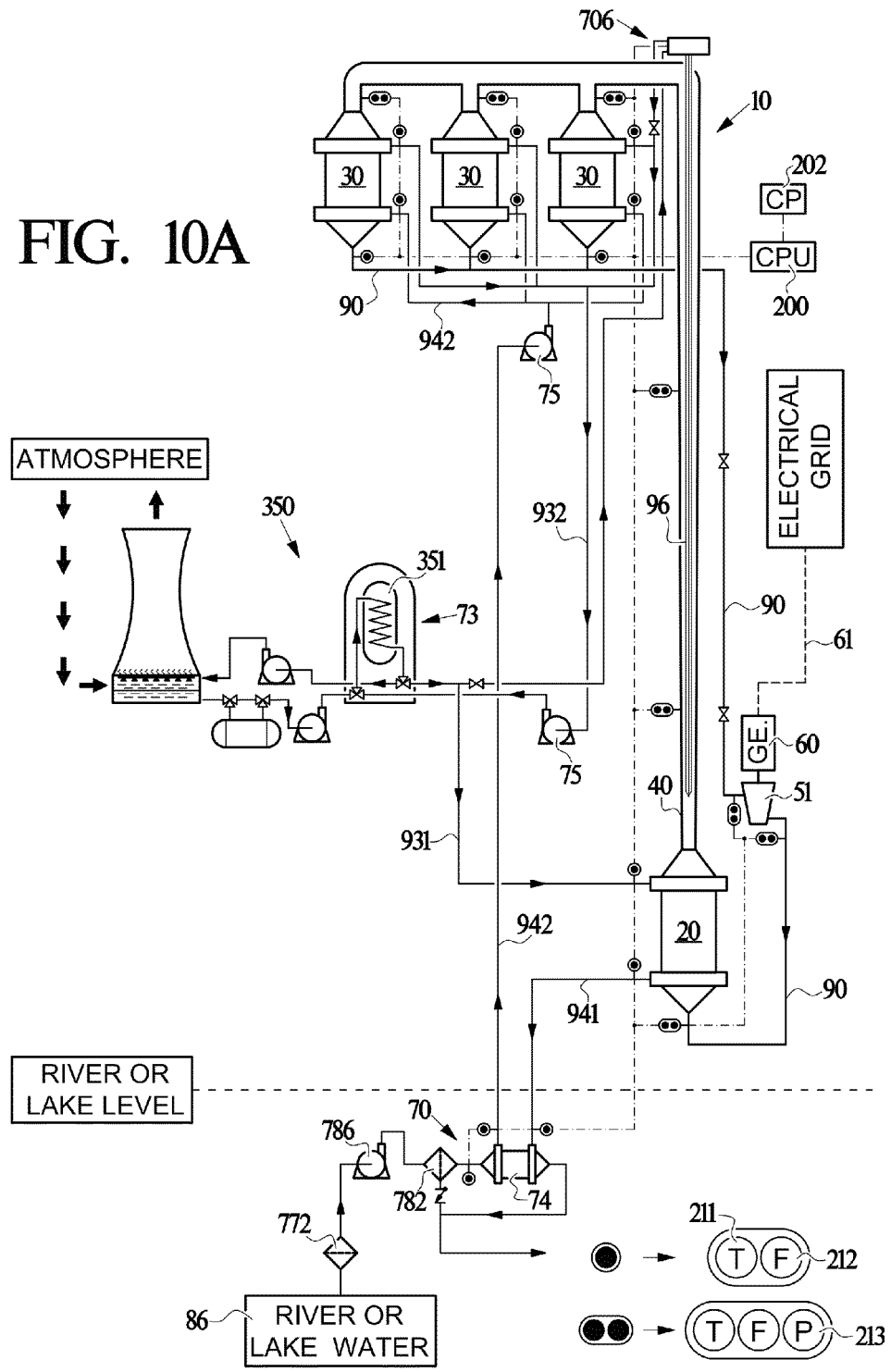
FIG. 10A is a schematic illustration showing a sixth embodiment.
Figure 10B:
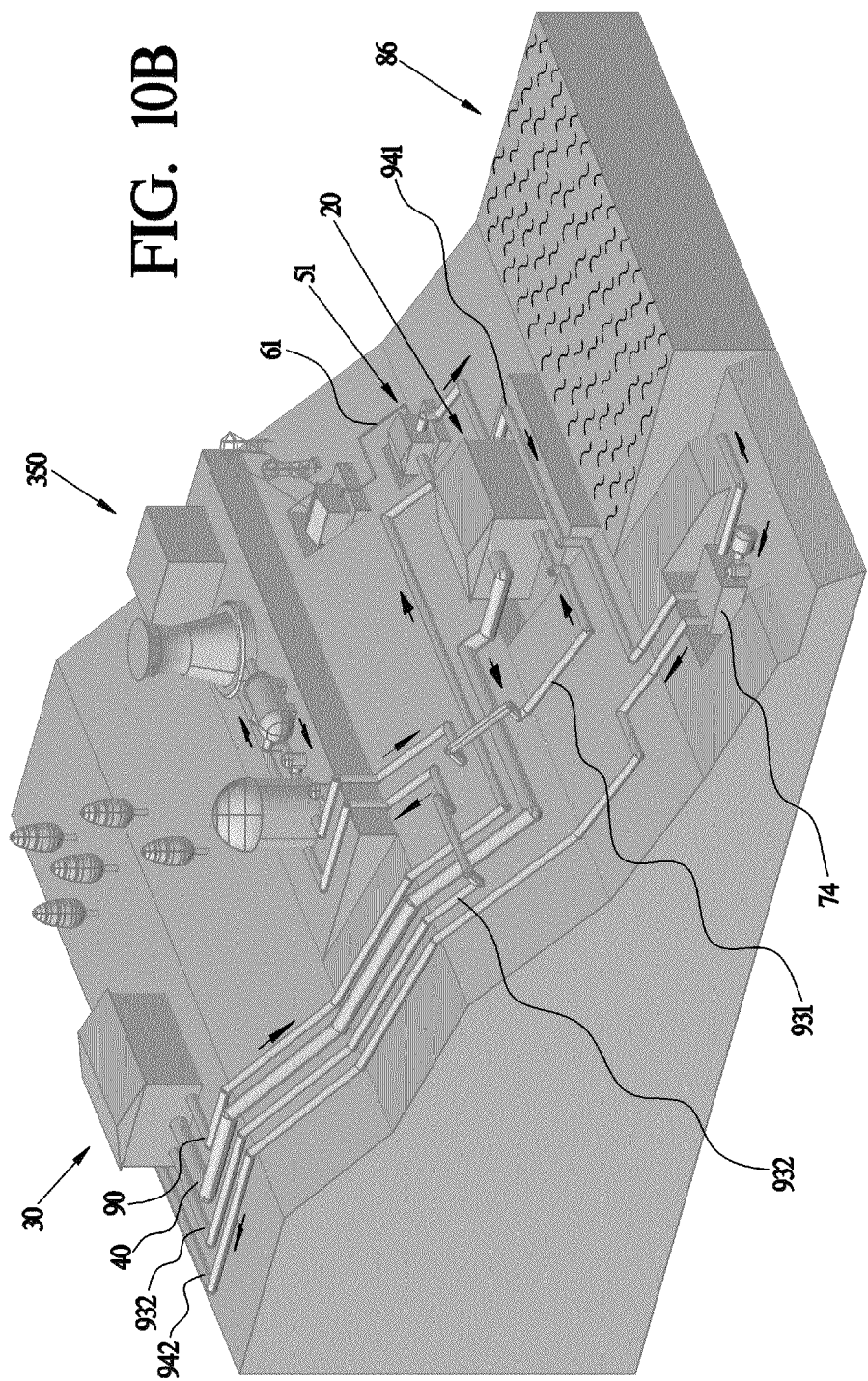
FIG. 10B is a three-dimensional view in perspective of the sixth embodiment.

Please refer to FIGS. 10A and 10B wherein a sixth embodiment is depicted. In this sixth embodiment the thermodynamic circuit 10 had been disposed on dry land, being the condensers 30 located on a mountain, and the evaporator 20 on the shore of a river or lake. The widening ascending conduit 40 ascends on the mountain side, connecting the evaporator 20 and the condenser 30. In this sixth embodiment a thermal circuit 70 drives heat back from the condenser 30 into the evaporator 20, as depicted in the first, second and fifth embodiments. For this embodiment a nuclear plant 350 will be the heat source, and the cold water from a river or lake 86 the heat sink. The reactor 351 of the nuclear plant will work as the heating unit 73, gaining the thermal fluid heat directly from the nuclear reactions. The water 86 from the river or lake is double filtered (772, 782) before flowing into the cooling unit 74, by the action of a pump 786, being the cooling unit 74 of this embodiment also of the type of plate heat exchangers. When using the water of a river as heat sink it would be desirable to do so in very large rivers, with a vast flow, and near its mouth, in order to avoid thermal pollution in its waters. An artificial lake, made from water diverted from a river, could be used as the heat sink, in order to protect the environment.

Figure 11A:
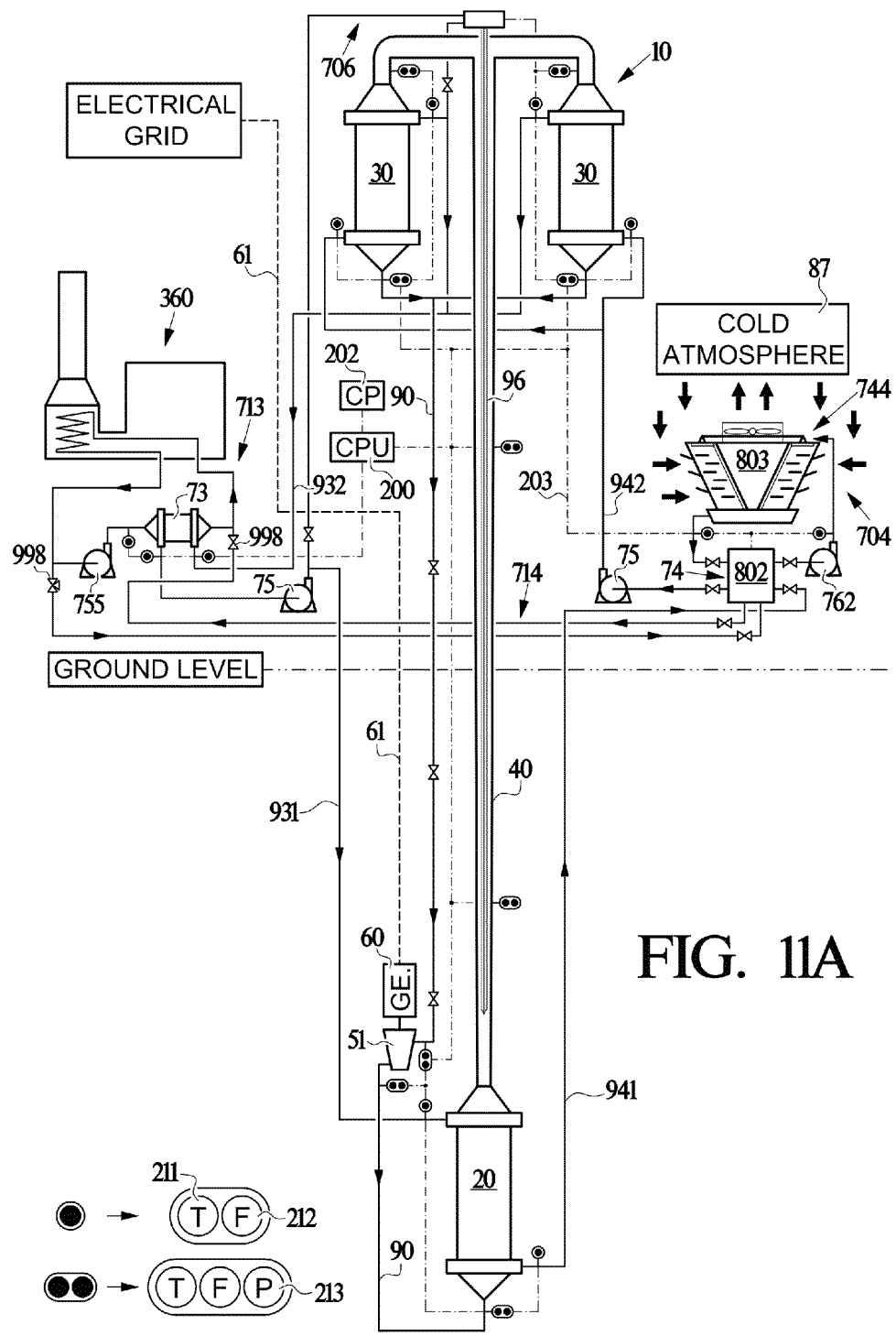
FIG. 11A is a schematic illustration showing a seventh embodiment.
Figure 11B:
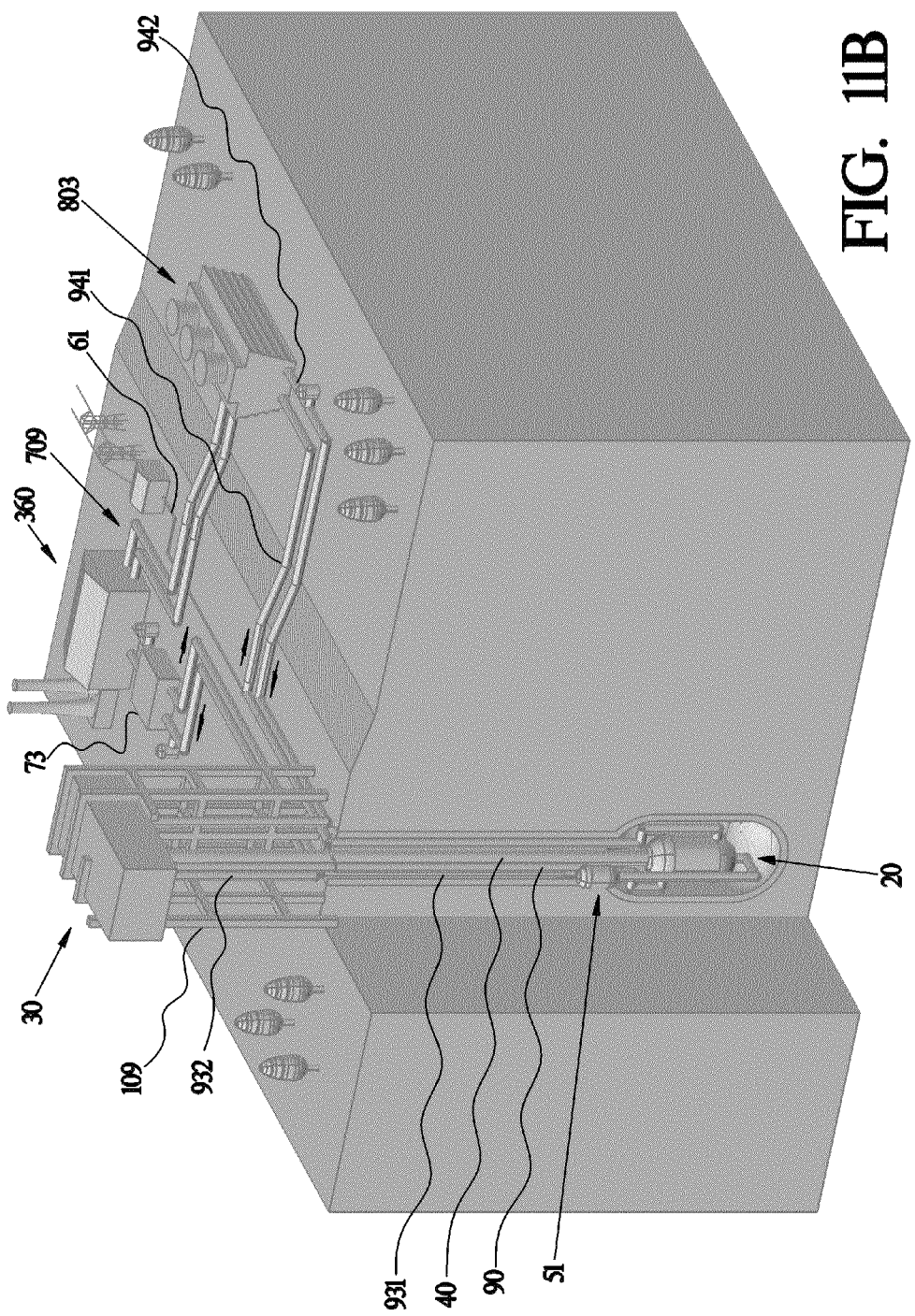
FIG. 11B is a three-dimensional view in perspective of the seventh embodiment.

Please refer to FIGS. 11A and 11B wherein a seventh embodiment is depicted, wherein the thermodynamic circuit 10 had been disposed on dry land, being the condensers 30 arranged in a tower 109, while the evaporator 20, turbine 51 and generator 60 are arranged underground. The ascending conduit 40 is disposed vertically connecting the evaporator 20 and condenser 30. In this embodiment a coal fired plant 360 will be the heat source and the atmosphere the heat sink, being this seventh embodiment conceived for cold inland geographical areas. The evaporator 20 could be located in an abandoned coal mine, in order to better optimize exiting resources.

In this embodiment, a thermal circuit 70 drives also heat from the condenser 30 back into the evaporator 20, as in the first, second, fifth and sixth embodiments. An auxiliary thermal circuit 706 diverts warm thermal fluid from said thermal circuit 70 into the thermal pipes 96 of the widening ascending conduit 40.

The heat from the coal fired plant 360 is driven into the heating unit 73 by an external thermal fluid which flows through a first external heating thermal circuit 713 by the action of a pump 755. Two valves 998 regulate the flow of external thermal fluid that from the first external heating thermal circuit 713 is diverted into a second external heating thermal circuit 714 that is connected to an absorption heat pump 802, which works as the cooling unit 74. In said absorption heat pump 802 the thermal fluid gives heat to an auxiliary cooling thermal fluid, which flows through an auxiliary cooling thermal circuit 704, by the action of a pump 762, from said absorption heat pump 802 into a cooling tower 803 which works as the auxiliary cooling unit 744, and wherein the auxiliary cooling thermal fluid gives heat to the colder atmosphere 87.

As described for the different embodiments of the present disclosure, the heat source could be natural and renewable, as per example: warm tropical sea water, solar energy, and geothermal energy; or artificial, as per example: waste heat from an industrial processing plant, heat generated at a power thermal plant (as per example: gas-fired, coal-fired and nuclear power plants), thermal fluid, etc. The heat sink could be natural and renewable as well, as per example cold deep sea water, water from a river or lake, and a cold atmosphere; or artificial, as per example when using thermal fluid.

In all the embodiments, when using sea, lake or river water as the heat source or heat sink, the heating and cooling units should be set under the sea, lake or river level, in order to avoid lifting the water over the sea, lake or river level.

The energy needed in order to run the pumps of the thermal circuit, as the pumps of the auxiliary thermal circuits, the heat pumps, the measuring and monitoring units, the central processing unit, CPU, control panel, CP, and others auxiliary electronic and electrical devices, could be obtained from the electrical generators.

All the features disclosed in this specification (including any accompanying claims, abstract, and drawings) may be replaced by alternative features serving the same, equivalent or similar purpose, unless expressly stated otherwise. Thus, unless expressly stated otherwise, each future disclosed is one example only of a generic series of equivalent or similar features.

Reference characters corresponding to elements recited in the detailed description and the drawings are used in conjunction with the recitation of the same element or group of elements in the claims. The numeral reference characters are enclosed within parentheses so as to avoid confusion with other numbers or characters that appear in the claims. The use of reference characters is to be considered as having no effect on the scope of the claims [MPEP 608.01(m) (emphasis added.)]. They are noted in order to assist in the understanding of the claims.

Any element in a claim that does not explicitly state "means for" performing a specified function, or "step for" performing a specific function, is not to be interpreted as a "means" or "step" clause as specified in 35 U.S.C. §112, ¶6.

What is claimed is:

1. A thermal energy conversion plant, comprising a closed-loop thermodynamic circuit, said thermodynamic circuit comprising:
    a pressurized working fluid, the working fluid comprising a fluorine-containing compound;
    at least one evaporator unit located at the lowest level of said closed-loop thermodynamic circuit;
    at least one widening ascending conduit connected to said evaporator unit, said widening ascending conduit having an initial diameter smaller than the final diameter;
    at least one condenser unit connected to the upper level of said widening ascending conduit;
    at least one descending conduit that connects the condenser unit with the evaporator unit, closing the closed-loop thermodynamic circuit; and
    at least one power extraction apparatus connected to said descending conduit; wherein:
    the thermodynamic circuit is configured such that the working fluid gasifies in the evaporator unit, then the gasified working fluid egresses from the evaporator unit entering into the widening ascending conduit, ascending up to the condenser unit; in the condenser unit, the gasified working fluid liquefies; then the liquefied working fluid egresses from the condenser unit, falling because of gravity, through the descending conduit, powering the power extraction apparatus; after exiting the power extraction apparatus the liquefied working fluid reenters into the evaporator unit, completing a self-pumping process and restarting the cycle.

2. The thermal energy conversion plant of claim 1, wherein the liquefied working fluid is heated in the evaporator unit by direct transfer of heat from a heat source through said evaporator unit, and wherein the gasified working fluid is cooled in the condenser unit by a direct transfer of heat to a heat sink through said condenser unit.

3. The thermal energy conversion plant of claim 1, wherein the working fluid is heated in the evaporator unit by means of a thermal circuit, and is cooled in the condenser unit by means of said thermal circuit.

4. The thermal energy conversion plant of claim 3, wherein the thermal circuit comprises:
    a thermal fluid;
    at least one pump;
    at least one heating unit;
    at least one cooling unit;
    at least one pipe that connects the heating unit with the evaporator unit of the closed-loop thermodynamic circuit;
    at least one pipe that connects the evaporator unit with the cooling unit;
    at least one pipe that connects the cooling unit with the condenser unit of the closed-loop thermodynamic circuit; and
    at least one pipe that connects said condenser unit with the heating unit, closing the thermal circuit;
    wherein:
    the thermal circuit is configured such that the thermal fluid flows through the thermal circuit by the action of the pump, entering into the heating unit where the thermal fluid is heated; from the heating unit, the thermal fluid flows into the evaporator unit where the thermal fluid gives heat to the liquefied working fluid, meanwhile the thermal fluid is cooled; from the evaporator unit, the thermal fluid flows into the cooling unit where the thermal fluid is cooled; from the cooling unit, the thermal fluid flows into the condenser unit where the thermal fluid gains heat from the gasified working fluid, while the gasified working fluid is cooled; and from the condenser, the thermal fluid flows back again into said heating unit, closing the thermal circuit and restarting the cycle.

5. The thermal energy conversion plant of claim 4, wherein the thermal fluid is heated in the heating unit by direct transfer of heat from a heat source through said heating unit, and wherein the thermal fluid is cooled in the cooling unit by direct transfer of heat to a heat sink through said cooling unit.

6. The thermal energy conversion plant of claim 4, wherein the thermal fluid is heated in the heating unit by indirect transfer of heat from a heat source by means of an auxiliary heating thermal circuit, and reduces its temperature is cooled in the cooling unit by indirect transfer of heat to a heat sink by means of an auxiliary cooling thermal circuit.

7. The thermal energy conversion plant of claim 6, wherein, the auxiliary heating thermal circuit comprises:
- an auxiliary heating thermal fluid;
- at least one pump;
- at least one auxiliary heating unit, in contact with the heat source;
- at least one pipe that connects the auxiliary heating unit with the heating unit of the thermal circuit;
- at least one pipe that connects the heating unit of the thermal circuit back to the auxiliary heating unit, closing the circuit;

wherein:
- the auxiliary heating thermal circuit is configured such that the auxiliary heating thermal fluid flows through the auxiliary heating thermal circuit by the action of the pump, driving heat from the auxiliary heating unit to the heating unit of the thermal circuit; and the auxiliary cooling thermal circuit comprises:
- an auxiliary cooling thermal fluid;
- at least one pump;
- at least one auxiliary cooling unit in contact with the heat sink;
- at least one pipe that connects the auxiliary cooling unit with the cooling unit of the thermal circuit;
- at least one pipe that connects the cooling unit of the thermal circuit back to the auxiliary cooling unit, closing the circuit;

wherein:
- the auxiliary cooling thermal circuit is configured such that the auxiliary cooling thermal fluid flows through the auxiliary cooling thermal circuit by the action of the pump, driving heat from the cooling unit of the thermal circuit to the auxiliary cooling unit.

8. The thermal energy conversion plant of claim 4, wherein the heating unit and cooling unit are, respectively, a condensing unit and an evaporating unit of a heat pump, wherein heat is diverted from the thermal fluid that flows from the evaporator unit of the thermodynamic circuit into the thermal fluid that flows from the condenser unit of the thermodynamic circuit.

9. The thermal energy conversion plant of claim 4, wherein the thermal fluid is demineralized water.

10. The thermal energy conversion plant of claim 1, wherein the liquefied working fluid is heated in the evaporator unit by indirect transfer of heat from a heat source by means of an auxiliary heating thermal circuit, and wherein the gasified working fluid is cooled in the condenser unit by indirect transfer of heat to a heat sink by means of an auxiliary cooling thermal circuit.

11. The thermal energy conversion plant of claim 10, wherein, the auxiliary heating thermal circuit, comprises:
- an auxiliary heating thermal fluid;
- at least one pump;
- at least one auxiliary heating unit, in contact with the heat source;
- at least one pipe that connects the auxiliary heating unit with the evaporator unit of the closed-loop thermodynamic circuit;
- at least one pipe that connects the evaporator unit of the closed-loop thermodynamic circuit back to the auxiliary heating unit, closing the circuit;

wherein:
- the auxiliary heating thermal circuit is configured such that the auxiliary heating thermal fluid flows through the auxiliary heating thermal circuit by the action of the pump, driving heat from the auxiliary heating unit to the evaporator unit; and the auxiliary cooling thermal circuit, comprises:
- an auxiliary cooling thermal fluid;
- at least one pump; at least one auxiliary cooling unit, in contact with the heat sink;
- at least one pipe that connects the auxiliary cooling unit with the condenser unit of the closed-loop thermodynamic circuit;
- at least one pipe that connects the condenser unit of the closed-loop thermodynamic circuit back to the auxiliary cooling unit, closing the circuit;

wherein:
- the auxiliary cooling thermal circuit is configured such that the auxiliary cooling thermal fluid flows through the auxiliary cooling thermal circuit by the action of the pump, driving heat from the condenser unit to the auxiliary cooling unit.

12. The thermal energy conversion plant of claim 1, further including a pressuring gas, with a smaller molar mass than the working fluid, in the widening ascending conduit.

13. The thermal energy conversion plant of claim 12, wherein the pressuring gas is helium or nitrogen.

14. The thermal energy conversion plant of claim 1, wherein the power extraction apparatus is a turbine.

15. The thermal energy conversion plant of claim 1, wherein the power extraction apparatus is connected to an electrical generator.

16. The thermal energy conversion plant of claim 1, wherein the working fluid is sulfur hexafluoride or hexafluoride ethane.

17. The thermal energy conversion plant of claim 1, wherein the widening ascending conduit is provided with a source of heat.

18. The thermal energy conversion plant of claim 17, wherein the source of heat is a plurality of double-walled thermal pipes through which flows warm thermal fluid in opposite directions.

19. The thermal energy conversion plant of claim 1, wherein the evaporator unit and the condenser unit are made by parallel plates.

20. The thermal energy conversion plant of claim 19, wherein the plates are made of aluminum alloy.

21. The thermal energy conversion plant of claim 1, further comprising a plurality of measuring and monitoring units, wherein measuring and monitoring units are arranged in the closed-loop thermodynamic circuit.

22. The thermal energy conversion plant of claim 21, wherein the information collected by the measuring and monitoring units is transmitted to a central processing unit which operates the plant in an automated mode.

23. The thermal energy conversion plant of claim 22, wherein the central processing unit is connected to a control panel, through which the plant is optionally operated in manual mode.

24. The thermal energy conversion plant of claim 1, wherein the plant is set in a sea floating platform.

25. The thermal energy conversion plant of claim 24, wherein the sea floating platform comprises a floating vessel, the floating vessel comprising the condenser unit, and wherein an interconnected group of submergible vessels is suspended by ropes from said floating vessel, said group of submergible vessels comprising the evaporator unit, the ascending conduit and the power extraction apparatus, and wherein a descending conduit connects the condenser unit with the evaporator unit.

26. The thermal energy conversion plant of claim 25, wherein each of the submergible vessel containing the ascending conduit, the submergible vessel containing the evaporator unit, and the descending conduit is surrounded by an external encasement through which flows warm or cold sea water for thermal-insulating.

27. The thermal energy conversion plant of claim 24, wherein the sea floating platform is positioned or headed by a dynamic position system.

28. A thermal energy conversion plant, comprising a closed-loop thermodynamic circuit and a closed-loop thermal circuit, the thermodynamic circuit comprising:
- at least one evaporator unit located at the lowest level of the closed-loop thermodynamic circuit;
- at least one widening ascending conduit in fluid communication with the evaporator and connected to the evaporator unit, the widening ascending conduit having an initial diameter smaller than the final diameter;
- at least one condenser unit in fluid communication with the widening ascending conduit and connected to the upper level of the widening ascending conduit;
- at least one descending conduit that is in fluid communication with the condenser and evaporator units, and connects the condenser unit with the evaporator unit, the descending conduit closing the closed-loop thermodynamic circuit; and
- at least one power extraction apparatus in fluid communication with the descending conduit and connected to the descending conduit; and the thermal circuit comprising:
- at least one heating unit;
- at least one cooling unit;
- at least one pipe in fluid communication with the heating unit of the thermal circuit and the evaporator unit of the thermodynamic circuit, and connecting the heating unit with the evaporator unit;
- at least one pipe in fluid communication with the cooling unit of the thermal circuit and the evaporator unit of the thermodynamic circuit, and connecting the evaporator unit with the cooling unit;
- at least one pipe in fluid communication with the cooling unit of the thermal circuit and the condenser unit of the thermodynamic circuit, and connecting the cooling unit with the condenser unit; and
- at least one pipe in fluid communication with the heating unit of the thermal circuit and the condenser unit of the thermodynamic circuit, connecting the condenser unit with the heating unit and closing the thermal circuit.

29. The thermal energy conversion plant of claim 28, wherein the heating unit-and cooling unit are, respectively, a condensing unit and an evaporating unit of a heat pump, wherein heat is diverted from a thermal fluid that flows from the evaporator unit of the thermodynamic circuit into a thermal fluid that flows from the condenser unit of the thermodynamic circuit.

\* \* \* \* \*

UNITED STATES PATENT AND TRADEMARK OFFICE
CERTIFICATE OF CORRECTION

| | |
|---|---|
| PATENT NO. | : 8,733,103 B2 |
| APPLICATION NO. | : 13/706433 |
| DATED | : May 27, 2014 |
| INVENTOR(S) | : Gaspar Pablo Paya Diaz |

It is certified that error appears in the above-identified patent and that said Letters Patent is hereby corrected as shown below:

In the Specification

Column 1, Lines 3-4

Delete "CROSS-REFERENCE TO RELATE APPLICANTIONS" and insert
-- CROSS-REFERENCE TO RELATED APPLICATIONS --.

Column 9, Line 67 to Column 10, Line 1

Delete "'m' is the molar mass of the gas in Kg/mol" and insert -- 'm' is the mass of the gas in Kg --.

Column 10, Line 13

Delete "'m' is the molar mass of the gas in Kg/mol" and insert -- 'm' is the mass of the gas in Kg --.

Column 21, Lines 66-67

Delete "Please refer to FIGS. 6A, 6B, 6F, 6C, 6D, 6F, 6F, 6G-1, 6G-2, 6G-3 and 6H ..." and insert
-- Please refer to FIGS. 6A, 6B, 6C, 6D, 6E, 6F, 6G-1, 6G-2, 6G-3 and 6H ... --.

Column 23, Line 32

Delete "surrounding" and insert -- surrounds --.

Column 29, Lines 37-46

Delete the paragraph at lines 37-46.

Signed and Sealed this
Fourteenth Day of October, 2014

Michelle K. Lee
*Deputy Director of the United States Patent and Trademark Office*

CERTIFICATE OF CORRECTION (continued)
U.S. Pat. No. 8,733,103 B2

In the Claims

<u>Column 30, Line 65</u>

In claim 6, line 4, delete "reduces its temperature".

<u>Column 34, Line 21</u>

In claim 29, line 2, delete "unit-and" and insert -- unit and --.